US010158830B2

(12) United States Patent
Murakami

(10) Patent No.: US 10,158,830 B2
(45) Date of Patent: Dec. 18, 2018

(54) TERMINAL APPARATUS AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/685,745

(22) Filed: Aug. 24, 2017

(65) Prior Publication Data
US 2017/0353697 A1 Dec. 7, 2017

Related U.S. Application Data

(63) Continuation of application No. PCT/JP2016/002318, filed on May 12, 2016.

(30) Foreign Application Priority Data

May 29, 2015 (JP) ................................ 2015-110543

(51) Int. Cl.
*H04B 7/00* (2006.01)
*H04N 7/173* (2011.01)
(Continued)

(52) U.S. Cl.
CPC ....... *H04N 7/17318* (2013.01); *H04B 1/3827* (2013.01); *H04W 8/186* (2013.01);
(Continued)

(58) Field of Classification Search
CPC ......... H04N 7/17318; H04W 36/0072; H04W 48/12; H04W 52/0216; H04W 72/042; H04W 84/005; H04W 88/06
(Continued)

(56) References Cited

U.S. PATENT DOCUMENTS 7,970,920 B1 * 6/2011 Dinan .................... H03M 13/35
709/230
8,774,851 B2 * 7/2014 Mirbaha ............. H04L 67/2838
455/518

(Continued)

FOREIGN PATENT DOCUMENTS

JP     2013-143575 A    7/2013
JP     2014-078904 A    5/2014

OTHER PUBLICATIONS

International Search Report of PCT application No. PCT/JP2016/002318 dated Jul. 12, 2016.

*Primary Examiner* — Marceau Milord
(74) *Attorney, Agent, or Firm* — Seed IP Law Group LLP

(57) ABSTRACT

Control circuitry in a terminal apparatus generates one or more groups, each group including a selected plurality of communication methods whose total value of specific absorption rates (SARs) is equal to or less than a threshold value, and generates group information indicating the one or more groups. N transmitters transmit transmission data to a plurality of communication stations that respectively support the plurality of communication methods included in one group that is indicated by the group information, by using corresponding communication methods.

20 Claims, 22 Drawing Sheets

(51) Int. Cl.
  *H04B 1/3827* (2015.01)
  *H04W 48/18* (2009.01)
  *H04W 8/18* (2009.01)
  *H04W 36/00* (2009.01)
  *H04W 48/12* (2009.01)
  *H04W 52/02* (2009.01)
  *H04W 72/04* (2009.01)
  *H04W 84/00* (2009.01)
  *H04W 88/06* (2009.01)

(52) U.S. Cl.
  CPC ....... *H04W 36/0072* (2013.01); *H04W 48/12* (2013.01); *H04W 48/18* (2013.01); *H04W 52/0216* (2013.01); *H04W 72/042* (2013.01); *H04W 84/005* (2013.01); *H04W 88/06* (2013.01); *Y02D 70/00* (2018.01)

(58) Field of Classification Search
  USPC .................................. 455/518, 519, 450, 509
  See application file for complete search history.

(56) References Cited

U.S. PATENT DOCUMENTS

| | | | | |
|---|---|---|---|---|
| 9,930,682 B2* | 3/2018 | Wang | ............... | H04W 72/087 |
| 2011/0003590 A1* | 1/2011 | Yoon | ............... | H04W 36/385 |
| | | | | 455/432.1 |
| 2011/0194530 A1* | 8/2011 | Tinnakornsrisuphap | ............... | |
| | | | | H04W 36/04 |
| | | | | 370/331 |
| 2012/0021707 A1* | 1/2012 | Forrester | ............. | H04W 52/281 |
| | | | | 455/103 |
| 2012/0270519 A1* | 10/2012 | Ngai | ............... | H04W 52/226 |
| | | | | 455/404.1 |
| 2012/0270592 A1* | 10/2012 | Ngai | ............... | H04W 52/226 |
| | | | | 455/522 |
| 2013/0176876 A1* | 7/2013 | Wakayama | ......... | H04W 72/048 |
| | | | | 370/252 |
| 2013/0178240 A1* | 7/2013 | Kiyomoto | ........... | H04W 52/246 |
| | | | | 455/522 |
| 2013/0265889 A1* | 10/2013 | Buckley | ................. | H01Q 1/241 |
| | | | | 370/252 |
| 2014/0370892 A1* | 12/2014 | Gottimukkala | ..... | H04W 60/005 |
| | | | | 455/435.1 |
| 2015/0036907 A1* | 2/2015 | Seong | ................... | G06T 11/003 |
| | | | | 382/131 |
| 2015/0215832 A1* | 7/2015 | Fitzpatrick | ............ | H04W 36/04 |
| | | | | 455/426.1 |
| 2016/0007295 A1* | 1/2016 | Kahn | ................ | H04W 52/0251 |
| | | | | 370/311 |
| 2016/0174168 A1* | 6/2016 | Lu | ....................... | H04W 52/146 |
| | | | | 455/522 |

\* cited by examiner

FIG. 4

| WIRELESS COMMUNICATION METHOD | NAME | FREQUENCY | SAR | SELECTION NUMBER |
|---|---|---|---|---|
| FIRST WIRELESS COMMUNICATION METHOD | WIRELESS LAN | 2.4 GHz | a11 | #1 |
| | | 5 GHz | a12 | #2 |
| SECOND WIRELESS COMMUNICATION METHOD | BLUETOOTH | 2.4 GHz | a21 | #3 |
| THIRD WIRELESS COMMUNICATION METHOD | THIRD-GENERATION CELL-PHONE | 800 MHz | a31 | #4 |
| | | 2 GHz | a32 | #5 |
| FOURTH WIRELESS COMMUNICATION METHOD | FOURTH-GENERATION CELL-PHONE | 800 MHz | a41 | #6 |
| | | 2 GHz | a42 | #7 |

FIG. 6

| WIRELESS COMMUNICATION METHOD | NAME | FREQUENCY | MIMO MISO ON/OFF | SAR | SELECTION NUMBER |
|---|---|---|---|---|---|
| FIRST WIRELESS COMMUNICATION METHOD | WIRELESS LAN | 2.4 GHz | ON | a11 | #1 |
| | | | OFF | a12 | #2 |
| | | 5 GHz | ON | a13 | #3 |
| | | | OFF | a14 | #4 |
| SECOND WIRELESS COMMUNICATION METHOD | BLUETOOTH | 2.4 GHz | — | a21 | #5 |
| THIRD WIRELESS COMMUNICATION METHOD | THIRD-GENERATION CELL-PHONE | 800 MHz | — | c31 | #6 |
| | | 2 GHz | — | c32 | #7 |
| FOURTH WIRELESS COMMUNICATION METHOD | FOURTH-GENERATION CELL-PHONE | 800 MHz | — | c41 | #8 |
| | | 2 GHz | — | c42 | #9 |

FIG. 7

| WIRELESS COMMUNICATION METHOD | NAME | FREQUENCY | MIMO MISO ON/OFF | FREQUENCY BAND | SAR | SELECTION NUMBER |
|---|---|---|---|---|---|---|
| FIRST WIRELESS COMMUNICATION METHOD | WIRELESS LAN | 2.4 GHz | ON | 20 MHz | a11 | #1 |
| | | | ON | 20/40 MHz | a12 | #2 |
| | | | OFF | 20 MHz | a13 | #3 |
| | | | OFF | 20/40 MHz | a14 | #4 |
| | | 5 GHz | ON | 20 MHz | a15 | #5 |
| | | | ON | 20/40 MHz | a16 | #6 |
| | | | OFF | 20 MHz | a17 | #7 |
| | | | OFF | 20/40 MHz | a18 | #8 |
| SECOND WIRELESS COMMUNICATION METHOD | BLUETOOTH | 2.4 GHz | — | — | a21 | #9 |
| THIRD WIRELESS COMMUNICATION METHOD | THIRD-GENERATION CELL-PHONE | 800 MHz | — | — | a31 | #10 |
| | | 2 GHz | — | — | a32 | #11 |
| FOURTH WIRELESS COMMUNICATION METHOD | FOURTH-GENERATION CELL-PHONE | 800 MHz | — | X Hz | a41 | #12 |
| | | | — | X/Y Hz | a42 | #13 |
| | | 2 GHz | — | X Hz | a43 | #14 |
| | | | — | X/Y Hz | a44 | #15 |

FIG. 8

GROUP #X

SELECTED METHOD

FOURTH-GENERATION      FREQUENCY
CELL-PHONE             800 MHz

WIRELESS LAN           FREQUENCY
                       2.4 GHz

MAXIMUM
TRANSMISSION RATE

500 Mbps

FIG. 9

GROUP #X                                    TRANSMISSION
                                            RATE

FOURTH-GENERATION      FREQUENCY    CONNECTED      40 Mbps
CELL-PHONE             800 MHz WIRELESS LAN           FREQUENCY    CONNECTED      72 Mbps
                       2.4 GHz WIRELESS LAN           FREQUENCY    UNCONNECTED      ——
                       5 GHz

| COMMUNICATION METHOD | TRANSMISSION RATE |
|---|---|
| WIRELESS LAN | 100 Mbps |
| THIRD-GENERATION CELL-PHONE | 5 Mbps |
| FOURTH-GENERATION CELL-PHONE | 50 Mbps |
| GROUP #X | 200 Mbps |
| GROUP #Y | 300 Mbps |

FIG. 12

| WIRELESS COMMUNICATION METHOD | NAME | FREQUENCY | SAR₁ | SAR₂ | SELECTION NUMBER |
|---|---|---|---|---|---|
| FIRST WIRELESS COMMUNICATION METHOD | WIRELESS LAN | 2.4 GHz | a11 | b11 | #1 |
| | | 5 GHz | a12 | b12 | #2 |
| SECOND WIRELESS COMMUNICATION METHOD | BLUETOOTH | 2.4 GHz | a21 | b21 | #3 |
| THIRD WIRELESS COMMUNICATION METHOD | THIRD-GENERATION CELL-PHONE | 800 MHz | a31 | b31 | #4 |
| | | 2 GHz | a32 | b32 | #5 |
| FOURTH WIRELESS COMMUNICATION METHOD | FOURTH-GENERATION CELL-PHONE | 800 MHz | a41 | b41 | #6 |
| | | 2 GHz | a42 | b42 | #7 |

FIG. 14

| WIRELESS COMMUNICATION METHOD | NAME | FREQUENCY | MIMO MISO ON/OFF | SAR₁ | SAR₂ | SELECTION NUMBER |
|---|---|---|---|---|---|---|
| FIRST WIRELESS COMMUNICATION METHOD | WIRELESS LAN | 2.4 GHz | ON | a11 | b11 | #1 |
| | | | OFF | a12 | b12 | #2 |
| | | 5 GHz | ON | a13 | b13 | #3 |
| | | | OFF | a14 | b14 | #4 |
| SECOND WIRELESS COMMUNICATION METHOD | BLUETOOTH | 2.4 GHz | — | a21 | b21 | #5 |
| THIRD WIRELESS COMMUNICATION METHOD | THIRD-GENERATION CELL-PHONE | 800 MHz | — | a31 | b31 | #6 |
| | | 2 GHz | — | a32 | b32 | #7 |
| FOURTH WIRELESS COMMUNICATION METHOD | FOURTH-GENERATION CELL-PHONE | 800 MHz | — | a41 | b41 | #8 |
| | | 2 GHz | — | a42 | b42 | #9 |

FIG. 15

| WIRELESS COMMUNICATION METHOD | NAME | FREQUENCY | MIMO MISO ON/OFF | FREQUENCY BAND | SAR₁ | SAR₂ | SELECTION NUMBER |
|---|---|---|---|---|---|---|---|
| FIRST WIRELESS COMMUNICATION METHOD | WIRELESS LAN | 2.4 GHz | ON | 20 MHz | a11 | b11 | #1 |
| | | | | 20/40 MHz | a12 | b12 | #2 |
| | | | OFF | 20 MHz | a13 | b13 | #3 |
| | | | | 20/40 MHz | a14 | b14 | #4 |
| | | 5 GHz | ON | 20 MHz | a15 | b15 | #5 |
| | | | | 20/40 MHz | a16 | b16 | #6 |
| | | | OFF | 20 MHz | a17 | b17 | #7 |
| | | | | 20/40 MHz | a18 | b18 | #8 |
| SECOND WIRELESS COMMUNICATION METHOD | BLUETOOTH | 2.4 GHz | — | — | a21 | b21 | #9 |
| THIRD WIRELESS COMMUNICATION METHOD | THIRD-GENERATION CELL-PHONE | 800 MHz | — | — | a31 | b31 | #10 |
| | | 2 GHz | — | — | a32 | b32 | #11 |
| FOURTH WIRELESS COMMUNICATION METHOD | FOURTH-GENERATION CELL-PHONE | 800 MHz | — | X Hz | a41 | b41 | #12 |
| | | | — | X/Y Hz | a42 | b42 | #13 |
| | | 2 GHz | — | X Hz | a43 | b43 | #14 |
| | | | — | X/Y Hz | a44 | b44 | #15 |

FIG. 16

| WIRELESS COMMUNICATION METHOD | NAME | FREQUENCY | $SAR_1$ | $SAR_2$ | SELECTION NUMBER |
|---|---|---|---|---|---|
| FIRST WIRELESS COMMUNICATION METHOD | WIRELESS LAN | 2.4 GHz | a11 | b11 | #1 |
| | | 5 GHz | a12 | b12 | #2 |
| SECOND WIRELESS COMMUNICATION METHOD | BLUETOOTH | 2.4 GHz | a21 | b21 | #3 |
| THIRD WIRELESS COMMUNICATION METHOD | THIRD-GENERATION CELL-PHONE | 800 MHz | a31 | b31 | #4 |
| | | 2 GHz | a32 | b32 | #5 |
| FOURTH WIRELESS COMMUNICATION METHOD | FOURTH-GENERATION CELL-PHONE | 800 MHz | a41 | b41 | #6 |
| | | 2 GHz | a42 | b42 | #7 |
| FIFTH WIRELESS COMMUNICATION METHOD | CELL-PHONE | 10 GHz | a51 | b51 | #8 |
| | | 15 GHz | a52 | b52 | #9 |
| SIXTH WIRELESS COMMUNICATION METHOD | HIGH-SPEED WIRELESS LAN | 20 GHz | a61 | b61 | #10 |
| | | 60 GHz | a62 | b62 | #11 |

FIG. 17

| WIRELESS COMMUNICATION METHOD | NAME | FREQUENCY | SAR₁ | SAR₂ | SAR₃ | SAR₄ | SELECTION NUMBER |
|---|---|---|---|---|---|---|---|
| FIRST WIRELESS COMMUNICATION METHOD | WIRELESS LAN | 2.4 GHz | a11 | b11 | — | — | #1 |
| | | 5 GHz | a12 | b12 | — | — | #2 |
| SECOND WIRELESS COMMUNICATION METHOD | BLUETOOTH | 2.4 GHz | a21 | b21 | — | — | #3 |
| THIRD WIRELESS COMMUNICATION METHOD | THIRD-GENERATION CELL-PHONE | 800 MHz | a31 | b31 | — | — | #4 |
| | | 2 GHz | a32 | b32 | — | — | #5 |
| FOURTH WIRELESS COMMUNICATION METHOD | FOURTH-GENERATION CELL-PHONE | 800 MHz | a41 | b41 | — | — | #6 |
| | | 2 GHz | a42 | b42 | — | — | #7 |
| FIFTH WIRELESS COMMUNICATION METHOD | CELL-PHONE | 10 GHz | — | — | c51 | d51 | #8 |
| | | 15 GHz | — | — | c52 | d52 | #9 |
| SIXTH WIRELESS COMMUNICATION METHOD | HIGH-SPEED WIRELESS LAN | 20 GHz | — | — | c61 | d61 | #10 |
| | | 60 GHz | — | — | c62 | d62 | #11 |

FIG. 18

| WIRELESS COMMUNICATION METHOD | NAME | FREQUENCY | MIMO MISO ON/OFF | SAR₁ | SAR₂ | SELECTION NUMBER |
|---|---|---|---|---|---|---|
| FIRST WIRELESS COMMUNICATION METHOD | WIRELESS LAN | 2.4 GHz | ON | a11 | b11 | #1 |
|  |  |  | OFF | a12 | b12 | #2 |
| SECOND WIRELESS COMMUNICATION METHOD | BLUETOOTH | 2.4 GHz | — | a21 | b21 | #3 |
| THIRD WIRELESS COMMUNICATION METHOD | THIRD-GENERATION CELL-PHONE | 800 MHz | — | a31 | b31 | #4 |
|  |  | 2 GHz | — | a32 | b32 | #5 |
| FOURTH WIRELESS COMMUNICATION METHOD | FOURTH-GENERATION CELL-PHONE | 800 MHz | — | a41 | b41 | #6 |
|  |  | 2 GHz | — | a42 | b42 | #7 |
| FIFTH WIRELESS COMMUNICATION METHOD | CELL-PHONE | 10 GHz | — | a51 | b51 | #8 |
|  |  | 15 GHz | — | a52 | b52 | #9 |
| SIXTH WIRELESS COMMUNICATION METHOD | HIGH-SPEED WIRELESS LAN | 20 GHz | ON | a61 | b61 | #10 |
|  |  | 60 GHz | ON | a62 | b62 | #11 |
|  |  |  | OFF | a63 | b63 | #12 |

FIG. 19

| WIRELESS COMMUNICATION METHOD | NAME | FREQUENCY | MIMO MISO ON/OFF | $SAR_1$ | $SAR_2$ | $SAR_3$ | $SAR_4$ | SELECTION NUMBER |
|---|---|---|---|---|---|---|---|---|
| FIRST WIRELESS COMMUNICATION METHOD | WIRELESS LAN | 2.4 GHz | ON | a11 | b11 | — | — | #1 |
| | | | OFF | a12 | b12 | — | — | #2 |
| SECOND WIRELESS COMMUNICATION METHOD | BLUETOOTH | 2.4 GHz | — | a21 | b21 | — | — | #3 |
| THIRD WIRELESS COMMUNICATION METHOD | THIRD-GENERATION CELL-PHONE | 800 MHz | — | a31 | b31 | — | — | #4 |
| | | 2 GHz | — | a32 | b32 | — | — | #5 |
| FOURTH WIRELESS COMMUNICATION METHOD | FOURTH-GENERATION CELL-PHONE | 800 MHz | — | a41 | b41 | — | — | #6 |
| | | 2 GHz | — | a42 | b42 | — | — | #7 |
| FIFTH WIRELESS COMMUNICATION METHOD | CELL-PHONE | 10 GHz | — | — | — | c51 | d51 | #8 |
| | | 15 GHz | — | — | — | c52 | d52 | #9 |
| SIXTH WIRELESS COMMUNICATION METHOD | HIGH-SPEED WIRELESS LAN | 20 GHz | — | — | — | c61 | d61 | #10 |
| | | 60 GHz | ON | — | — | c62 | d62 | #11 |
| | | | OFF | — | — | c63 | d63 | #12 |

FIG. 20

| WIRELESS COMMUNICATION METHOD | NAME | FREQUENCY | MIMO MISO ON/OFF | FREQUENCY BAND | SAR$_1$ | SAR$_2$ | SELECTION NUMBER |
|---|---|---|---|---|---|---|---|
| FIRST WIRELESS COMMUNICATION METHOD | WIRELESS LAN | 2.4 GHz | ON | 20 MHz | a11 | b11 | #1 |
| | | | | 20/40 MHz | a12 | b12 | #2 |
| | | | OFF | 20 MHz | a13 | b13 | #3 |
| | | | | 20/40 MHz | a14 | b14 | #4 |
| SECOND WIRELESS COMMUNICATION METHOD | BLUETOOTH | 2.4 GHz | — | — | a21 | b21 | #5 |
| THIRD WIRELESS COMMUNICATION METHOD | FOURTH-GENERATION CELL-PHONE | 800 MHz | — | X Hz | a31 | b31 | #6 |
| | | | | X/Y Hz | a32 | b32 | #7 |
| | | 2 GHz | — | X Hz | a33 | b33 | #8 |
| | | | | X/Y Hz | a34 | b34 | #9 |
| FOURTH WIRELESS COMMUNICATION METHOD | CELL-PHONE | 10 GHz | — | — | a41 | b41 | #10 |
| | | 15 GHz | — | — | a42 | b42 | #11 |
| FIFTH WIRELESS COMMUNICATION METHOD | HIGH-SPEED WIRELESS LAN | 20 GHz | — | — | a51 | b51 | #12 |
| | | 60 GHz | ON | P Hz | a52 | b52 | #13 |
| | | | | P/Q Hz | a53 | b53 | #14 |
| | | | OFF | P Hz | a54 | b54 | #15 |
| | | | | P/Q Hz | a55 | b55 | #16 |

FIG. 21

| WIRELESS COMMUNICATION METHOD | NAME | FREQUENCY | MIMO MISO ON/OFF | FREQUENCY BAND | $SAR_1$ | $SAR_2$ | $SAR_3$ | $SAR_4$ | SELECTION NUMBER |
|---|---|---|---|---|---|---|---|---|---|
| FIRST WIRELESS COMMUNICATION METHOD | WIRELESS LAN | 2.4 GHz | ON | 20 MHz | a11 | b11 | — | — | #1 |
| | | | | 20/40 MHz | a12 | b12 | — | — | #2 |
| | | | OFF | 20 MHz | a13 | b13 | — | — | #3 |
| | | | | 20/40 MHz | a14 | b14 | — | — | #4 |
| SECOND WIRELESS COMMUNICATION METHOD | BLUETOOTH | 2.4 GHz | — | — | a21 | b21 | — | — | #5 |
| THIRD WIRELESS COMMUNICATION METHOD | FOURTH-GENERATION CELL-PHONE | 800 MHz | — | X Hz | a31 | b31 | — | — | #6 |
| | | | | X/Y Hz | a32 | b32 | — | — | #7 |
| | | 2 GHz | — | X Hz | a33 | b33 | — | — | #8 |
| | | | | X/Y Hz | a34 | b34 | — | — | #9 |
| FOURTH WIRELESS COMMUNICATION METHOD | CELL-PHONE | 10 GHz | — | — | — | — | c41 | d41 | #10 |
| | | 15 GHz | — | — | — | — | c42 | d42 | #11 |
| | | 20 GHz | — | — | — | — | c51 | d51 | #12 |
| FIFTH WIRELESS COMMUNICATION METHOD | HIGH-SPEED WIRELESS LAN | 60 GHz | ON | P Hz | — | — | c52 | d52 | #13 |
| | | | | P/Q Hz | — | — | c53 | d53 | #14 |
| | | | OFF | P Hz | — | — | c54 | d54 | #15 |
| | | | | P/Q Hz | — | — | c55 | d55 | #16 |

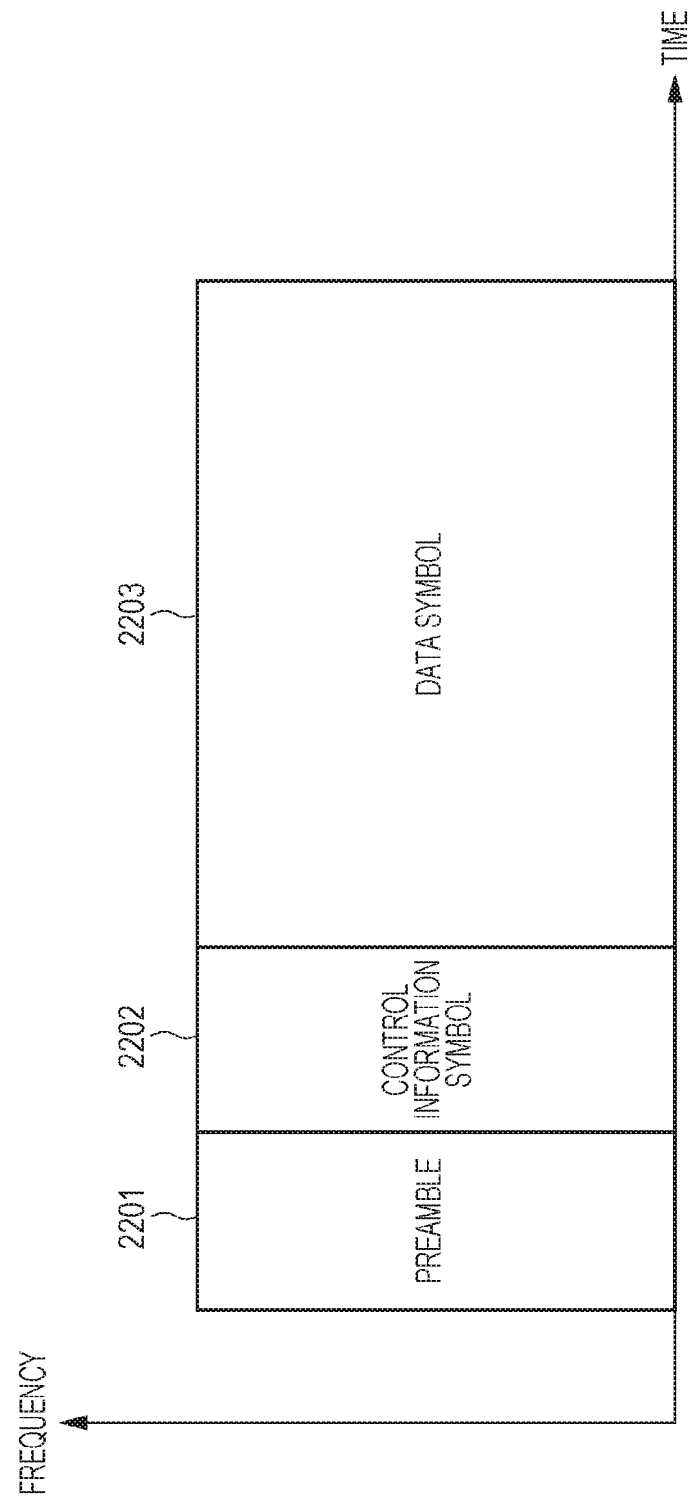

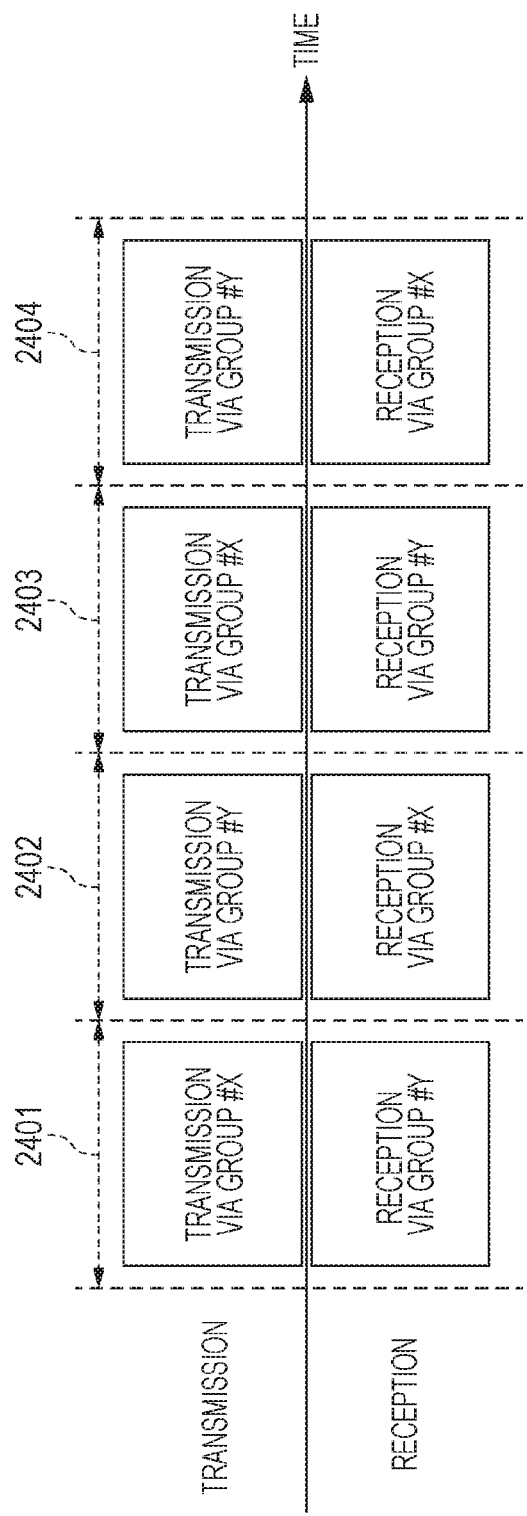

TERMINAL APPARATUS AND COMMUNICATION METHOD

BACKGROUND

1. Technical Field

The present disclosure relates to a method for controlling a specific absorption rate during transmission of a plurality of modulation signals by using a plurality of wireless communication methods.

2. Description of the Related Art

In wireless communication, there have been pointed out the influence of electromagnetic waves transmitted from communication devices on the human body, and the standards have been set for an allowable level of electromagnetic waves for the human body. For example, a specific absorption rate (SAR) that is an amount of energy absorbed per unit mass of tissues per unit time is used as an index. Here, the larger the SAR value, the greater the influence on the human body. Therefore, it is demanded to suppress the SAR value to a specified value (a threshold value) or less.

Meanwhile, it has been recently demanded to put a small terminal (wearable terminal) to practical use, and to simultaneously transmit two or more modulation signals by using two or more wireless communication methods. It is required to realize a control method for suppressing the total SAR value to a specified value (a threshold value) or less when the small terminal simultaneously transmits two or more modulation signals by using two or more wireless communication methods.

For example, Japanese Unexamined Patent Application Publication No. 2014-78904 describes a method for, when the human body is present near a communication device, reducing the total value of SARs attributed to radio waves outputted from a plurality of wireless communication interfaces included in the communication device to thereby suppress the total value to a predetermined value or less.

SUMMARY

However, in Japanese Unexamined Patent Application Publication No. 2014-78904, there has been no study conducted on a method for a small terminal capable of using a plurality of wireless communication methods, for example, to select a combination of two or more simultaneously operable wireless communication methods among the plurality of wireless communication methods so that the total SAR value is equal to or less than a threshold value.

One non-limiting and exemplary embodiment provides a terminal apparatus and a communication method which enables a wireless communication device capable of transmitting a plurality of modulation signals by using a plurality of wireless communication methods to select a combination of two or more simultaneously operable wireless communication methods so that the total SAR value is equal to or less than a threshold value even when the number of wireless communication methods supportable by the wireless communication device is increased.

In one general aspect, the techniques disclosed here feature a terminal apparatus including: control circuitry that generates one or more groups, each group including a selected plurality of communication methods whose total value of specific absorption rates (SARs) is equal to or less than a threshold value, and generates group information indicating the one or more groups; and a transmitter that transmits transmission data to a plurality of communication stations that respectively support the selected plurality of communication methods included in one group that is indicated by the group information, by corresponding communication methods.

According to one aspect of the present disclosure, a combination of two or more simultaneously operable wireless communication methods can be selected so that the total SAR value is equal to or less than a threshold value even when the number of wireless communication methods that can be supported by a communication device is increased.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a table showing a first example of a correspondence relationship between wireless communication methods and SARs;

FIG. 6 is a table showing a second example of the correspondence relationship between the wireless communication methods and SARs;

FIG. 7 is a table showing a third example of the correspondence relationship between the wireless communication methods and SARs;

FIG. 8 is a diagram showing a first example of a screen displaying group information;

FIG. 9 is a diagram showing a second example of the screen displaying group information;

FIG. 12 is a table showing a fourth example of the correspondence relationship between the wireless communication methods and SARs;

FIG. 14 is a table showing a fifth example of the correspondence relationship between the wireless communication methods and SARs;

FIG. 15 is a table showing a sixth example of the correspondence relationship between the wireless communication methods and SARs;

FIG. 16 is a table showing a seventh example of the correspondence relationship between the wireless communication methods and SARs;

FIG. 17 is a table showing an eighth example of the correspondence relationship between the wireless communication methods and SARs;

FIG. 18 is a table showing a ninth example of the correspondence relationship between the wireless communication methods and SARs;

FIG. 19 is a table showing a tenth example of the correspondence relationship between the wireless communication methods and SARs;

FIG. 20 is a table showing an eleventh example of the correspondence relationship between the wireless communication methods and SARs;

FIG. 21 is a table showing a twelfth example of the correspondence relationship between the wireless communication methods and SARs;

FIG. 22 is a diagram showing an example of a frame configuration of a transmission signal;

FIG. 24 is a diagram showing an example of the timing of switching between groups.

DETAILED DESCRIPTION

With reference to the drawings, embodiments of the present disclosure are described in detail below. Note that the embodiments described below are merely examples, and the present disclosure is not limited to these embodiments.

Embodiment 1

Figure 1:
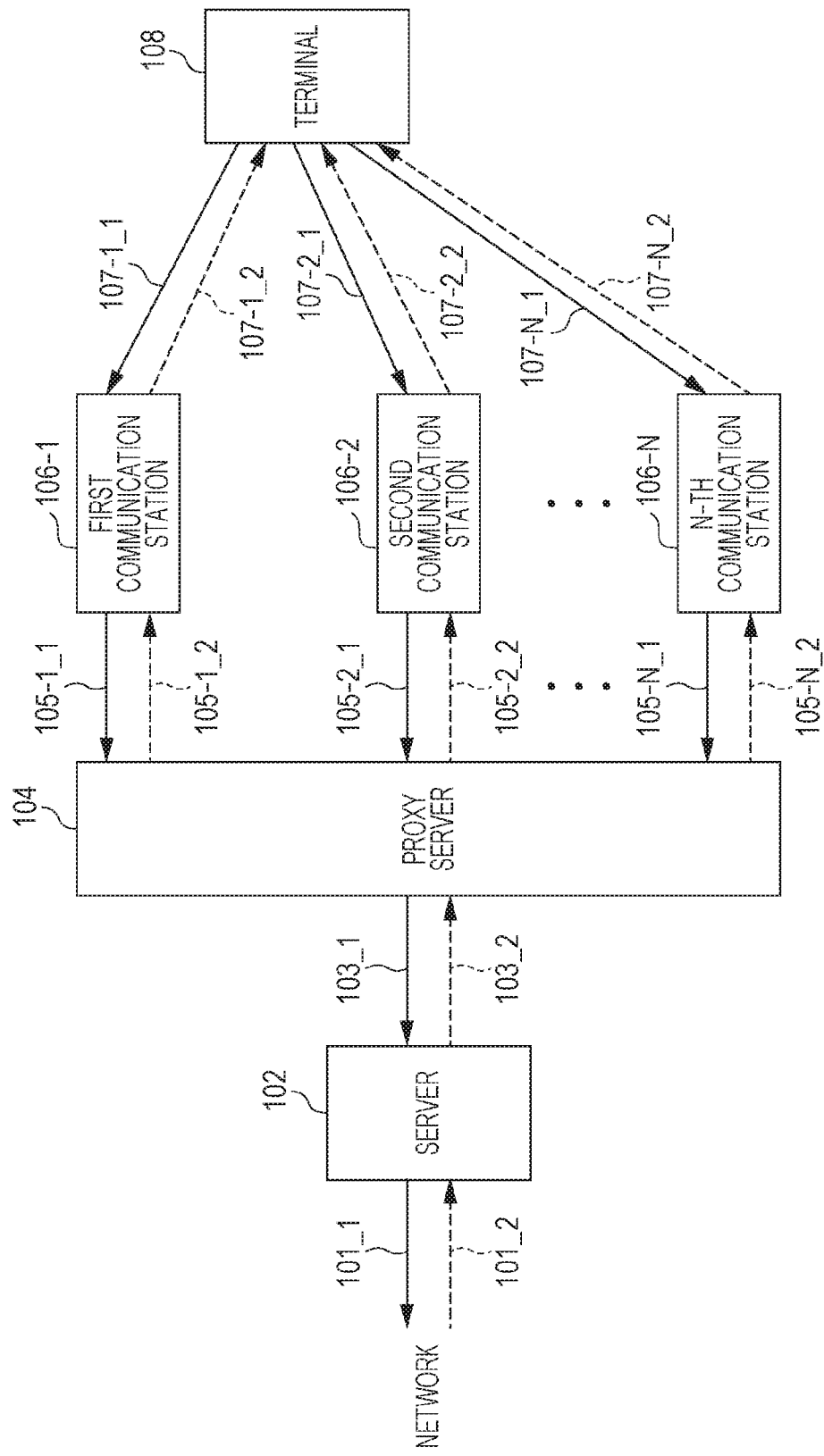
FIG. 1 is a diagram showing an example of a communication state in Embodiment 1.

FIG. 1 is a diagram showing an example of a communication state in this embodiment. It is assumed that a terminal 108 is a terminal capable of supporting transmission and reception through a plurality of wireless communication methods. In this event, it is assumed that the number of wireless communication methods that can be supported by the terminal 108 is N (N is an integer of 2 or more or N is an integer of 3 or more). N different wireless communication methods are called the "first wireless communication method", "second wireless communication method", "third wireless communication method", . . . , and "N-th wireless communication method". More specifically, there is an "i-th wireless communication method" (i is an integer of 1 to N).

As shown in FIG. 1, the terminal 108 uses the "first wireless communication method" to communicate with a first communication station 106-1. Note that 107-1_1 in FIG. 1 means that the terminal 108 transmits a modulation signal and the first communication station 106-1 receives the modulation signal. On the other hand, 107-1_2 means that the first communication station 106-1 transmits a modulation signal and the terminal 108 receives the modulation signal.

Moreover, the terminal 108 uses the "second wireless communication method" to communicate with a second communication station 106-2. Note that 107-2_1 in FIG. 1 means that the terminal 108 transmits a modulation signal and the second communication station 106-2 receives the modulation signal. On the other hand, 107-2_2 means that the second communication station 106-2 transmits a modulation signal and the terminal 108 receives the modulation signal.

Moreover, the terminal 108 uses the "N-th wireless communication method" to communicate with an N-th communication station 106-N. Note that 107-N_1 in FIG. 1 means that the terminal 108 transmits a modulation signal and the N-th communication station 106-N receives the modulation signal. On the other hand, 107-N_2 means that the N-th communication station 106-N transmits a modulation signal and the terminal 108 receives the modulation signal.

As described above, the terminal 108 uses the "i-th wireless communication method" to communicate with an i-th communication station (note that i is an integer of 1 to N).

The first communication station 106-1 communicates with a proxy server 104. Therefore, the first communication station 106-1 may transmit data to the proxy server 104 (105-1_1) or may receive data from the proxy server 104 (105-1_2).

Similarly to the first 106-1, the second communication station 106-2 communicates with a proxy server 104. Therefore, the second communication station 106-2 may transmit data to the proxy server 104 (105-2_1) or may receive data from the proxy server 104 (105-2_2).

The N-th communication station 106-N communicates with a proxy server 104. Therefore, the N-th communication station 106-N may transmit data to the proxy server 104 (105-N_1) or may receive data from the proxy server 104 (105-N_2).

As described above, the i-th communication station communicates with the proxy server 104, and the i-th communication station may transmit data to the proxy server 104 or may receive data from the proxy server 104 (note that i is an integer of 1 to N).

The proxy server 104 communicates with the i-th communication station (i is an integer of 1 to N) as described above, and also communicates with a server 102. Therefore, the proxy server 104 may transmit data to the server 102 (103_1) or may receive data from the server 102 (103_2).

The server 102 communicates with the proxy server 104 as described above, and may transmit data to a network (101_1) or may receive data from the network (101_2).

[First Method for Acquiring Data from Network]

Next, with reference to FIG. 1, description is given of a first method for the terminal 108 to acquire data from the network, as a specific example of communication. Here, description is given of a case where the terminal 108 acquires a content (or application) #A on the network. The terminal 108 acquires the content (or application) #A from the network through the proxy server 104 and the server 102. In this event, in the example of FIG. 1, the terminal 108 acquires data of the content (or application) #A from a combination of a plurality of communication stations among N communication stations including the first communication station 106-1, a second communication station 106-2, . . . , and an N-th communication station 106-N. In this event, the terminal 108 or the proxy server 104 may have the right to select such a combination of a plurality of communication stations, as described later.

<When Proxy Server 104 has the Right to Select>

Next, description is given of a case where the proxy server 104 has the right to select a combination of communication stations. In this case, the proxy server 104 selects a plurality of communication stations to transmit the data of the content (or application) #A. Then, the proxy server 104 allocates the data of the content (or application) #A to the plurality of selected communication stations.

For example, when the proxy server 104 selects the first communication station 106-1 and the second communication station 106-2 to transmit the data of the content (or application) #A, the proxy server 104 allocates the data of the content (or application) #A acquired through the server 102 to 105-1_2 and 105-2_2.

Note that, here, the description is given of the case where the proxy server 104 has the right to select and allocates the data to the plurality of communication stations. Alternatively, an electronic device such as a computer connected to the proxy server 104 may have the right to select and allocate the data to a plurality of communication stations. Also, the proxy server 104 may be the server 102, and the proxy server and the server may be called differently (the names thereof are not limited to the server and the proxy server).

<When Terminal 108 has the Right to Select>

Next, description is given of a case where the terminal 108 has the right to select a combination of communication stations. In this case, the terminal 108 selects a plurality of communication stations to acquire the data of the content (or application) #A. Then, the terminal 108 transmits information (group information) indicating a combination of the communication stations selected to acquire the data of the content (or application) #A to the proxy server 104 through any of the communication stations. In response, the proxy server 104 allocates the data of the content (or application) #A to the plurality of communication stations included in the selected combination, based on the group information.

For example, when the first communication station 106-1 and the second communication station 106-2 are included as one of the selected combinations, the proxy server 104 allocates the data of the content (or application) #A acquired through the server 102 to 105-1_2 and 105-2_2.

Note that, here, the description is given of the case where the proxy server 104 receives the group information and allocates the data to the plurality of communication stations based on the group information. Alternatively, an electronic device such as a computer connected to the proxy server 104 may receive the group information and allocate the data to a plurality of communication stations. Also, the proxy server 104 may be the server 102, and the proxy server and the server may be called differently (the names thereof are not limited to the server and the proxy server).

As described above, the terminal 108 acquires data from a combination of a plurality of communication stations. In this event, data packet loss may occur depending on a radio propagation environment.

In this event, if packet loss occurs when the terminal 108 receives the data transmitted by the first communication station 106-1, for example, the terminal 108 transmits a modulation signal for requesting the first communication station 106-1 to retransmit the data. Alternatively, the terminal 108 may transmit not only the modulation signal for retransmit request but also a modulation signal for transmitting data and control information to the first communication station 106-1. The same may occur for communication between the terminal 108 and each of the communication stations.

Thus, the terminal 108 may transmit a modulation signal to each of the plurality of communication stations by using a communication method corresponding thereto.

In this case, the terminal 108 simultaneously transmits a plurality of modulation signals to the plurality of communication stations by using a plurality of different communication methods. Therefore, electromagnetic waves transmitted from the terminal 108 are increased according to the number of the modulation signals. Accordingly, an SAR of the electromagnetic waves transmitted from the terminal 108 also tends to be increased according to the number of the modulation signals. The SAR for simultaneously transmitting a plurality of modulation signals tends to be larger than that for transmitting a single modulation signal. In such a situation, it is sometimes difficult to "suppress the SAR to a given specified value or less". The present disclosure provides an invention to "suppress the SAR to a given specified value or less" in such a situation.

Figure 2:
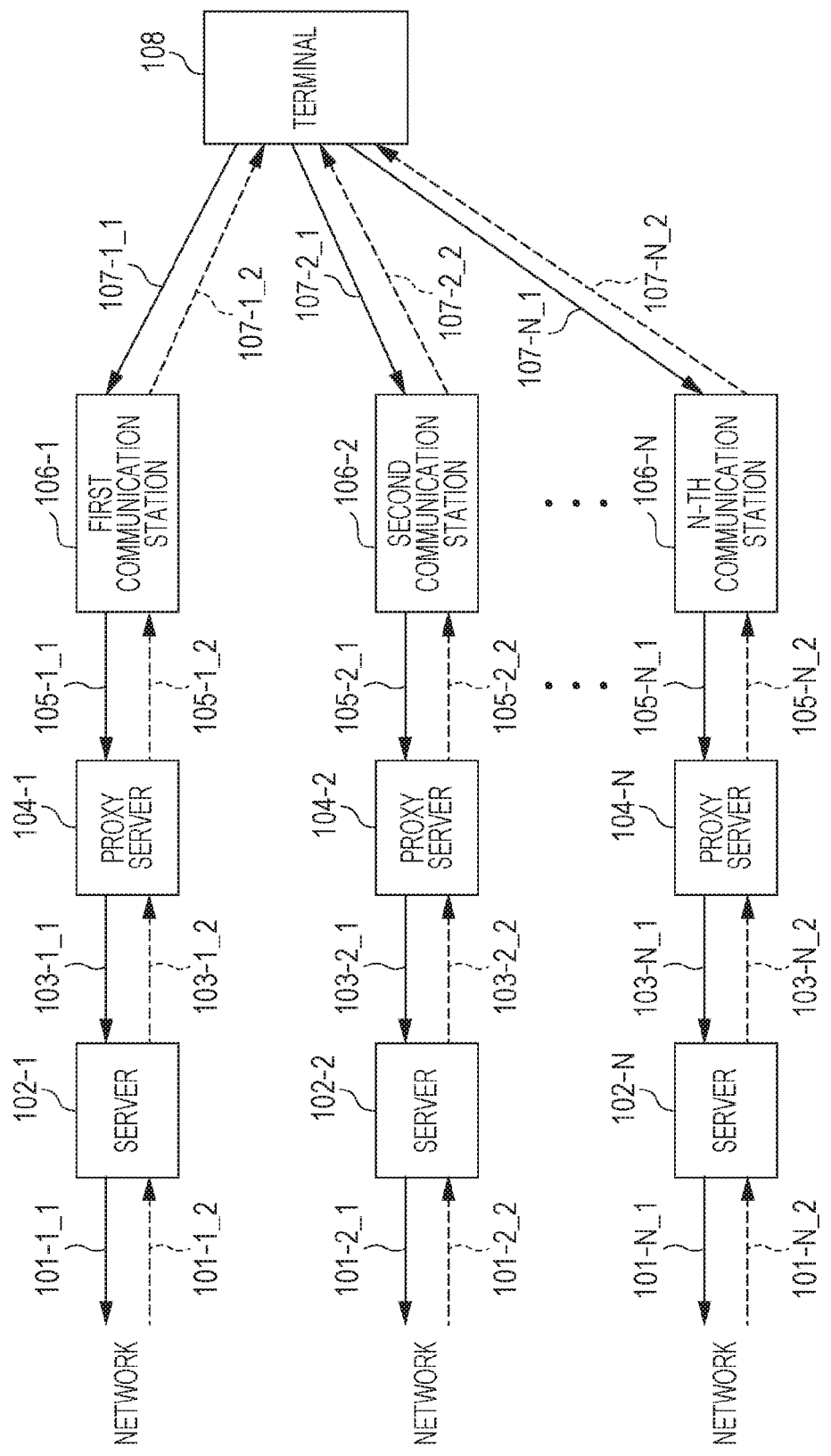
FIG. 2 is a diagram showing another example of the communication state in Embodiment 1.

In the meantime, description is given of a communication state different from that shown in FIG. 1. FIG. 2 is a diagram showing another example of the communication state in Embodiment 1. The same portions as those in FIG. 1 are denoted by the same reference numerals as those in FIG. 1, and description of the portions described with reference to FIG. 1 is omitted.

The first communication station 106-1 communicates with a proxy server 104-1. Therefore, the first communication station 106-1 may transmit data (105-1) or may receive data (105-2).

Similarly to the first 106-1, the second communication station 106-2 communicates with a proxy server 104-2. Therefore, the second communication station 106-2 may transmit data (106-1) or may receive data (106-2). The N-th communication station 106-N communicates with a proxy server 104-N. Therefore, the N-th communication station 106-N may transmit data (107-1) or may receive data (107-2).

Therefore, the i-th communication station communicates with a proxy server 104-$i$, and the i-th communication station may transmit or receive data (note that i is an integer of 1 to N).

Each of the proxy servers communicates with one of the communication stations as described above, and also communicates with a server.

The proxy server 104-1 communicates with a server 102-1. Therefore, the proxy server 104-1 may transmit data (103-1_1) or may receive data (103-1_2). Similarly to the proxy server 104-1, the proxy server 104-2 communicates with a server 102-2. Therefore, the proxy server 104-2 may transmit data (103-2_1) or may receive data (103-2_2). The proxy server 104-N communicates with a server 102-N. Therefore, the proxy server 104-N may transmit data (103-N_1) or may receive data (103-N_2).

Accordingly, the proxy server 104-$i$ communicates with a server 102-$i$. Therefore, the proxy server 104-$i$ may transmit data (103-$i$_1) or may receive data (103-$i$_2).

Each of the servers communicates with one of the proxy servers as described above, and also communicates with a network.

The server 102-1 may transmit data to the network (101-1_1) or may receive data (101-1_2). Similarly to the server 102-1, the server 102-2 may transmit data to the network (101-2_1) or may receive data (101-2_2). The server 102-N may transmit data to the network (101-N_1) or may receive data (101-N_2).

Therefore, the server 102-$i$ may transmit data to the network (101-$i$_1) or may receive data (101-$i$_2).

[Second Method for Acquiring Data from Network]

Next, with reference to FIG. 2, description is given of a second method for the terminal 108 to acquire data from the network, as a specific example of communication. Here, description is given of a case where the terminal 108 acquires a plurality of contents (or applications) on the network. For example, it is assumed that the terminal 108 acquires a content (or application) #A and another content (application) #B. In this event, it is assumed in the second method that the terminal 108 acquires data of the content (or application) #A and data of the content (application) #B from different communication stations.

For example, it is assumed in FIG. 2 that the terminal 108 acquires the data of the content (or application) #A from the first communication station 106-1 and acquires the data of the content (application) #B from the second communication station 106-2.

In this event, the first communication station 106-1 acquires the data of the content (or application) #A through the proxy server 104-1 and the server 102-1. Likewise, the second communication station 106-2 acquires the data of the content (or application) #B through the proxy server 104-2 and the server 102-2.

As described above, the terminal 108 acquires the data of the plurality of contents (or applications) through the plurality of communication stations. In this event, data packet loss may occur depending on a propagation environment.

In this event, if packet loss occurs when the terminal 108 receives the data transmitted by the first communication station 106-1, for example, the terminal 108 transmits a modulation signal for requesting the first communication station 106-1 to retransmit the data. Alternatively, the terminal 108 may transmit not only the modulation signal for retransmit request but also a modulation signal for transmitting data and control information to the first communication station 106-1. The same may occur for communication between the terminal 108 and each of the communication stations.

Thus, the terminal 108 may transmit a modulation signal to each of the plurality of communication stations by using a communication method corresponding thereto.

In this case, the terminal 108 simultaneously transmits a plurality of modulation signals to the plurality of communication stations by using a plurality of different communication methods. Therefore, electromagnetic waves transmitted from the terminal 108 are increased according to the number of the modulation signals. Accordingly, an SAR of the electromagnetic waves transmitted from the terminal 108 also tends to be increased according to the number of the modulation signals. The SAR for simultaneously transmitting a plurality of modulation signals tends to be larger than that for transmitting a single modulation signal. In such a situation, it is sometimes difficult to "suppress the SAR to a given specified value or less". The present disclosure provides an invention to "suppress the SAR to a given specified value or less" in such a situation.

[Third Method for Acquiring Data from Network]

Here, with reference to FIG. 1, description is given of a third method obtained by combining the first method and the second method described above. Here, description is given of a case where the terminal 108 acquires a plurality of contents (or applications) on the network. For example, it is assumed that the terminal 108 acquires a content (or application) #A and a content (or application) #B. In this event, it is assumed in the third method that the terminal 108 acquires the content (or application) #A from one or more communication stations, and acquires the content (or application) #B from one or more communication stations. More specifically, the terminal 108 acquires two contents from a combination of a plurality of communication stations.

In this event, the terminal 108 or the proxy server 104 may have the right to select such a combination of a plurality of communication stations and/or the right for allocation as to from which communication station the terminal acquires each content, as described below.

<When Proxy Server has the Right to Select>

Next, description is given of a case where the proxy server 104 has the right to select a communication station to transmit data of the content (or application) #A and/or the right to select a communication station to transmit data of the content (or application) #B. In this case, the proxy server 104 selects one or more communication stations for transmitting each of the data of the content (or application) #A and the data of the content (or application) #B. Then, the proxy server 104 allocates the data of the content (or application) #A to the selected one or more communication stations, and/or allocates the data of the content (or application) #B to the selected one or more communication stations.

For example, it is assumed that the proxy server 104 selects the first communication station 106-1 and the second communication station 106-2 for transmitting the data of the content (or application) #A, and selects the N-th communication station for transmitting the data of the content (or application) #A. In this case, the proxy server 104 allocates the data of the content (or application) #A acquired through the server 102 to 105-1_2 and 105-2_2. Then, the proxy server 104 allocates the data of the content (or application) #B acquired through the server 102 to 105-N_2.

Note that, here, the description is given of the case where the proxy server 104 has the right to select and allocates the data to the plurality of communication stations. Alternatively, an electronic device such as a computer connected to the proxy server 104 may have the right to select and allocate the data to a plurality of communication stations. Also, the proxy server 104 may be the server 102, and the proxy server and the server may be called differently (the names thereof are not limited to the server and the proxy server).

<When Terminal has the Right to Select>

Next, description is given of a case where the terminal 108 has the right to select a combination of communication stations to transmit the data of the content (or application) #A and/or the right to select a combination of communication stations to transmit the data of the content (or application) #B. In this case, the terminal 108 selects a plurality of communication stations to acquire the data of the content (or application) #A and a plurality of communication stations to acquire the data of the content (or application) #B. Then, the terminal 108 transmits information (group information A) indicating a combination of the communication stations selected to acquire the data of the content (or application) #A and/or information (group information B) indicating a combination of the communication stations selected to acquire the data of the content (or application) #B to the proxy server 104 through any of the communication stations. In response, the proxy server 104 allocates the data of the content (or application) #A to the plurality of communication stations included in the selected combination, based on the group information A. Also, the proxy server 104 allocates the data of the content (or application) #B to the plurality of communication stations included in the selected combination, based on the group information B.

For example, when the combination of the communication stations selected to acquire the data of the content (or application) #A includes the first communication station 106-1 and the second communication station 106-2, the proxy server 104 allocates the data of the content (or application) #A acquired through the server 102 to 105-1_2 and 105-2_2. Also, when the combination of the communication stations selected to acquire the data of the content #B includes the N-th communication station 106-N, the proxy server 104 allocates the data of the content (or application) #B acquired through the server 102 to 105-N_2.

Note that, here, the description is given of the case where the proxy server 104 receives the group information and allocates the data to the plurality of communication stations based on the group information. Alternatively, an electronic device such as a computer connected to the proxy server 104 may receive the group information and allocate the data to a plurality of communication stations. Also, the proxy server 104 may be the server 102, and the proxy server and the server may be called differently (the names thereof are not limited to the server and the proxy server).

As described above, the terminal 108 acquires data from a plurality of communication stations. In this event, data packet loss may occur depending on a radio propagation environment.

In this event, if packet loss occurs when the terminal 108 receives the data transmitted by the first communication station 106-1, for example, the terminal 108 transmits a modulation signal for requesting the first communication station 106-1 to retransmit the data. Alternatively, the terminal 108 may transmit not only the modulation signal for retransmit request but also a modulation signal for transmitting data and control information to the first communication station 106-1. The same may occur for communication between the terminal 108 and each of the communication stations.

Thus, the terminal 108 may transmit a modulation signal to each of the plurality of communication stations by using a communication method corresponding thereto.

In this case, the terminal 108 simultaneously transmits a plurality of modulation signals to the plurality of communication stations by using a plurality of different communication methods. Therefore, electromagnetic waves transmitted from the terminal 108 are increased according to the number of the modulation signals. Accordingly, an SAR of the electromagnetic waves transmitted from the terminal 108 also tends to be increased according to the number of the modulation signals. The SAR for simultaneously transmitting a plurality of modulation signals tends to be larger than that for transmitting a single modulation signal. In such a situation, it is sometimes difficult to "suppress the SAR to a given specified value or less". The present disclosure provides an invention to "suppress the SAR to a given specified value or less" in such a situation.

It is assumed that the terminal according to the present disclosure transmits and receives data by using any one of the three methods as described above, for example. Note, however, that the terminal may switch the methods for transmitting and receiving data between any of a plurality of methods including the three methods described above, according to a situation (by taking into consideration communication situation, data size, load on network, load on terminal apparatus, and the like).

Hereinafter, description is given of a method for reducing the SAR when the terminal transmits a plurality of modulation signals by using a plurality of communication methods, in a communication mode including the communication mode described above.

Figure 3:
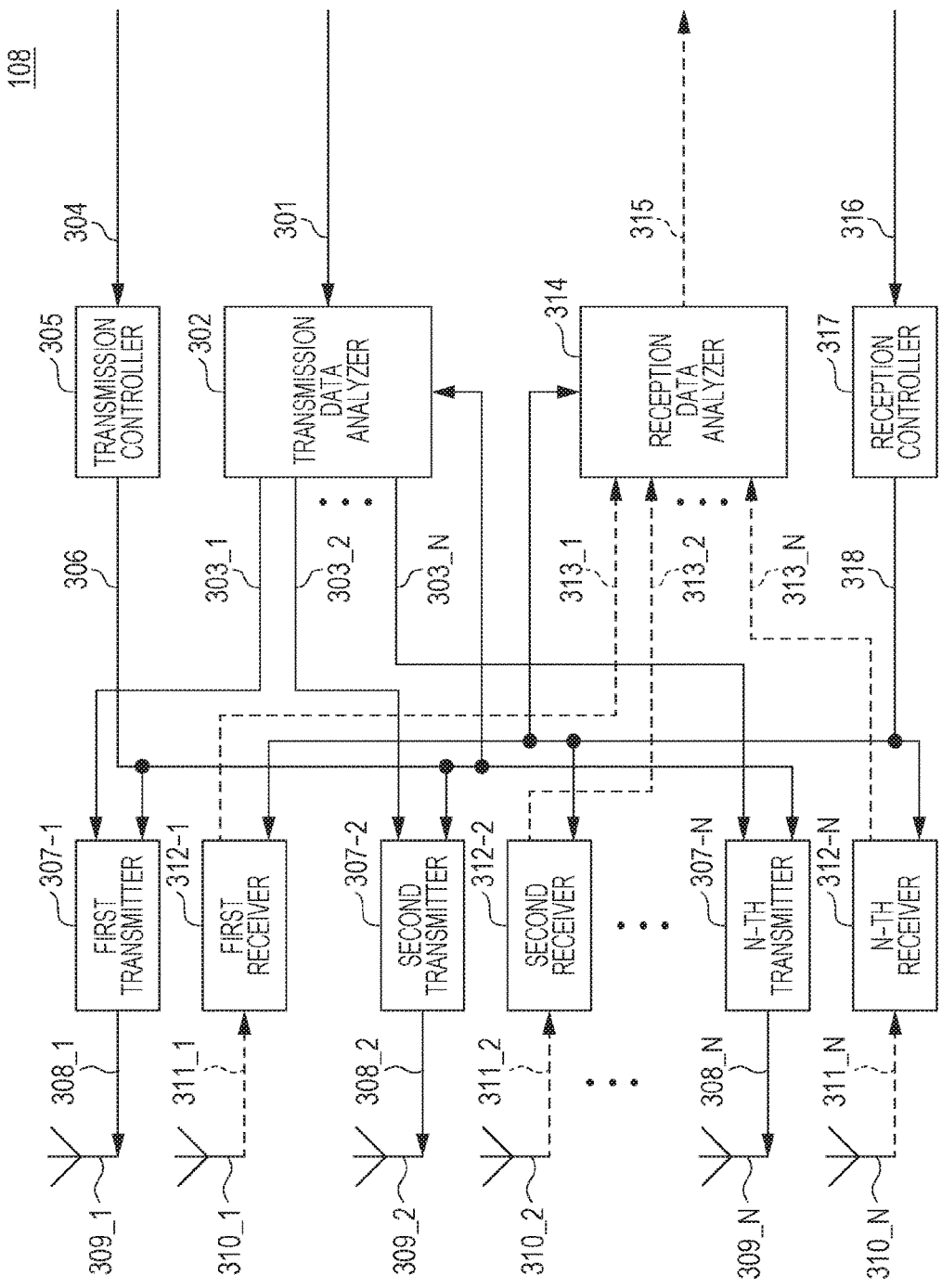
FIG. 3 is a diagram showing an example of a configuration of a terminal according to Embodiment 1.

FIG. 3 is a diagram showing an example of a configuration of the terminal 108 according to this embodiment.

A transmission controller 305 receives transmission control information 304 and outputs a transmission control signal 306 based on the transmission control information 304. The transmission control information 304 includes information for transmission processing with each wireless communication method, such as error correction coding, modulation (mapping), frequency conversion, and amplification, on data transmitted by each transmitter. The transmission control information 304 also includes information about a user of the terminal operating an unillustrated display unit. Note that operations are described in detail later.

A reception controller 317 receives reception control information 316 and outputs a reception control signal 318 based on the reception control information 316. The reception control information 316 includes information for reception processing with each wireless communication method, such as frequency conversion, demodulation, and error correction decoding, on a signal received by each receiver.

A transmission data analyzer 302 receives transmission information 301 and the transmission control signal 306, and controls the transmission information 301 to output first transmission data 303_1, second transmission data 303_2, ... and N-th transmission data 303_N, based on the transmission control signal 306. More specifically, the transmission data analyzer 302 outputs i-th transmission data 303_*i* (i is an integer of 1 to N (N is an integer of 2 or more or an integer of 3 or more)).

A first transmitter 307_1 receives the first transmission data 303_1 and the transmission control signal 306, and performs processing such as error correction coding, modulation (mapping), frequency conversion, and amplification (performs transmission processing with the "first wireless communication method") on the first transmission data 303_1, based on the transmission control signal 306, to output a first transmission signal 308_1. The first transmission signal 308_1 is outputted as a radio wave from a first transmission antenna 309_1.

A second transmitter 307_2 receives the second transmission data 303_2 and the transmission control signal 306, and performs processing such as error correction coding, modulation (mapping), frequency conversion, and amplification (performs transmission processing with the "second wireless communication method") on the second transmission data 303_2, based on the transmission control signal 306, to output a second transmission signal 308_2. The second transmission signal 308_2 is outputted as a radio wave from a second transmission antenna 309_2.

An N-th transmitter 307_N receives the N-th transmission data 303_N and the transmission control signal 306, and performs processing such as error correction coding, modulation (mapping), frequency conversion, and amplification (performs transmission processing with the "N-th wireless communication method") on the N-th transmission data 303_N, based on the transmission control signal 306, to output an N-th transmission signal 308_N. The N-th transmission signal 308_N is outputted as a radio wave from an N-th transmission antenna 309_N.

Similarly, an i-th transmitter 307_*i* receives the i-th transmission data 303_*i* and the transmission control signal 306, and performs processing such as error correction coding, modulation (mapping), frequency conversion, and amplification (performs transmission processing with the "i-th wireless communication method") on the i-th transmission data 303_*i*, based on the transmission control signal 306, to output an i-th transmission signal 308_*i*. The i-th transmission signal 308_*i* is outputted as a radio wave from an i-th transmission antenna 309_*i* (i is an integer of 1 to N).

A first receiver 312_1 receives a first reception signal 311_1 received by a first reception antenna 310_1 and the reception control signal 318, and performs reception processing (frequency conversion, demodulation, error correction decoding, and the like) (performs reception processing with the "first wireless communication method") on the first reception signal 311_1, based on the reception control signal 318, to output first reception data 313_1.

A second receiver 312_2 receives a second reception signal 311_2 received by a second reception antenna 310_2 and the reception control signal 318, and performs reception processing (frequency conversion, demodulation, error correction decoding, and the like) (performs reception processing with the "second wireless communication method") on the second reception signal 311_2, based on the reception control signal 318, to output second reception data 313_2.

An N-th receiver 312_N receives an N-th reception signal 311_N received by an N-th reception antenna 310_N and the reception control signal 318, and performs reception processing (frequency conversion, demodulation, error correction decoding, and the like) (performs reception processing with the "N-th wireless communication method") on the N-th reception signal 311_N, based on the reception control signal 318, to output N-th reception data 313_N.

Similarly, an i-th receiver 312_i receives an i-th reception signal 311_i received by an i-th reception antenna 310_i and the reception control signal 318, and performs reception processing (frequency conversion, demodulation, error correction decoding, and the like) (performs reception processing with the "i-th wireless communication method") on the i-th reception signal 311_i, based on the reception control signal 318, to output i-th reception data 313_i (i is an integer of 1 to N).

A reception data analyzer 314 receives first reception data 313_1, second reception data 313_2, . . . and N-th reception data 313_N (that is, i-th reception data 313_i (i is an integer of 1 to N (N is an integer of 2 or more or an integer of 3 or more)) and the reception control signal 318, and outputs reception data 315 based on the reception control signal 318.

With the configuration of FIG. 3, the communication, particularly, simultaneous reception of a plurality of modulation signals and simultaneous transmission of a plurality of modulation signals are performed, which are described with reference to FIGS. 1 and 2.

Note that although the antennas are connected to the respective transmitters and the respective receivers in FIG. 3, the present disclosure is not limited thereto. For example, the transmission antennas and the reception antennas may be shared by the respective communication methods. Alternatively, the antennas may be shared by the plurality of transmitters and the plurality of receivers. Alternatively, a plurality of antennas may be connected to each transmitter and each receiver.

Moreover, in the present disclosure, each transmitter may transmit a plurality of signals, and each receiver may receive a plurality of signals. For example, each transmitter may be configured to transmit a plurality of modulation signals different from each other in frequency, frequency band, the number of transmission antennas, and the like in a supported wireless communication method. In this case, a plurality of transmission signals may be inputted to each transmitter. Meanwhile, each receiver may be configured to receive a plurality of modulation signals different from each other in frequency, frequency band, the number of reception antennas, and the like in a supported wireless communication method. In this case, a plurality of reception signals may be outputted from each receiver.

Next, detailed description is given of operations for "suppressing the total SAR value to a given specified value or less" when the terminal simultaneously transmits modulation signals to a plurality of communication stations.

FIG. 4 is a table showing a first example of a correspondence relationship between wireless communication methods and SARs. The table shows, for example, information required for the transmission controller 305 in FIG. 3 to perform control shown in FIG. 5 (to be described later).

In the example of FIG. 4, a selection number #1 represents that the wireless communication method is the "first wireless communication method", the name of the communication method is "wireless LAN", the frequency to be used is 2.4 GHz, and the SAR is a11 when the terminal transmits modulation signals by using the method of the selection number #1.

A selection number #2 represents that the wireless communication method is the "first wireless communication method", the name of the communication method is "Wireless LAN", the frequency to be used is 5 GHz, and the SAR is a12 when the terminal transmits modulation signals by using the method of the selection number #2.

A selection number #3 represents that the wireless communication method is the "second wireless communication method", the name of the communication method is "Bluetooth (registered trademark)", the frequency to be used is 2.4 GHz, and the SAR is a21 when the terminal transmits modulation signals by using the method of the selection number #3.

A selection number #4 represents that the wireless communication method is the "third wireless communication method", the name of the communication method is "third-generation cell-phone", the frequency to be used is 800 MHz, and the SAR is a31 when the terminal transmits modulation signals by using the method of the selection number #4.

A selection number #5 represents that the wireless communication method is the "third wireless communication method", the name of the communication method is "third-generation cell-phone", the frequency to be used is 2 GHz, and the SAR is a32 when the terminal transmits modulation signals by using the method of the selection number #5.

A selection number #6 represents that the wireless communication method is the "fourth wireless communication method", the name of the communication method is "fourth-generation cell-phone", the frequency to be used is 800 MHz, and the SAR is a41 when the terminal transmits modulation signals by using the method of the selection number #6.

A selection number #7 represents that the wireless communication method is the "fourth wireless communication method", the name of the communication method is "fourth-generation cell-phone", the frequency to be used is 2 GHz, and the SAR is a42 when the terminal transmits modulation signals by using the method of the selection number #7.

Figure 5:
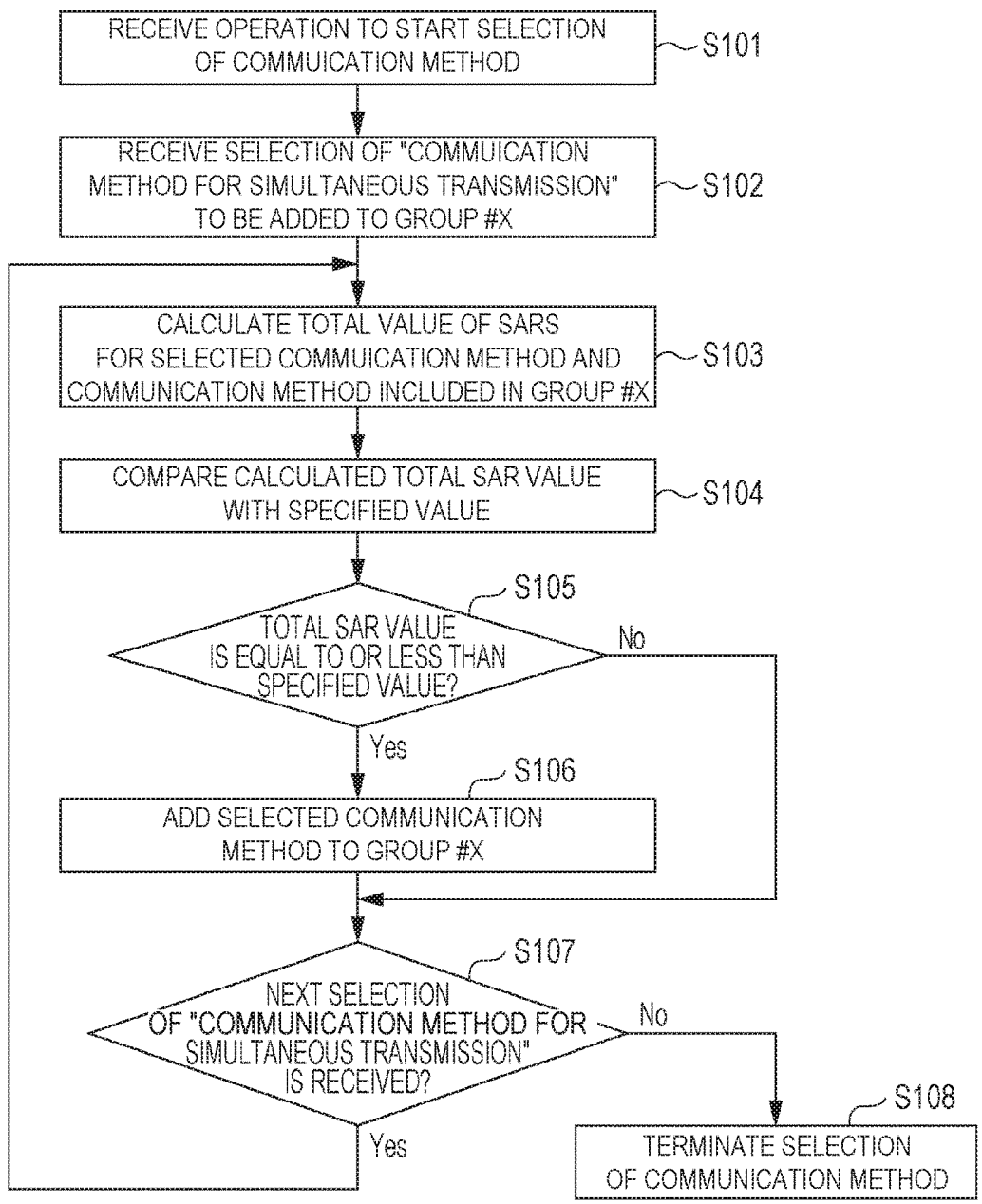
FIG. 5 is a flowchart showing a method for setting groups of wireless communication methods in Embodiment 1.

FIG. 5 is a flowchart showing a method for setting groups of wireless communication methods in this embodiment. FIG. 5 shows an example of operations performed by the transmission controller 305 in FIG. 3.

This embodiment is characterized in that "the user who uses the terminal sets a group including two or more wireless communication methods for use in simultaneous transmission" among a plurality of wireless communication methods supported by the terminal. An example of a setting method is described below. Note that this setting is executed by the transmission controller 305 in the terminal. In this case, the transmission controller 305 functions as a group generator.

For example, it is assumed that the terminal performs setting of a "group #X". With reference to FIG. 5, description is given of a method for setting the "group #X".

First, the transmission controller 305 in the terminal receives an operation to start selection of a communication method (S101). This operation is performed, for example, by the user operating an unillustrated display unit in the terminal.

Next, selection of "a communication method for simultaneous transmission" to be added to the group #X is received (S102). For example, a communication method for use in simultaneous transmission is selected from the selection numbers shown in FIG. 4. This operation is performed, for example, by the user operating the display unit.

Next, a total value of SARs for the communication method selected in S102 and for the communication method already included in the group #X is calculated (S103). Then, the total SAR value thus obtained is compared with a given specified value (S104).

When the total SAR value is not equal to or less than the given specified value (No in S105), the processing advances to S107 without adding the selected communication method to the group #X. On the other hand, when the total SAR value is equal to or less than the given specified value (Yes in S105), the selected communication method is added to the group #X (S106), and then the processing advances to S107.

Thereafter, the transmission controller 305 determines whether or not the next selection of a "communication method for simultaneous transmission" is received (S107). When the next selection of the "communication method for simultaneous transmission" is received (Yes in S107), the processing of S103 to S106 is performed. On the other hand, when the next selection of the "communication method for simultaneous transmission" is not received (No in S107), the selection of the communication method is terminated (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and a data transmission rate can be improved by using a plurality of modulation systems while realizing the condition that the total SAR value is equal to or less than the specified value.

Note that the terminal may follow the same procedure to generate and store a group other than the "group #X" (for example, a "group #Y", a "group #Z" or the like), to call up any one of the plurality of groups, and to transmit data by using a plurality of communication methods included in the group called up.

Furthermore, based on the table of FIG. 4, description is given of an example of performing the group setting shown in FIG. 5. For example, it is assumed that the terminal performs the setting of the "group #X". In this event, description is given of a specific example of the method for setting the "group #X" based on FIGS. 4 and 5.

After receiving the operation to start the selection of the communication method in S101, the terminal receives selection of the selection number "#6" in FIG. 4, for example, in S102. Next, in S103, an SAR is calculated when the selection number "#6" is selected. The SAR obtained as a result is a41, which is compared with the specified value in S104. When this value is equal to or less than the given specified value (Yes in S105), the selection number "#6" is added to the "group #X" in S106.

Next, it is determined in S107 whether or not the next selection of a "communication method for simultaneous transmission" is received. For example, it is assumed that the selection of the selection number "#5" in FIG. 4 is received (Yes in S107). In this case, the processing returns to S103 to calculate the total SAR value when the selection number "#5" is added to the group #X. Since a32 is the SAR value of the selection number "#5" (see FIG. 4), the total SAR value is a41+a32. In S104, the total SAR value is compared with the specified value. Then, when the total value is not equal to or less than the given specified value (No in S105), the selection number "#5" is not added to the "group #X".

Thereafter, it is determined in S107 whether or not the next selection of a "communication method for simultaneous transmission" is received. When the selection is performed by the user, the processing goes back again to S103.

Here, it is assumed that the selection of the selection number "#1" in FIG. 4 is received (Yes in S107). Then, in S103, the total SAR value when the selection number "#1" is added to the group #X is calculated. Since a11 is the SAR value of the selection number "#1" (see FIG. 4), the total SAR value is a41+a11. In S104, the total SAR value is compared with the specified value.

Then, when the total value is equal to or less than the given specified value (Yes in S105), the selection number "#1" is added to the "group #X" in S106. Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved by using a plurality of modulation systems while realizing the condition that the total SAR value is equal to or less than the specified value.

Next, description is given of a second example of the correspondence relationship between the wireless communication methods and SARs. FIG. 6 is a table showing the second example of the correspondence relationship between the wireless communication methods and SARs. Based on the table of FIG. 6, description is given of an example of performing the group setting shown in FIG. 5. Note that a difference between FIGS. 4 and 6 is that the selection number and the SAR are separated depending on the "on" or "off" of a multiple-input multiple-output (MIMO) system and a multiple-input single-output (MISO) system.

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system and no transmission using the MISO system (that is, transmission of modulation signals by using a single antenna).

In the example of FIG. 6, a selection number #1 represents that the wireless communication method is the "first wireless communication method", the name of the communication method is "wireless LAN", the frequency to be used is 2.4 GHz, the MIMO system or the MISO system is "on", and the SAR is a11 when the terminal transmits modulation signals by using the method of the selection number #1.

A selection number #2 represents that the wireless communication method is the "first wireless communication method", the name of the communication method is "Wireless LAN", the frequency to be used is 2.4 GHz, the MIMO system or the MISO system is "off", and the SAR is a12 when the terminal transmits modulation signals by using the method of the selection number #2.

A selection number #3 represents that the wireless communication method is the "first wireless communication method", the name of the communication method is "wireless LAN", the frequency to be used is 5 GHz, the MIMO system or the MISO system is "on", and the SAR is a13 when the terminal transmits modulation signals by using the method of the selection number #3.

A selection number #4 represents that the wireless communication method is the "first wireless communication method", the name of the communication method is "wireless LAN", the frequency to be used is 5 GHz, the MIMO system or the MISO system is "off", and the SAR is a14 when the terminal transmits modulation signals by using the method of the selection number #4.

A selection number #5 represents that the wireless communication method is the "second wireless communication method", the name of the communication method is "Bluetooth (registered trademark)", the frequency to be used is 2.4 GHz, and the SAR is a21 when the terminal transmits modulation signals by using the method of the selection number #5.

A selection number #6 represents that the wireless communication method is the "third wireless communication method", the name of the communication method is "third-generation cell-phone", the frequency to be used is 800 MHz, and the SAR is a31 when the terminal transmits modulation signals by using the method of the selection number #6.

A selection number #7 represents that the wireless communication method is the "third wireless communication method", the name of the communication method is "third-generation cell-phone", the frequency to be used is 2 GHz, and the SAR is a32 when the terminal transmits modulation signals by using the method of the selection number #7.

A selection number #8 represents that the wireless communication method is the "fourth wireless communication method", the name of the communication method is "fourth-generation cell-phone", the frequency to be used is 800 MHz, and the SAR is a41 when the terminal transmits modulation signals by using the method of the selection number #8.

A selection number #9 represents that the wireless communication method is the "fourth wireless communication method", the name of the communication method is "fourth-generation cell-phone", the frequency to be used is 2 GHz, and the SAR is a42 when the terminal transmits modulation signals by using the method of the selection number #9.

Based on the table of FIG. 6, description is given of an example of performing the group setting shown in FIG. 5.

For example, it is assumed that the terminal performs setting of the "group #Y". In this event, description is given of a specific example of the method for setting the "group #Y" based on FIGS. 5 and 6. Note that, in the following description, the "group #X" in FIG. 5 is replaced by the "group #Y".

After receiving the operation to start the selection of the communication method in S101, the terminal receives selection of the selection number "#6" in FIG. 6, for example, in S102. Next, in S103, an SAR is calculated when the selection number "#6" is selected. The SAR obtained as a result is a31, which is compared with the specified value in S104. When this value is equal to or less than the given specified value (Yes in S105), the selection number "#6" is added to the "group #Y" in S106.

Next, it is determined in S107 whether or not the next selection of a "communication method for simultaneous transmission" is received. For example, it is assumed that the selection of the selection number "#9" in FIG. 6 is received (Yes in S107). In this case, the processing returns to S103 to calculate the total SAR value when the selection number "#9" is added to the group #X. Since a42 is the SAR value of the selection number "#9" (see FIG. 6), the total SAR value is a31+a42. In S104, the total SAR value is compared with the specified value. Then, when the total value is not equal to or less than the given specified value (No in S105), the selection number "#9" is not added to the "group #Y".

Thereafter, it is determined in S107 whether or not the next selection of a "communication method for simultaneous transmission" is received. When the selection is performed by the user, the processing goes back again to S103.

Here, it is assumed that the selection of the selection number "#1" in FIG. 6 is received (Yes in S107). Then, in S103, the total SAR value when the selection number "#1" is added to the group #Y is calculated. Since a11 is the SAR value of the selection number "#1" (see FIG. 6), the total SAR value is a31+a11. In S104, the total SAR value is compared with the specified value. Then, when the total value is equal to or less than the given specified value (Yes in S105), the selection number "#1" is added to the "group #Y" in S106. Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Y". Thereafter, the terminal calls up the group #Y and uses the plurality of communication methods included in the group #Y to transmit data. Thus, the terminal can achieve the effects that a plurality of modulation signals can be simultaneously transmitted and the data transmission rate can be improved by using a plurality of modulation systems while realizing the condition that the total SAR value is equal to or less than the specified value.

Next, description is given of a third example of the correspondence relationship between the wireless communication methods and SARs. FIG. 7 is a table showing the third example of the correspondence relationship between the wireless communication methods and SARs. Based on the table of FIG. 7, description is given of an example of performing the group setting shown in FIG. 5. Note that a difference between FIGS. 4 and 7 is that the selection number and the SAR are separated depending on the "on" or "off" of an MIMO system and an MISO system and "frequency band to be used".

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system and no transmission using the MISO system (that is, transmission of modulation signals by using a single antenna).

In the example of FIG. 7, a selection number #1 represents that the wireless communication method is the "first wireless communication method", the name of the communication method is "wireless LAN", the frequency to be used is 2.4 GHz, the MIMO system or the MISO system is "on", the frequency band to be used is 20 MHz, and the SAR is a11 when the terminal transmits modulation signals by using the method of the selection number #1.

A selection number #2 represents that the wireless communication method is the "first wireless communication method", the name of the communication method is "wireless LAN", the frequency to be used is 2.4 GHz, the MIMO system or the MISO system is "on", the frequency band to be used is 20 MHz or 40 MHz, and the SAR is a12 when the terminal transmits modulation signals by using the method of the selection number #2.

A selection number #3 represents that the wireless communication method is the "first wireless communication method", the name of the communication method is "Wireless LAN", the frequency to be used is 2.4 GHz, the MIMO system or the MISO system is "off", the frequency band to be used is 20 MHz, and the SAR is a13 when the terminal transmits modulation signals by using the method of the selection number #3.

A selection number #4 represents that the wireless communication method is the "first wireless communication method", the name of the communication method is "wireless LAN", the frequency to be used is 2.4 GHz, the MIMO system or the MISO system is "off", the frequency band to be used is 20 MHz or 40 MHz, and the SAR is a14 when the terminal transmits modulation signals by using the method of the selection number #4.

A selection number #5 represents that the wireless communication method is the "first wireless communication method", the name of the communication method is "wireless LAN", the frequency to be used is 5 GHz, the MIMO system or the MISO system is "on", the frequency band to be used is 20 MHz, and the SAR is a15 when the terminal transmits modulation signals by using the method of the selection number #5.

A selection number #6 represents that the wireless communication method is the "first wireless communication method", the name of the communication method is "Wireless LAN", the frequency to be used is 5 GHz, the MIMO system or the MISO system is "on", the frequency band to be used is 20 MHz or 40 MHz, and the SAR is a16 when the terminal transmits modulation signals by using the method of the selection number #6.

A selection number #7 represents that the wireless communication method is the "first wireless communication method", the name of the communication method is "wireless LAN", the frequency to be used is 5 GHz, the MIMO system or the MISO system is "off", the frequency band to be used is 20 MHz, and the SAR is a17 when the terminal transmits modulation signals by using the method of the selection number #7.

A selection number #8 represents that the wireless communication method is the "first wireless communication method", the name of the communication method is "Wireless LAN", the frequency to be used is 5 GHz, the MIMO system or the MISO system is "off", the frequency band to be used is 20 MHz or 40 MHz, and the SAR is a18 when the terminal transmits modulation signals by using the method of the selection number #8.

A selection number #9 represents that the wireless communication method is the "second wireless communication method", the name of the communication method is "Bluetooth (registered trademark)", the frequency to be used is 2.4 GHz, and the SAR is a21 when the terminal transmits modulation signals by using the method of the selection number #9.

A selection number #10 represents that the wireless communication method is the "third wireless communication method", the name of the communication method is "third-generation cell-phone", the frequency to be used is 800 MHz, and the SAR is a31 when the terminal transmits modulation signals by using the method of the selection number #10.

A selection number #11 represents that the wireless communication method is the "third wireless communication method", the name of the communication method is "third-generation cell-phone", the frequency to be used is 2 GHz, and the SAR is a32 when the terminal transmits modulation signals by using the method of the selection number #11.

A selection number #12 represents that the wireless communication method is the "fourth wireless communication method", the name of the communication method is "fourth-generation cell-phone", the frequency to be used is 800 MHz, the frequency band to be used is X Hz, and the SAR is a41 when the terminal transmits modulation signals by using the method of the selection number #12.

A selection number #13 represents that the wireless communication method is the "fourth wireless communication method", the name of the communication method is "fourth-generation cell-phone", the frequency to be used is 800 MHz, the frequency band to be used is X Hz or Y Hz, and the SAR is a42 when the terminal transmits modulation signals by using the method of the selection number #13.

A selection number #14 represents that the wireless communication method is the "fourth wireless communication method", the name of the communication method is "fourth-generation cell-phone", the frequency to be used is 2 GHz, the frequency band to be used is X Hz, and the SAR is a43 when the terminal transmits modulation signals by using the method of the selection number #14.

A selection number #15 represents that the wireless communication method is the "fourth wireless communication method", the name of the communication method is "fourth-generation cell-phone", the frequency to be used is 2 GHz, the frequency band to be used is X Hz or Y Hz, and the SAR is a44 when the terminal transmits modulation signals by using the method of the selection number #15.

Based on the table of FIG. 7, description is given of an example of performing the group setting shown in FIG. 5.

For example, it is assumed that the terminal performs setting of the "group #Z". In this event, description is given of the method for setting the "group # Z" based on FIGS. 5 and 7. Note that, in the following description, the "group #X" in FIG. 5 is replaced by the "group #Z".

After receiving the operation to start the selection of the communication method in S101, the terminal receives selection of the selection number "#6" in FIG. 7, for example, in S102. Next, in S103, an SAR is calculated when the selection number "#6" is selected. The SAR obtained as a result is a16, which is compared with the specified value in S104. When this value is equal to or less than the given specified value (Yes in S105), the selection number "#6" is added to the "group #Z" in S106.

Next, it is determined in S107 whether or not the next selection of a "communication method for simultaneous transmission" is received. For example, it is assumed that the selection of the selection number "#15" in FIG. 7 is received (Yes in S107). In this case, the processing returns to S103 to calculate the total SAR value when the selection number "#15" is added to the group #Z. Since a44 is the SAR value of the selection number "#15" (see FIG. 7), the total SAR value is a16+a44. In S104, the total SAR value is compared with the specified value. Then, when the total value is not equal to or less than the given specified value (No in S105), the selection number "#15" is not added to the "group #Z".

Thereafter, it is determined in S107 whether or not the next selection of a "communication method for simultaneous transmission" is received. When the selection is performed by the user, the processing goes back again to S103.

Here, it is assumed that the selection of the selection number "#10" in FIG. 7 is received (Yes in S107). Then, in S103, the total SAR value when the selection number "#10" is added to the group #Z is calculated. Since a31 is the SAR value of the selection number "#10" (see FIG. 7), the total SAR value is a16+a31. In S104, the total SAR value is compared with the specified value. Then, when the total value is equal to or less than the given specified value (Yes in S105), the selection number "#10" is added to the "group #Z" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Z". Thereafter, the terminal calls up the group #Z and uses the plurality of communication methods included in the group #Z to transmit data. Thus, the terminal can achieve the effects that a plurality of modulation signals can be simultaneously transmitted and the data transmission rate can be improved by using a plurality of modulation systems while realizing the condition that the total SAR value is equal to or less than the specified value.

Next, description is given of an example of a screen for group information displayed on a display in the terminal. FIG. 8 is a diagram showing a first example of a screen displaying the group information. FIG. 9 is a diagram showing a second example of the screen displaying the group information.

It is assumed that the user selects the selection number #1 and the selection number #6 as the group #X. Then, the screen of the terminal may display, for example, the maximum transmission rate. In the example of FIG. 8, when "Fourth-generation cell-phone Frequency to be used 800 MHz" and "Wireless LAN Frequency to be used 2.4 GHz" are selected as the group #X, the screen displays that the maximum transmission rate is 500 Mbps when the two communication methods are used. In this event, the maximum transmission rate may be a maximum transmission rate of data received by the terminal or may be a maximum transmission rate of data transmitted by the terminal.

Alternatively, after the setting performed based on FIGS. 4 and 5, the terminal may select "Fourth-generation cell-phone Frequency to be used 800 MHz", "Wireless LAN Frequency to be used 2.4 GHz", and "Wireless LAN Frequency to be used 5 GHz" as the group #X, and a connection status of each system and the condition of the transmission rate may be displayed on the screen of the terminal.

In the example of FIG. 9, the screen of the terminal displays a state where "Fourth-generation cell-phone Frequency to be used 800 MHz" is "connected" (a base station and the terminal are connected to each other) at a certain point and the data transmission rate is 40 Mbps.

Also, the screen of the terminal displays a state where "Wireless LAN Frequency to be used 2.4 GHz" is "connected" (the terminal and an access point are connected to each other) at a certain point and the data transmission rate is 72 Mbps.

Moreover, the screen of the terminal displays a state where "Wireless LAN Frequency to be used 5 GHz" is "unconnected" (the terminal and the access point are unconnected to each other) at a certain point. Here, the data transmission rate is not displayed on the screen of the terminal (note that the data transmission rate may be a transmission rate of data received by the terminal or may be a transmission rate of data transmitted by the terminal).

Thus, the user can check the status of the group set by himself/herself. Therefore, the effects can be achieved that the status of the group can be used to change the content of the group and to set a new group and thus the group setting can be effectively performed.

As described above, in this embodiment, the user selects a plurality of communication methods for use in simultaneous transmission and forms a group including the plurality of communication methods such that the total SAR value is equal to or less than the specified value. Thus, by simultaneously transmitting the modulation signals using the plurality of communication methods based on the group information, the effect that the data transmission rate can be improved can be achieved while realizing the condition that the total SAR value is equal to or less than the specified value.

Note that, in this embodiment, the description is given of the wireless LAN, Bluetooth (registered trademark), the third-generation cell-phone, and the fourth-generation cell-phone as examples of the communication method. However, the present disclosure is not limited thereto. This embodiment can be similarly implemented even when another wireless communication method is selected as one of the communication methods for simultaneous transmission. Moreover, although the method for classifying the selection numbers is described with reference to FIGS. 4, 6, and 7, the present disclosure is not limited thereto. The group setting described in this embodiment can be similarly performed by using another classification method to set the selection numbers.

Figures 10, 11:
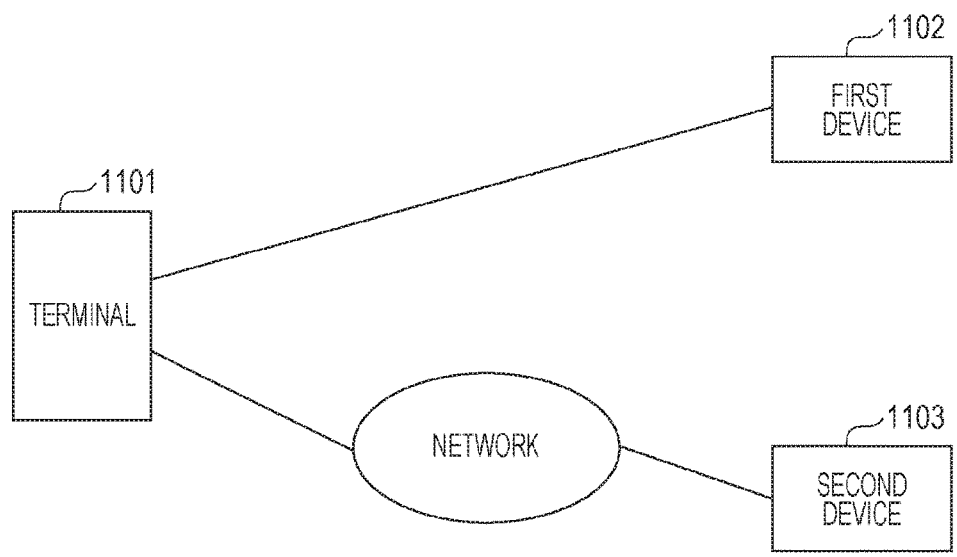
FIG. 10 is a diagram showing an example of a screen displaying a relationship between a communication method and a (predicted) transmission rate.
FIG. 11 is a diagram explaining another example of setting groups in Embodiment 1.

Moreover, the screen of the terminal may also allow confirmation as shown in FIG. 10. FIG. 10 is a diagram showing an example of a screen displaying a relationship between the communication method and a (predicted) transmission rate. Note that, as described above, the transmission rate may be a data transmission rate upon receipt by the terminal or may be a data transmission rate upon transmission by the terminal. Alternatively, the data transmission rate upon transmission by the terminal and the data transmission rate upon receipt by the terminal may be both displayed on the screen of the terminal. Naturally, only one of the data transmission rates may be displayed thereon.

In FIG. 10, the screen of the terminal displays that the (predicted) data transmission rate is 100 Mbps when the terminal uses "wireless LAN" as the communication method. Likewise, the screen of the terminal displays that the (predicted) data transmission rate is 5 Mbps when the terminal uses the "third-generation cell-phone" as the communication method. Also, the screen of the terminal displays that the (predicted) data transmission rate is 50 Mbps when the terminal uses the "fourth-generation cell-phone" as the communication method.

Moreover, the screen of the terminal displays that the (predicted) data transmission rate is 200 Mbps when the terminal uses the plurality of communication methods included in the "group #X" set using the setting method described in this embodiment.

Moreover, the screen of the terminal displays that the (predicted) data transmission rate is 300 Mbps when the terminal uses the communication methods included in the "group #Y" set using the setting method described in this embodiment.

Such display performed by the terminal provides the user with an advantage that he/she can select a suitable communication method by taking into consideration a transmission rate of request data and the remaining battery level, for example. Thus, the effect can be achieved that the setting method described in this embodiment can be effectively used.

Moreover, as for the grouping performed by the terminal described in this embodiment, the user may perform the grouping by operating the terminal or the user may perform the setting of the terminal for the grouping described in this embodiment through another device. This point is described with reference to FIG. 11.

FIG. 11 is a diagram explaining another example of setting groups in this embodiment. In FIG. 11, reference numeral 1101 denotes a terminal (having, for example, a configuration as shown in FIG. 3). For example, the terminal 1101 and a first device 1102 are connected by wire or wirelessly, and the grouping described in this embodiment may be performed by operating the first device 1102. In this event, the first device 1102 may serve as a controller to allow the terminal 1101 to perform the setting for the grouping. Alternatively, the first device 1102 may perform the setting of the grouping and transmit information of the result of the grouping or a program related thereto to the terminal 1101, thereby realizing the grouping.

Meanwhile, in FIG. 11, the terminal 1101 and a second device 1103 are connected by wire or wirelessly through a network, and the grouping described in this embodiment may be performed by operating the second device 1103. In this event, the second device 1103 may serve as a controller to allow the terminal 1101 to perform the setting for the grouping. Alternatively, the second device 1103 may perform the setting of the grouping and transmit information of the result of the grouping or a program related thereto to the terminal 1101, thereby realizing the grouping.

Note that, in this embodiment, the group information generated and transmitted by the terminal may be information of a group including a plurality of communication methods for use in simultaneous transmission or may be information indicating a combination of a plurality of communication stations for use in simultaneous transmission.

Embodiment 2

In Embodiment 1, the description is given of the case where there is only one SAR value for each communication method and also there is only one specified value for the SARs. However, the present disclosure is not limited thereto, but there may be more than one SAR value for each communication method or there may be more than one specified value. In this embodiment, description is given of a modified example of Embodiment 1 when there is more than one specified value for the SARs.

Since an example of a communication mode when the terminal can perform transmission and reception using a plurality of wireless communication methods is as shown in FIGS. 1 and 2 and described in Embodiment 1, description thereof is omitted. Also, since the configuration of the terminal is as shown in FIG. 3 and described in Embodiment 1, description thereof is omitted.

FIG. 12 is a table showing a fourth example of the correspondence relationship between the wireless communication methods and SARs. The table shows, for example, information required for the transmission controller 305 in FIG. 3 to perform control shown in FIG. 13 (to be described later).

In the example of FIG. 12, a selection number #1 represents that the wireless communication method is the "first wireless communication method", the name of the communication method is "wireless LAN", the frequency to be used is 2.4 GHz, and a first SAR ($SAR_1$) is a11 and a second SAR ($SAR_2$) is b11 when the terminal transmits modulation signals by using the method of the selection number #1.

As an example of the case where there is more than one SAR value for each communication method, FIG. 12 shows the case where there are two kinds of SARs, the $SAR_1$ and the $SAR_2$. However, a plurality of SAR measurements is required for different objects to be measured and different measurement methods, such that, for example, the SAR when the terminal is attached to a hand is the $SAR_1$ and the SAR when the terminal is brought close to the head is the $SAR_2$. Note that there are a first specified value and a second specified value for the $SAR_1$ and the $SAR_2$ in FIG. 12, respectively.

Note that although FIG. 12 shows the case where there are two kinds of SARs, as an example, there may be two kinds or more of SARs. In this case, as expanded from FIGS. 4 to 12, a plurality of kinds of SAR values are defined for each selection number. Also, there is a specified value for each of the plurality of kinds of SAR values.

A selection number #2 represents that the wireless communication method is the "first wireless communication method", the name of the communication method is "wireless LAN", the frequency to be used is 5 GHz, and the $SAR_1$ is a12 and the $SAR_2$ is b12 when the terminal transmits modulation signals by using the method of the selection number #2.

A selection number #3 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #3.

A selection number #4 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #4.

A selection number #5 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #5.

A selection number #6 represents that the wireless communication method is the "fourth wireless communication method", the name of the communication method is "fourth-generation cell-phone", the frequency to be used is 800

MHz, and the $SAR_1$ is a41 and the $SAR_2$ is b41 when the terminal transmits modulation signals by using the method of the selection number #6.

A selection number #7 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #7.

Figure 13:
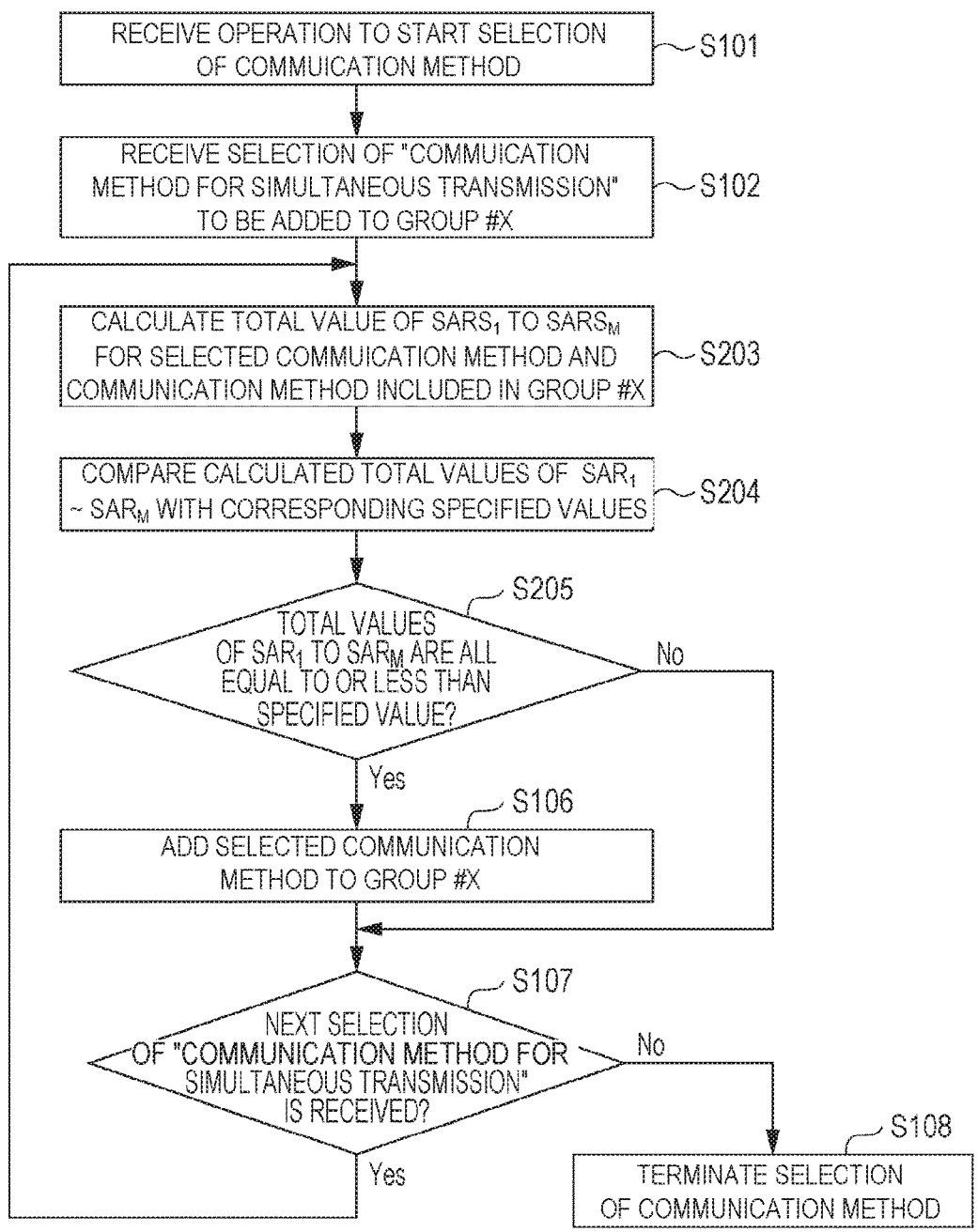
FIG. 13 is a flowchart showing a method for setting groups of wireless communication methods in Embodiment 2.

FIG. 13 is a flowchart showing a method for setting groups of wireless communication methods in this embodiment. FIG. 13 shows an example of a flowchart of control that is one of operations performed by the transmission controller 305 in FIG. 3.

This embodiment is characterized in that "the user who uses the terminal sets a group including a plurality of wireless communication methods for simultaneous transmission". An example of a setting method is described below.

For example, it is assumed that the terminal performs setting of a "group #X". With reference to FIG. 13, description is given of a method for setting the "group #X". Note that the following description is given assuming that there are M SARs as the defined plurality of kinds of SAR values.

First, the transmission controller 305 in the terminal receives an operation to start selection of a communication method (Si 101). This operation is performed, for example, by the user operating an unillustrated display unit in the terminal.

Next, selection of "a communication method for simultaneous transmission" to be added to the group #X is received (S102). For example, a communication method for use in simultaneous transmission is selected from the selection numbers shown in FIG. 12. This operation is performed, for example, by the user operating the display unit.

Next, a total value of SARs ($SAR_1$ to $SAR_M$) for the communication method selected in S102 and SARs ($SAR_1$ to $SAR_M$) for the communication methods included in the group #X is calculated (S203). Then, the calculated total value of the SARs ($SAR_1$ to $SAR_M$) is compared with a specified value determined for the SARs (S204). More specifically, it is checked if "j is 1 to M (M is an integer of 2 or more) and, with every j satisfying that condition, $SAR_j$ is equal to or less than a specified value determined for $SAR_j$".

When at least one of the calculated total values of the SARs ($SAR_1$ to $SAR_M$) is not equal to or less than the given specified value corresponding thereto (No in S205), the processing advances to S107 without adding the selected communication method to the group #X. On the other hand, when the calculated total values of the SARs ($SAR_1$ to $SAR_M$) are all equal to or less than the given specified value corresponding thereto (Yes in S205), the selected communication method is added to the group #X (S106), and then the processing advances to S107.

Thereafter, the transmission controller 305 determines whether or not the next selection of a "communication method for simultaneous transmission" is received (S107). When the next selection of the "communication method for simultaneous transmission" is received (Yes in S107), the processing of S203 to S106 is performed. On the other hand, when the next selection of the "communication method for simultaneous transmission" is not received (No in S107), the selection of the communication method is terminated (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and a data transmission rate can be improved while realizing the condition that the SAR is equal to or less than the specified value.

Note that the terminal may follow the same procedure to generate and store a group other than the "group #X" (for example, a "group #Y", a "group #Z" or the like), to call up any one of the plurality of groups, and to transmit data by using a plurality of communication methods included in the group called up.

Furthermore, based on the table of FIG. 12, description is given of an example of performing the group setting shown in FIG. 13.

For example, it is assumed that the terminal performs the setting of the "group #X". In this event, description is given of a specific example of the method for setting the "group #X" based on FIGS. 12 and 13.

After receiving the operation to start the selection of the communication method in S101, the terminal receives selection of the selection number "#6" in FIG. 12, for example, in S102. Next, in S203, an SAR is calculated when the selection number "#6" is selected. For the selection number "#6", the $SAR_1$ is a41 and the $SAR_2$ is b41. In S204, these SAR values are compared with the specified values for them. Here, when both of the $SAR_1$ and the $SAR_2$ are equal to or less than the specified values (Yes in S205), the selection number "#6" is added to the "group #X" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#5" in FIG. 12 is received (Yes in S107). In this case, the processing returns to S203 to calculate the total SAR values when the selection number "#5" is added to the group #X. Since a32 is the $SAR_1$ value of the selection number "#5" (see FIG. 12), the total $SAR_1$ value is a41+a32. Meanwhile, since b32 is the $SAR_2$ value of the selection number "#5" (see FIG. 12), the total $SAR_2$ value is b41+b32. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#5" is not added to the "group #X".

Thereafter, it is determined in S107 whether or not the next selection of a "communication method for simultaneous transmission" is received. When the selection is performed by the user, the processing goes back again to S203.

Here, it is assumed that the selection of the selection number "#1" in FIG. 12 is received (Yes in S107). Then, in S203, the total $SAR_1$ value and the total $SAR_2$ value when the selection number "#1" is added to the group #X are calculated. Since a11 is the $SAR_1$ value of the selection number "#1" (see FIG. 12), the total $SAR_1$ value is a41+a11. Meanwhile, since b11 is the $SAR_2$ value of the selection number "#1" (see FIG. 12), the total $SAR_2$ value is b41+b11. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$," is satisfied (Yes in S205), the selection number "#1" is added to the "group #X" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved by using a plurality of modulation systems while realizing the condition that the total SAR value is equal to or less than the specified value.

Next, description is given of a fifth example of the correspondence relationship between the wireless communication methods and SARs. FIG. 14 is a table showing the fifth example of the correspondence relationship between the wireless communication methods and SARs. Based on the table of FIG. 14, description is given of an example of performing the group setting shown in FIG. 13. Note that a difference between FIGS. 14 and 12 is that the selection number and the SAR are separated depending on the "on" or "off" of an MIMO system and an MISO) system.

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

In the example of FIG. 14, a selection number #1 represents that the wireless communication method is the "first wireless communication method", the name of the communication method is "wireless LAN", the frequency to be used is 2.4 GHz, the MIMO system or the MISO system is "on", and the $SAR_1$ is a11 and the $SAR_2$ is b11 when the terminal transmits modulation signals by using the method of the selection number #1.

The description is given of the case where there is more than one kind of SAR and FIG. 14 shows the case where there are two kinds of SARs. However, a plurality of SAR measurements is required for different objects to be measured and different measurement methods, such that, for example, the SAR when the terminal is attached to a hand is the $SAR_1$ and the SAR when the terminal is brought close to the head is the $SAR_2$.

Note that although FIG. 14 shows the case where there are two kinds of SARs, as an example, there may be two kinds or more of SARs. In this case, as expanded from FIGS. 6 to 14, a plurality of kinds of SAR values are defined for each selection number.

A selection number #2 represents that the wireless communication method is the "first wireless communication method", the name of the communication method is "wireless LAN", the frequency to be used is 2.4 GHz, the MIMO system or the MISO system is "off", and the $SAR_1$ is a12 and the $SAR_2$ is b12 when the terminal transmits modulation signals by using the method of the selection number #2.

A selection number #3 represents that the wireless communication method is the "first wireless communication method", the name of the communication method is "Wireless LAN", the frequency to be used is 5 GHz, the MIMO system or the MISO system is "on", and the $SAR_1$ is a13 and the $SAR_2$ is b13 when the terminal transmits modulation signals by using the method of the selection number #3.

A selection number #4 represents that the wireless communication method is the "first wireless communication method", the name of the communication method is "Wireless LAN", the frequency to be used is 5 GHz, the MIMO system or the MISO system is "off", and the $SAR_1$ is a14 and the $SAR_2$ is b14 when the terminal transmits modulation signals by using the method of the selection number #4.

A selection number #5 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #5.

A selection number #6 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #6.

A selection number #7 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #7.

A selection number #8 represents that the wireless communication method is the "fourth wireless communication method", the name of the communication method is "fourth-generation cell-phone", the frequency to be used is 800 MHz, and the $SAR_1$ is a41 and the $SAR_2$ is b41 when the terminal transmits modulation signals by using the method of the selection number #8.

A selection number #9 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #9.

Based on the table of FIG. 14, description is given of an example of performing the group setting shown in FIG. 13. For example, it is assumed that the terminal performs setting of the "group #Y". In this event, description is given of the method for setting the "group #Y" based on FIGS. 13 and 14. Note that, in the following description, the "group #X" in FIG. 13 is replaced by the "group #Y".

After receiving the operation to start the selection of the communication method in S101, the terminal receives selection of the selection number "#6" in FIG. 14, for example, in S102. Next, in S203, an SAR is calculated when the selection number "#6" is selected. For the selection number "#6", the $SAR_1$ is a31 and the $SAR_2$ is b31. In S204, these SAR values are compared with the specified values for them.

Here, when both of the $SAR_1$ and $SAR_2$ are equal to or less than the specified values (Yes in S205), the selection number "#6" is added to the "group #Y" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#9" in FIG. 14 is received (Yes in S107). In this case, the processing returns to S203 to calculate the total SAR values when the selection number "#9" is added to the group #Y. Since a42 is the $SAR_1$ value of the selection number "#9" (see FIG. 14), the total $SAR_1$ value is a31+a42. Meanwhile, since b42 is the $SAR_2$ value of the selection number "#9" (see FIG. 14), the total $SAR_2$ value is b31+b42. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#9" is not added to the "group #Y".

Thereafter, it is determined in S107 whether or not the next selection of a "communication method for simultaneous transmission" is received. When the selection is performed by the user, the processing goes back again to S203.

Here, it is assumed that the selection of the selection number "#1" in FIG. 14 is received (Yes in S107). Then, in S203, the total $SAR_1$ value and the total $SAR_2$ value when the selection number "#1" is added to the group #Y are calculated. Since a11 is the $SAR_1$ value of the selection number "#1" (see FIG. 14), the total $SAR_1$ value is a31+a11. Meanwhile, since b11 is the $SAR_2$ value of the selection number "#1" (see FIG. 14), the total $SAR_2$ value is b31+b11. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#1" is added to the "group #Y" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Y". Thereafter, the terminal calls up the group #Y and uses the plurality of communication methods included in the group #Y to transmit data. Thus, the terminal can achieve the effects that a plurality of modulation signals can be simultaneously transmitted and the data transmission rate can be improved while realizing the condition that the SAR is equal to or less than the specified value.

Next, description is given of a sixth example of the correspondence relationship between the wireless communication methods and SARs. FIG. 15 is a table showing the sixth example of the correspondence relationship between the wireless communication methods and SARs. Based on the table of FIG. 15, description is given of an example of performing the group setting shown in FIG. 13. Note that a difference between FIGS. 12 and 15 is that the selection number and the SAR are separated depending on the "on" or "off" of an MIMO system and an MISO system and "frequency band to be used".

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

In the example of FIG. 15, a selection number #1 represents that the wireless communication method is the "first wireless communication method", the name of the communication method is "wireless LAN", the frequency to be used is 2.4 GHz, the MIMO system or the MISO system is "on", the frequency band to be used is 20 MHz, and the $SAR_1$ is a11 and the $SAR_2$ is b11 when the terminal transmits modulation signals by using the method of the selection number #1.

The description is given of the case where there is more than one kind of SAR and FIG. 15 shows the case where there are two kinds of SARs. However, a plurality of SAR measurements is required for different objects to be measured and different measurement methods, such that, for example, the SAR when the terminal is attached to a hand is the $SAR_1$ and the SAR when the terminal is brought close to the head is the $SAR_2$.

Note that although FIG. 15 shows the case where there are two kinds of SARs, as an example, there may be two kinds or more of SARs. In this case, as expanded from FIGS. 7 to 15 a plurality of kinds of SAR values are defined for each selection number.

A selection number #2 represents that the wireless communication method is the "first wireless communication method", the name of the communication method is "wireless LAN", the frequency to be used is 2.4 GHz, the MIMO system or the MISO system is "on", the frequency band to be used is 20 MHz or 40 MHz, and the $SAR_1$ is a12 and the $SAR_2$ is b12 when the terminal transmits modulation signals by using the method of the selection number #2.

A selection number #3 represents that the wireless communication method is the "first wireless communication method", the name of the communication method is "wireless LAN", the frequency to be used is 2.4 GHz, the MIMO system or the MISO system is "off", the frequency band to be used is 20 MHz, and the $SAR_1$ is a13 and the $SAR_2$ is b13 when the terminal transmits modulation signals by using the method of the selection number #3.

A selection number #4 represents that the wireless communication method is the "first wireless communication method", the name of the communication method is "Wireless LAN", the frequency to be used is 2.4 GHz, the MIMO system or the MISO system is "off", the frequency band to be used is 20 MHz or 40 MHz, and the $SAR_1$ is a14 and the $SAR_2$ is b14 when the terminal transmits modulation signals by using the method of the selection number #4.

A selection number #5 represents that the wireless communication method is the "first wireless communication method", the name of the communication method is "wireless LAN", the frequency to be used is 5 GHz, the MIMO system or the MISO system is "on", the frequency band to be used is 20 MHz, and the $SAR_1$ is a15 and the $SAR_2$ is b15 when the terminal transmits modulation signals by using the method of the selection number #5.

A selection number #6 represents that the wireless communication method is the "first wireless communication method", the name of the communication method is "wireless LAN", the frequency to be used is 5 GHz, the MIMO system or the MISO system is "on", the frequency band to be used is 20 MHz or 40 MHz, and the $SAR_1$ is a16 and the $SAR_2$ is b16 when the terminal transmits modulation signals by using the method of the selection number #6.

A selection number #7 represents that the wireless communication method is the "first wireless communication method", the name of the communication method is "Wireless LAN", the frequency to be used is 5 GHz, the MIMO system or the MISO system is "off", the frequency band to be used is 20 MHz, and the $SAR_1$ is a17 and the $SAR_2$ is b17 when the terminal transmits modulation signals by using the method of the selection number #7.

A selection number #8 represents that the wireless communication method is the "first wireless communication method", the name of the communication method is "wireless LAN", the frequency to be used is 5 GHz, the MIMO system or the MISO system is "off", the frequency band to be used is 20 MHz or 40 MHz, and the $SAR_1$ is a18 and the $SAR_2$ is b18 when the terminal transmits modulation signals by using the method of the selection number #8.

A selection number #9 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #9.

A selection number #10 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #10.

A selection number #11 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #11.

A selection number #12 represents that the wireless communication method is the "fourth wireless communication method", the name of the communication method is "fourth-generation cell-phone", the frequency to be used is 800 MHz, the frequency band to be used is X Hz, and the $SAR_1$ is a41 and the $SAR_2$ is b41 when the terminal transmits modulation signals by using the method of the selection number #12.

A selection number #13 represents that the wireless communication method is the "fourth wireless communication method", the name of the communication method is "fourth-generation cell-phone", the frequency to be used is 800 MHz, the frequency band to be used is X Hz or Y Hz, and the $SAR_1$ is a42 and the $SAR_2$ is b42 when the terminal transmits modulation signals by using the method of the selection number #13.

A selection number #14 represents that the wireless communication method is the "fourth wireless communication method", the name of the communication method is "fourth-generation cell-phone", the frequency to be used is 2 GHz, the frequency band to be used is X Hz, and the $SAR_1$ is a43 and the $SAR_2$ is b43 when the terminal transmits modulation signals by using the method of the selection number #14.

A selection number #15 represents that the wireless communication method is the "fourth wireless communication method", the name of the communication method is "fourth-generation cell-phone", the frequency to be used is 2 GHz, the frequency band to be used is X Hz or Y Hz, and the $SAR_1$ is a44 and the $SAR_2$ is b44 when the terminal transmits modulation signals by using the method of the selection number #15.

Based on the table of FIG. 15, description is given of an example of performing the group setting shown in FIG. 13.

For example, it is assumed that the terminal performs setting of the "group #Z". In this event, description is given of a specific example of the method for setting the "group #Z" based on FIGS. 13 and 15. Note that, in the following description, the "group #X" in FIG. 13 is replaced by the "group #Z".

After receiving the operation to start the selection of the communication method in S101, the terminal receives selection of the selection number "#6" in FIG. 15, for example, in S102. Next, in S203, an SAR is calculated when the selection number "#6" is selected. For the selection number "#6", the $SAR_1$ is a16 and the $SAR_2$ is b16. In S204, these SAR values are compared with the specified values for them. Here, when both of the $SAR_1$ and $SAR_2$ are equal to or less than the specified values (Yes in S205), the selection number "#6" is added to the "group #Z" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#15" in FIG. 15 is received (Yes in S107). In this case, the processing returns to S203 to calculate the total SAR values when the selection number "#15" is added to the group #Z. Since a44 is the $SAR_1$ value of the selection number "#15" (see FIG. 15), the total $SAR_1$ value is a16+a44. Meanwhile, since b44 is the $SAR_2$ value of the selection number "#15" (see FIG. 15), the total $SAR_2$ value is b16+b44. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#15" is not added to the "group #Z".

Thereafter, it is determined in S107 whether or not the next selection of a "communication method for simultaneous transmission" is received. When the selection is performed by the user, the processing goes back again to S203.

Here, it is assumed that the selection of the selection number "#10" in FIG. 15 is received (Yes in S107). Then, in S203, the total $SAR_1$ value and the total $SAR_2$ value when the selection number "#10" is added to the group #Z are calculated. Since a31 is the $SAR_1$ value of the selection number "#10" (see FIG. 15), the total $SAR_1$ value is a16+a31. Meanwhile, since b31 is the $SAR_2$ value of the selection number "#10" (see FIG. 15), the total $SAR_2$ value is b16+b31. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#10" is added to the "group #Z" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Z". Thereafter, the terminal calls up the group #Z and uses the plurality of communication methods included in the group #Z to transmit data. Thus, the terminal can achieve the effects that a plurality of modulation signals can be simultaneously transmitted and the data transmission rate can be improved while realizing the condition that the SAR is equal to or less than the specified value.

As described above, in this embodiment, the user selects a communication method for use in simultaneous transmission and forms a group including a plurality of communication methods for use in simultaneous transmission such that the total SAR value is equal to or less than the specified value. Thus, by simultaneously transmitting the modulation signals based on the group information, the effect that the data transmission rate can be improved can be achieved while realizing the condition that the SAR is equal to or less than the specified value.

Note that, in this embodiment, the description is given of the wireless LAN, Bluetooth (registered trademark), the third-generation cell-phone, and the fourth-generation cell-phone as examples of the communication method. However, the present disclosure is not limited thereto. This embodiment can be similarly implemented even when another wireless communication method is selected as one of the communication methods for simultaneous transmission. Moreover, although the method for classifying the selection numbers is described with reference to FIGS. 12, 14, and 15, the present disclosure is not limited thereto. The group setting described in this embodiment can be similarly performed by using another classification method to set the selection numbers.

Moreover, the screen of the terminal may also allow confirmation as shown in FIG. 10. FIG. 10 is a diagram showing a relationship between the communication method and a (predicted) transmission rate. Note that, as described above, the transmission rate may be a data transmission rate upon receipt by the terminal or may be a data transmission rate upon transmission by the terminal. Alternatively, the data transmission rate upon transmission by the terminal and the data transmission rate upon receipt by the terminal may be both displayed. Naturally, only one of the data transmission rates may be displayed thereon.

In FIG. 10, the screen of the terminal displays that the (predicted) data transmission rate is 100 Mbps when the terminal uses "wireless LAN" as the communication method. Likewise, the screen of the terminal displays that the (predicted) data transmission rate is 5 Mbps when the terminal uses the "third-generation cell-phone" as the communication method. Also, the screen of the terminal displays that the (predicted) data transmission rate is 50 Mbps when the terminal uses the "fourth-generation cell-phone" as the communication method.

Moreover, the screen of the terminal displays that the (predicted) data transmission rate is 200 Mbps when the terminal uses the plurality of communication methods included in the "group #X" set using the setting method described in this embodiment.

Moreover, the screen of the terminal displays that the (predicted) data transmission rate is 300 Mbps when the terminal uses the plurality of communication methods included in the "group #Y" set using the setting method described in this embodiment.

Such display performed by the terminal provides the user with an advantage that he/she can select a suitable communication method by taking into consideration a transmission rate of request data and the remaining battery level, for example. Thus, the effect can be achieved that the setting method described in this embodiment can be effectively used.

Moreover, as for the grouping performed by the terminal described in this embodiment, the user may perform the grouping by operating the terminal or the user may perform the setting of the terminal for the grouping described in this embodiment through another device. This point is described with reference to FIG. 11.

In FIG. 11, reference numeral 1101 denotes a terminal (having, for example, a configuration as shown in FIG. 3). For example, the terminal 1101 and a first device 1102 are connected by wire or wirelessly, and the grouping described in this embodiment may be performed by operating the first device 1102. In this event, the first device 1102 may serve as a controller to allow the terminal 1101 to perform the setting for the grouping. Alternatively, the first device 1102 may perform the setting of the grouping and transmit information of the result of the grouping or a program related thereto to the terminal 1101, thereby realizing the grouping.

Meanwhile, in FIG. 11, the terminal 1101 and a second device 1103 are connected by wire or wirelessly through a network, and the grouping described in this embodiment may be performed by operating the second device 1103. In this event, the second device 1103 may serve as a controller to allow the terminal 1101 to perform the setting for the grouping. Alternatively, the second device 1103 may perform the setting of the grouping and transmit information of the result of the grouping or a program related thereto to the terminal 1101, thereby realizing the grouping.

Note that, in this embodiment, the group information generated and transmitted by the terminal may be information of a group including a plurality of communication methods for use in simultaneous transmission or may be information indicating a combination of a plurality of communication stations for use in simultaneous transmission.

Embodiment 3

In this embodiment, description is given of a modified example of the grouping described in Embodiment 1 when there is a wireless communication method using a high frequency of 6 GHz or more, for example.

Since an example of a communication mode when the terminal can perform transmission and reception using a plurality of wireless communication methods is as shown in FIGS. 1 and 2 and described in Embodiment 1, description thereof is omitted. Also, since the configuration of the terminal is as shown in FIG. 3 and described in Embodiment 1, description thereof is omitted.

FIG. 16 is a table showing a seventh example of the correspondence relationship between the wireless communication methods and SARs. The table shows, for example, information required for the transmission controller 305 in FIG. 3 to perform control shown in FIG. 13.

In the example of FIG. 16, a selection number #1 represents that the wireless communication method is the "first wireless communication method", the name of the communication method is "wireless LAN", the frequency to be used is 2.4 GHz, and the $SAR_1$ is a11 and the $SAR_2$ is b11 when the terminal transmits modulation signals by using the method of the selection number #1.

As an example of the case where there is more than one SAR value for each communication method, FIG. 16 shows the case where there are two kinds of SARs, the $SAR_1$ and the $SAR_2$. However, a plurality of SAR measurements is required for different objects to be measured and different measurement methods, such that, for example, the SAR when the terminal is attached to a hand is the $SAR_1$ and the SAR when the terminal is brought close to the head is the $SAR_2$. Note that there are a first specified value and a second specified value for the $SAR_1$ and the $SAR_2$ in FIG. 16, respectively.

Note that although FIG. 16 shows the case where there are two kinds of SARs, as an example, there may be two kinds or more of SARs. In this case, a plurality of kinds of SAR values are defined for each selection number. Also, there is a specified value for each of the plurality of kinds of SAR values.

A selection number #2 represents that the wireless communication method is the "first wireless communication method", the name of the communication method is "wireless LAN", the frequency to be used is 5 GHz, and the $SAR_1$ is a12 and the $SAR_2$ is b12 when the terminal transmits modulation signals by using the method of the selection number #2.

A selection number #3 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #3.

A selection number #4 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #4.

A selection number #5 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #5.

A selection number #6 represents that the wireless communication method is the "fourth wireless communication method", the name of the communication method is "fourth-generation cell-phone", the frequency to be used is 800 MHz, and the $SAR_1$ is a41 and the $SAR_2$ is b41 when the terminal transmits modulation signals by using the method of the selection number #6.

A selection number #7 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #7.

A selection number #8 represents that the wireless communication method is the "fifth wireless communication method", the name of the communication method is "cell-phone", the frequency to be used is 10 GHz, and the $SAR_1$ is a51 and the $SAR_2$ is b51 when the terminal transmits modulation signals by using the method of the selection number #8.

A selection number #9 represents that the wireless communication method is the "fifth wireless communication method", the name of the communication method is "cell-phone", the frequency to be used is 15 GHz, and the $SAR_1$ is a52 and the $SAR_2$ is b52 when the terminal transmits modulation signals by using the method of the selection number #9.

A selection number #10 represents that the wireless communication method is the "sixth wireless communication method", the name of the communication method is "high-speed wireless LAN", the frequency to be used is 20 GHz, and the $SAR_1$ is a61 and the $SAR_2$ is b61 when the terminal transmits modulation signals by using the method of the selection number #10.

A selection number #11 represents that the wireless communication method is the "sixth wireless communication method", the name of the communication method is "high-speed wireless LAN", the frequency to be used is 60 GHz, and the $SAR_1$ is a62 and the $SAR_2$ is b62 when the terminal transmits modulation signals by using the method of the selection number #11.

FIG. 13 shows an example of the flowchart of control that is one of the operations performed by the transmission controller 305 in FIG. 3. Note that since the operations shown in FIG. 13 are described in Embodiment 2, description thereof is omitted.

Based on the table of FIG. 16, description is given of an example of performing the group setting shown in FIG. 13.

For example, it is assumed that the terminal performs the setting of the "group #X". In this event, description is given of a specific example of the method for setting the "group #X" based on FIGS. 13 and 16.

After receiving the operation to start the selection of the communication method in S101, the terminal receives selection of the selection number "#6" in FIG. 16, for example, in S102. Next, in S203, an SAR is calculated when the selection number "#6" is selected. For the selection number "#6", the $SAR_1$ is a41 and the $SAR_2$ is b41. In S204, these SAR values are compared with the specified values for them. Here, when both of the $SAR_1$ and $SAR_2$ are equal to or less than the specified values (Yes in S205), the selection number "#6" is added to the "group #X" in S106. More specifically, it is checked if "j is 1 to M (M is an integer of 2 or more) and, with every j satisfying that condition, $SAR_1$ is equal to or less than a specified value determined for $SAR_j$".

Next, it is determined in S107 whether or not the next selection of a "communication method for simultaneous transmission" is received. For example, it is assumed that the selection of the selection number "#5" in FIG. 16 is received (Yes in S107). In this case, the processing returns to S203 to calculate the total SAR values when the selection number "#5" is added to the group #X. Since a32 is the $SAR_1$ value of the selection number "#5" (see FIG. 16), the total $SAR_1$ value is a41+a32. Meanwhile, since b32 is the $SAR_2$ value of the selection number "#5" (see FIG. 16), the total $SAR_2$ value is b41+b32. In S204, these total SAR values are compared with the specified values for them.

Here, if the condition that "the total $SAR_1$ value is equal to or less than the specified value for the $SAR_1$ and the total $SAR_2$ value is equal to or less than the specified value for the $SAR_2$," is not satisfied (No in S205), the selection number "#5" is not added to the "group #X".

Thereafter, it is determined in S107 whether or not the next selection of a "communication method for simultaneous transmission" is received. When the selection is performed by the user, the processing goes back again to S203.

Here, it is assumed that the selection of the selection number "#11" in FIG. 16 is received (Yes in S107). Then, in S203, the total $SAR_1$ value and the total $SAR_2$ value when the selection number "#11" is added to the group #X are calculated. Since a62 is the $SAR_1$ value of the selection number "#11" (see FIG. 16), the total $SAR_1$ value is a41+a62. Meanwhile, since b62 is the $SAR_2$ value of the selection number "#11" (see FIG. 16), the total $SAR_2$ value is b41+b62. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$," is satisfied (Yes in S205), the selection number "#11" is added to the "group #X" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved while realizing the condition that the total SAR value is equal to or less than the specified value.

Next, description is given of an eighth example of the correspondence relationship between the wireless communication methods and SARs. FIG. 17 is a table showing the eighth example of the correspondence relationship between the wireless communication methods and SARs. Here, description is given of an example of the case where the group setting in FIG. 13 is performed based on the table of FIG. 17. In FIG. 17, $SAR_1$ and $SAR_2$ are those when the frequency used by the communication methods is 6 GHz or less, for example. For example, the SAR when the terminal is attached to a hand is $SAR_1$ and the SAR when the terminal is brought close to the head is $SAR_2$.

Meanwhile, $SAR_3$ and $SAR_4$ are those when the frequency used by the communication methods is 6 GHz or more, for example. For example, the SAR when the terminal is attached to a hand is $SAR_3$ and the SAR when the terminal is brought close to the head is $SAR_4$.

More specifically, in the example of FIG. 17, when the frequency used by the communication methods is 6 GHz or less, there are $SAR_1$ and $SAR_2$ as values. On the other hand, when the frequency used by the communication methods is 6 GHz or more, there are $SAR_3$ and $SAR_4$ as values. Also, there are specified values for the $SAR_1$ to $SAR_4$ in FIG. 17, respectively. Note that although FIG. 17 shows the example where there are four kinds of SARs, the number of the kinds of SARs is not limited to four kinds.

More specifically, FIG. 17 shows an example where the SAR control method varies depending on the frequency used by the communication methods. In the example of FIG. 17, control of the $SAR_1$ and $SAR_2$ is performed when the frequency used by the communication methods is 6 GHz or less, while control of the $SAR_3$ and $SAR_4$ is performed when the frequency used by the communication methods is 6 GHz or more. Note, however, that the classification as shown in FIG. 17 is merely an example, and the classification method using the frequency to be used by the communication methods is not limited to the method of FIG. 17.

A selection number #1 represents that the wireless communication method is the "first wireless communication method", the name of the communication method is "wireless LAN", the frequency to be used is 2.4 GHz, and the $SAR_1$ is a11 and the $SAR_2$ is b11 when the terminal transmits modulation signals by using the method of the selection number #1. The selection number #1 also represents that there are no $SAR_3$ and $SAR_4$ as values since the frequency to be used is 2.4 GHz.

A selection number #2 represents that the wireless communication method is the "first wireless communication method", the name of the communication method is "wireless LAN", the frequency to be used is 5 GHz, and the $SAR_1$ is a12 and the $SAR_2$ is b12 when the terminal transmits modulation signals by using the method of the selection number #2. The selection number #2 also represents that there are no $SAR_3$ and $SAR_4$ as values since the frequency to be used is 5 GHz.

A selection number #3 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #3. The selection number #3 also represents that there are no $SAR_3$ and $SAR_4$ as values since the frequency to be used is 2.4 GHz.

A selection number #4 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #4. The selection number #4 also represents that there are no $SAR_3$ and $SAR_4$ as values since the frequency to be used is 800 MHz.

A selection number #5 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #5. The selection number #5 also represents that there are no $SAR_3$ and $SAR_4$ as values since the frequency to be used is 2 GHz.

A selection number #6 represents that the wireless communication method is the "fourth wireless communication method", the name of the communication method is "fourth-generation cell-phone", the frequency to be used is 800 MHz, and the $SAR_1$ is a41 and the $SAR_2$ is b41 when the terminal transmits modulation signals by using the method of the selection number #6. The selection number #6 also represents that there are no $SAR_3$ and $SAR_4$ as values since the frequency to be used is 800 MHz.

A selection number #7 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #7. The selection number #7 also represents that there are no $SAR_3$ and $SAR_4$ as values since the frequency to be used is 2 GHz.

A selection number #8 represents that the wireless communication method is the "fifth wireless communication method", the name of the communication method is "cell-phone", the frequency to be used is 10 GHz, and the $SAR_3$ is c51 and the $SAR_4$ is d51 when the terminal transmits modulation signals by using the method of the selection number #8. The selection number #8 also represents that there are no $SAR_1$ and $SAR_2$ as values since the frequency to be used is 10 GHz.

A selection number #9 represents that the wireless communication method is the "fifth wireless communication method", the name of the communication method is "cell-phone", the frequency to be used is 15 GHz, and the $SAR_3$ is c52 and the $SAR_4$ is d52 when the terminal transmits modulation signals by using the method of the selection number #9. The selection number #9 also represents that there are no $SAR_1$ and $SAR_2$ as values since the frequency to be used is 15 GHz.

A selection number #10 represents that the wireless communication method is the "sixth wireless communication method", the name of the communication method is "high-speed wireless LAN", the frequency to be used is 20 GHz, and the $SAR_3$ is c61 and the $SAR_4$ is d61 when the terminal transmits modulation signals by using the method of the selection number #10. The selection number #10 also represents that there are no $SAR_1$ and $SAR_2$ as values since the frequency to be used is 20 GHz.

A selection number #11 represents that the wireless communication method is the "sixth wireless communication method", the name of the communication method is "high-speed wireless LAN", the frequency to be used is 60 GHz, and the $SAR_3$ is c62 and the $SAR_4$ is d62 when the terminal transmits modulation signals by using the method of the selection number #11. The selection number #11 also represents that there are no $SAR_1$ and $SAR_2$ as values since the frequency to be used is 60 GHz.

FIG. 13 shows an example of the flowchart of control that is one of the operations performed by the transmission controller 305 in FIG. 3. Note that since the operations shown in FIG. 13 are described in Embodiment 2, description thereof is omitted.

Based on the table of FIG. 17, description is given of an example of performing the group setting shown in FIG. 13.

For example, it is assumed that the terminal performs the setting of the "group #X". In this event, description is given of the method for setting the "group #X" based on FIGS. 13 and 17.

After receiving the operation to start the selection of the communication method in S101, the terminal receives selection of the selection number "#6" in FIG. 17, for example, in S102. Next, in S203, an SAR is calculated when the selection number "#6" is selected. The $SAR_1$ is a41 and the $SAR_2$ is b41. In S204, these SAR values are compared with the specified values for them. It is assumed that the $SAR_1$ is equal to or less than the specified value, and the $SAR_2$ is equal to or less than the specified value. Since there is no $SAR_3$ value or no $SAR_4$ value, the specified value for the $SAR_3$ is not to be evaluated, and the specified value for the $SAR_4$ is also not to be evaluated. Therefore, when both of the $SAR_1$ and $SAR_2$ are equal to or less than the specified value (Yes in S205), the selection number "#6" is added to the "group #X" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#5" in FIG. 17 is received (Yes in S107). In this case, the processing returns to S203 to calculate the SARs when the selection number "#5" is added to the group #X. Since a32 is the $SAR_1$ value of the selection number "#5" (see FIG. 17), the total $SAR_1$ value is a41+a32. Meanwhile, since b32 is the $SAR_2$ value of the selection number "#5" (see FIG. 17), the total $SAR_2$ value is b41+b32. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#5" is not added to the "group #X". Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#1" in FIG. 17 is received (Yes in S107). Then, in S203, the SARs when the selection number "#1" is added to the group #X are calculated. Since a11 is the $SAR_1$ value of the selection number "#" (see FIG. 17), the total $SAR_1$ value is a41+a11. Meanwhile, since b11 is the $SAR_2$ value of the selection number "#1" (see FIG. 17), the total $SAR_2$ value is b41+b11. In S204, these total SAR values are compared with the specified values. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#1" is added to the "group #X" in S106. Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#8" in FIG. 17 is received (Yes in S107). Then, in S203, the SARs when the selection number "#8" is added to the group #X are calculated. Since c51 is the $SAR_3$ value of the selection number "#8" (see FIG. 17), the total $SAR_3$ value is c51. Meanwhile, since d51 is the $SAR_4$ value of the selection number "#8" (see FIG. 17), the total $SAR_4$ value is d51. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is satisfied (Yes in S205), the selection number "#8" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#9" in FIG. 17 is received (Yes in S107). Then, in S203, the SARs when the selection number "#9" is added to the group #X are calculated. Since c52 is the $SAR_3$ value of the selection number "#9" (see FIG. 17), the total $SAR_3$ value is c51+c52. Meanwhile, since d52 is the $SAR_4$ value of the selection number "#9" (see FIG. 17), the total $SAR_4$ value is d51+d52. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$," is not satisfied (No in S205), the selection number "#9" is not added to the "group #X". Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#11" in FIG. 17 is received (Yes in S107). Then, in S203, the SARs when the selection number "#11" is added to the group #X are calculated. Since c62 is the $SAR_3$ value of the selection number "#11" (see FIG. 17), the total $SAR_3$ value is c51+c62. Meanwhile, since d62 is the $SAR_4$ value of the selection number "#11" (see FIG. 17), the total $SAR_4$ value is d51+d62. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$," is satisfied (Yes in S205), the selection number "#11" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved while realizing the condition that the SAR is equal to or less than the specified value.

Next, description is given of a ninth example of the correspondence relationship between the wireless communication methods and SARs. FIG. 18 is a table showing the ninth example of the correspondence relationship between the wireless communication methods and SARs. Based on the table of FIG. 18, description is given of an example of performing the group setting shown in FIG. 13. Note that a difference between FIGS. 16 and 18 is that the selection number and the SAR are separated depending on the "on" or "off" of an MIMO system and an MISO system.

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

In the example of FIG. 18, a selection number #1 represents that the wireless communication method is the "first wireless communication method", the name of the communication method is "wireless LAN", the frequency to be used is 2.4 GHz, the MIMO system or the MISO system is "on", and the $SAR_1$ is a11 and the $SAR_2$ is b11 when the terminal transmits modulation signals by using the method of the selection number #1.

The description is given of the case where there is more than one kind of SAR and FIG. 18 shows the case where there are two kinds of SARs. However, a plurality of SAR measurements is required for different objects to be measured and different measurement methods, such that, for example, the SAR when the terminal is attached to a hand is $SAR_1$ and the SAR when the terminal is brought close to the head is $SAR_2$.

Note that although FIG. 18 shows the case where there are two kinds of SARs, as an example, there may be two kinds or more of SARs. In this case, a plurality of kinds of SAR values are defined for each selection number.

A selection number #2 represents that the wireless communication method is the "first wireless communication method", the name of the communication method is "wireless LAN", the frequency to be used is 2.4 GHz, the MIMO system or the MISO system is "off", and the $SAR_1$ is a12 and the $SAR_2$ is b12 when the terminal transmits modulation signals by using the method of the selection number #2.

A selection number #3 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #3.

A selection number #4 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #4.

A selection number #5 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #5.

A selection number #6 represents that the wireless communication method is the "fourth wireless communication method", the name of the communication method is "fourth-generation cell-phone", the frequency to be used is 800 MHz, and the $SAR_1$ is a41 and the $SAR_2$ is b41 when the terminal transmits modulation signals by using the method of the selection number #6.

A selection number #7 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #7.

A selection number #8 represents that the wireless communication method is the "fifth wireless communication method", the name of the communication method is "cell-phone", the frequency to be used is 10 GHz, and the $SAR_1$ is a51 and the $SAR_2$ is b51 when the terminal transmits modulation signals by using the method of the selection number #8.

A selection number #9 represents that the wireless communication method is the "fifth wireless communication method", the name of the communication method is "cell-phone", the frequency to be used is 15 GHz, and the $SAR_1$ is a52 and the $SAR_2$ is b52 when the terminal transmits modulation signals by using the method of the selection number #9.

A selection number #10 represents that the wireless communication method is the "sixth wireless communication method", the name of the communication method is "high-speed wireless LAN", the frequency to be used is 20 GHz, and the $SAR_1$ is a61 and the $SAR_2$ is b61 when the terminal transmits modulation signals by using the method of the selection number #10.

A selection number #11 represents that the wireless communication method is the "sixth wireless communication method", the name of the communication method is "high-speed wireless LAN", the frequency to be used is 60 GHz, the MIMO system or the MISO system is "on", and the $SAR_1$ is a62 and the $SAR_2$ is b62 when the terminal transmits modulation signals by using the method of the selection number #11.

A selection number #12 represents that the wireless communication method is the "sixth wireless communication method", the name of the communication method is "high-speed wireless LAN", the frequency to be used is 60 GHz, the MIMO system or the MISO system is "off", and the $SAR_1$ is a63 and the $SAR_2$ is b63 when the terminal transmits modulation signals by using the method of the selection number #12.

Based on the table of FIG. 18, description is given of an example of performing the group setting shown in FIG. 13.

For example, it is assumed that the terminal performs setting of the "group #Y". In this event, description is given of the method for setting the "group #Y" based on FIGS. 13 and 18. Note that, in the following description, the "group #X" in FIG. 13 is replaced by the "group #Y".

After receiving the operation to start the selection of the communication method in S101, the terminal receives selection of the selection number "#4" in FIG. 18, for example, in S102. Next, in S203, an SAR is calculated when the selection number "#4" is selected. For the selection number "#4", the $SAR_1$ is a31 and the $SAR_2$ is b31. In S204, these SAR values are compared with the specified values for them. Here, when both of the $SAR_1$ and $SAR_2$ are equal to or less than the specified values (Yes in S205), the selection number "#4" is added to the "group #Y" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#7" in FIG. 18 is received (Yes in S107). In this case, the processing returns to S203 to calculate the total SAR values when the selection number "#7" is added to the group #Y. Since a42 is the $SAR_1$ value of the selection number "#7" (see FIG. 18), the total $SAR_1$ value is a31+a42. Meanwhile, since b42 is the $SAR_2$ value of the selection number "#7" (see FIG. 18), the total $SAR_2$ value is b31+b42. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#7" is not added to the "group #Y".

Thereafter, it is determined in S107 whether or not the next selection of a "communication method for simultaneous transmission" is received. When the selection is performed by the user, the processing goes back again to S203.

Here, it is assumed that the selection of the selection number "#11" in FIG. 18 is received (Yes in S107). Then, in S203, the total $SAR_1$ value and the total $SAR_2$ value when the selection number "#11" is added to the group #Y are calculated. Since a61 is the $SAR_1$ value of the selection number "#11" (see FIG. 18), the total $SAR_1$ value is a31+a61. Meanwhile, since b61 is the $SAR_2$ value of the selection number "#11" (see FIG. 18), the total $SAR_2$ value is b31+b61. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#11" is added to the "group #Y" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Y". Thereafter, the terminal calls up the group #Y and uses the plurality of communication methods included in the group #Y to transmit data. Thus, the terminal can achieve the effects that a plurality of modulation signals can be simultaneously transmitted and the data transmission rate can be improved while realizing the condition that the SAR is equal to or less than the specified value.

Next, description is given of a tenth example of the correspondence relationship between the wireless communication methods and SARs. FIG. 19 is a table showing the tenth example of the correspondence relationship between the wireless communication methods and SARs. Here, description is given of an example of the case where the group setting in FIG. 13 is performed based on the table of FIG. 19. In FIG. 19, $SAR_1$ and $SAR_2$ are those when the frequency used by the communication methods is 6 GHz or less, for example. For example, the SAR when the terminal is attached to a hand is $SAR_1$ and the SAR when the terminal is brought close to the head is $SAR_2$.

Meanwhile, $SAR_3$ and $SAR_4$ are those when the frequency used by the communication methods is 6 GHz or more, for example. For example, the SAR when the terminal is attached to a hand is $SAR_3$ and the SAR when the terminal is brought close to the head is $SAR_4$.

More specifically, in the example of FIG. 19, when the frequency used by the communication methods is 6 GHz or less, there are $SAR_1$ and $SAR_2$ as values. On the other hand, when the frequency used by the communication methods is 6 GHz or more, there are $SAR_3$ and $SAR_4$ as values. Also, there are specified values for the $SAR_1$ to $SAR_4$ in FIG. 19, respectively. Note that although FIG. 19 shows the example where there are four kinds of SARs, the number of the kinds of SARs is not limited to four kinds.

More specifically, FIG. 19 shows an example where the SAR control method varies depending on the frequency used by the communication methods. In the example of FIG. 19, control of the $SAR_1$ and $SAR_2$ is performed when the frequency used by the communication methods is 6 GHz or less, while control of the $SAR_3$ and $SAR_4$ is performed when the frequency used by the communication methods is 6 GHz or more. Note, however, that the classification as shown in FIG. 19 is merely an example, and the classification method using the frequency to be used by the communication methods is not limited to the method of FIG. 19.

Note that a difference between FIGS. 17 and 19 is that the selection number and the SAR are separated depending on the "on" or "off" of an MIMO system and an MISO system.

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

A selection number #1 represents that the wireless communication method is the "first wireless communication method", the name of the communication method is "wireless LAN", the frequency to be used is 2.4 GHz, the MIMO system or the MISO system is "on", and the $SAR_1$ is a11 and the $SAR_2$ is b11 when the terminal transmits modulation signals by using the method of the selection number #1. The selection number #1 also represents that there are no $SAR_3$ and $SAR_4$ as values since the frequency to be used is 2.4 GHz.

A selection number #2 represents that the wireless communication method is the "first wireless communication method", the name of the communication method is "wireless LAN", the frequency to be used is 2.4 GHz, the MIMO system or the MISO system is "off", and the $SAR_1$ is a12 and the $SAR_2$ is b12 when the terminal transmits modulation signals by using the method of the selection number #2. The selection number #2 also represents that there are no $SAR_3$ and $SAR_4$ as values since the frequency to be used is 2.4 GHz.

A selection number #3 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #3. The selection number #3 also represents that there are no $SAR_3$ and $SAR_4$ as values since the frequency to be used is 2.4 GHz.

A selection number #4 represents that the wireless communication method is the "third wireless communication method", the name of the communication method is "third-generation cell-phone", the frequency to be used is 800 MHz, and the $SAR_1$ is a31 and the $SAR_2$ is b31 when the terminal transmits modulation signals by using the method of the selection number #4. The selection number #4 also represents that there are no $SAR_3$ and $SAR_4$ as values since the frequency to be used is 800 MHz.

A selection number #5 represents that the wireless communication method is the "third wireless communication method", the name of the communication method is "third-generation cell-phone", the frequency to be used is 2 GHz, and the $SAR_1$ is a32 and the $SAR_2$ is b32 when the terminal transmits modulation signals by using the method of the selection number #5. The selection number #5 also represents that there are no $SAR_3$ and $SAR_4$ as values since the frequency to be used is 2 GHz.

A selection number #6 represents that the wireless communication method is the "fourth wireless communication method", the name of the communication method is "fourth-generation cell-phone", the frequency to be used is 800 MHz, and the $SAR_1$ is a41 and the $SAR_2$ is b41 when the terminal transmits modulation signals by using the method of the selection number #6. The selection number #6 also represents that there are no $SAR_3$ and $SAR_4$ as values since the frequency to be used is 800 MHz.

A selection number #7 represents that the wireless communication method is the "fourth wireless communication method", the name of the communication method is "fourth-generation cell-phone", the frequency to be used is 2 GHz, and the $SAR_1$ is a42 and the $SAR_2$ is b42 when the terminal transmits modulation signals by using the method of the selection number #7. The selection number #7 also represents that there are no $SAR_3$ and $SAR_4$ as values since the frequency to be used is 2 GHz.

A selection number #8 represents that the wireless communication method is the "fifth wireless communication method", the name of the communication method is "cell-phone", the frequency to be used is 10 GHz, and the $SAR_3$ is c51 and the $SAR_4$ is d51 when the terminal transmits modulation signals by using the method of the selection number #8. The selection number #8 also represents that there are no $SAR_1$ and $SAR_2$ as values since the frequency to be used is 10 GHz.

A selection number #9 represents that the wireless communication method is the "fifth wireless communication method", the name of the communication method is "cell-phone", the frequency to be used is 15 GHz, and the $SAR_3$ is c52 and the $SAR_4$ is d52 when the terminal transmits modulation signals by using the method of the selection number #9. The selection number #9 also represents that there are no $SAR_1$ and $SAR_2$ as values since the frequency to be used is 15 GHz.

A selection number #10 represents that the wireless communication method is the "sixth wireless communication method", the name of the communication method is "high-speed wireless LAN", the frequency to be used is 20 GHz, and the $SAR_3$ is c61 and the $SAR_4$ is d61 when the terminal transmits modulation signals by using the method of the selection number #10. The selection number #10 also represents that there are no $SAR_1$ and $SAR_2$ as values since the frequency to be used is 20 GHz.

A selection number #11 represents that the wireless communication method is the "sixth wireless communication method", the name of the communication method is "high-speed wireless LAN", the frequency to be used is 60 GHz, the MIMO system or the MISO system is "on", and the $SAR_3$ is c62 and the $SAR_4$ is d62 when the terminal transmits modulation signals by using the method of the selection number #11. The selection number #11 also represents that there are no $SAR_1$ and $SAR_2$ as values since the frequency to be used is 60 GHz.

A selection number #12 represents that the wireless communication method is the "sixth wireless communication method", the name of the communication method is "high-speed wireless LAN", the frequency to be used is 60 GHz, the MIMO system or the MISO system is "off", and the $SAR_3$ is c63 and the $SAR_4$ is d63 when the terminal transmits modulation signals by using the method of the selection number #12. The selection number #12 also represents that there are no $SAR_1$ and $SAR_2$ as values since the frequency to be used is 60 GHz.

FIG. 13 shows an example of the flowchart of control that is one of the operations performed by the transmission controller 305 in FIG. 3. Note that since the operations shown in FIG. 13 are described in Embodiment 2, description thereof is omitted.

Based on the table of FIG. 19, description is given of an example of performing the group setting shown in FIG. 13.

For example, it is assumed that the terminal performs the setting of the "group #X". In this event, description is given of the method for setting the "group #X" based on FIGS. 13 and 19.

After receiving the operation to start the selection of the communication method in S101, the terminal receives selection of the selection number "#6" in FIG. 19, for example, in S102. Next, in S203, an SAR is calculated when the selection number "#6" is selected. The $SAR_1$ is a41 and the $SAR_2$ is b41. In S204, these SAR values are compared with the specified values for them. It is assumed that the $SAR_1$ is equal to or less than the specified value, and the $SAR_2$ is equal to or less than the specified value. Since there is no $SAR_3$ value or no $SAR_4$ value, the specified value for the $SAR_3$ is not to be evaluated, and the specified value for the $SAR_4$ is also not to be evaluated. Therefore, when both of the $SAR_1$ and $SAR_2$ are equal to or less than the specified value (Yes in S205), the selection number "#6" is added to the "group #X" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#5" in FIG. 19 is received (Yes in S107). In this case, the processing returns to S203 to calculate the SARs when the selection number "#5" is added to the group #X. Since a32 is the $SAR_1$ value of the selection number "#5" (see FIG. 19), the total $SAR_1$ value is a41+a32. Meanwhile, since b32 is the $SAR_2$ value of the selection number "#5" (see FIG. 19), the total $SAR_2$ value is b41+b32. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#5" is not added to the "group #X". Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#1" in FIG. 19 is received (Yes in S107). Then, in S203, the SARs when the selection number "#1" is added to the group #X are calculated. Since a11 is the $SAR_1$ value of the selection number "#1" (see FIG. 19), the total $SAR_1$ value is a41+a11. Meanwhile, since b11 is the $SAR_2$ value of the selection number "#1" (see FIG. 19), the total $SAR_2$ value is b41+b11. In S204, these total SAR values are compared with the specified values. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#1" is added to the "group #X" in S106. Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#8" in FIG. 19 is received (Yes in S107). Then, in S203, the SARs when the selection number "#8" is added to the group #X are calculated. Since c51 is the $SAR_3$ value of the selection number "#8" (see FIG. 19), the total $SAR_3$ value is c51. Meanwhile, since d51 is the $SAR_4$ value of the selection number "#8" (see FIG. 19), the total $SAR_4$ value is d51. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is satisfied (Yes in S205), the selection number "#8" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#9" in FIG. 19 is received (Yes in S107). Then, in S203, the SARs when the selection number "#9" is added to the group #X are calculated. Since c52 is the $SAR_3$ value of the selection number "#9" (see FIG. 19), the total $SAR_3$ value is c51+c52. Meanwhile, since d52 is the $SAR_4$ value of the selection number "#9" (see FIG. 19), the total $SAR_4$ value is d51+d52. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is not satisfied (No in S205), the selection number "#9" is not added to the "group #X". Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#11" in FIG. 19 is received (Yes in S107). Then, in S203, the SARs when the selection number "#11" is added to the group #X are calculated. Since c62 is the $SAR_3$ value of the selection number "#11" (see FIG. 19), the total $SAR_3$ value is c51+c62. Meanwhile, since d62 is the $SAR_4$ value of the selection number "#11" (see FIG. 19), the total $SAR_4$ value is d51+d62. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is satisfied (Yes in S205), the selection number "#11" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved while realizing the condition that the SAR is equal to or less than the specified value.

Next, description is given of an eleventh example of the correspondence relationship between the wireless communication methods and SARs. FIG. 20 is a table showing the eleventh example of the correspondence relationship between the wireless communication methods and SARs. Based on the table of FIG. 20, description is given of an example of performing the group setting shown in FIG. 13. Note that a difference between FIGS. 16 and 20 is that the selection number and the SAR are separated depending on the "on" or "off" of an MIMO system and an MISO system and "frequency band to be used".

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

In the example of FIG. 20, a number #1 represents that the wireless communication method is the "first wireless communication method", the name of the communication method is "Wireless LAN", the frequency to be used is 2.4 GHz, the MIMO system or the MISO system is "on", the frequency band to be used is 20 MHz, and the $SAR_1$ is a11 the $SAR_2$ is b11 when the terminal transmits modulation signals by using the method of the selection number #1.

The description is given of the case where there is more than one kind of SAR and FIG. 20 shows the case where there are two kinds of SARs. However, a plurality of SAR measurements is required for different objects to be measured and different measurement methods, such that, for example, the SAR when the terminal is attached to a hand is $SAR_1$ and the SAR when the terminal is brought close to the head is $SAR_2$.

Note that although FIG. 20 shows the case where there are two kinds of SARs, as an example, there may be two kinds or more of SARs. In this case, a plurality of kinds of SAR values are defined for each selection number.

A selection number #2 represents that the wireless communication method is the "first wireless communication method", the name of the communication method is "Wireless LAN", the frequency to be used is 2.4 GHz, the MIMO system or the MISO system is "on", the frequency band to be used is 20 MHz or 40 MHz, and the $SAR_1$ is a12 and the $SAR_2$ is b12 when the terminal transmits modulation signals by using the method of the selection number #2.

A selection number #3 represents that the wireless communication method is the "first wireless communication method", the name of the communication method is "wireless LAN", the frequency to be used is 2.4 GHz, the MIMO system or the MISO system is "off", the frequency band to be used is 20 MHz, and the $SAR_1$ is a13 and the $SAR_2$ is b13 when the terminal transmits modulation signals by using the method of the selection number #3.

A selection number #4 represents that the wireless communication method is the "first wireless communication method", the name of the communication method is "wireless LAN", the frequency to be used is 2.4 GHz, the MIMO system or the MISO system is "off", the frequency band to be used is 20 MHz or 40 MHz, and the $SAR_1$ is a14 and the $SAR_2$ is b14 when the terminal transmits modulation signals by using the method of the selection number #4.

A selection number #5 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #5.

A selection number #6 represents that the wireless communication method is the "third wireless communication method", the name of the communication method is "fourth-generation cell-phone", the frequency to be used is 800 MHz, the frequency band to be used is X Hz, and the $SAR_1$ is a31 and the $SAR_2$ is b31 when the terminal transmits modulation signals by using the method of the selection number #6.

A selection number #7 represents that the wireless communication method is the "third wireless communication method", the name of the communication method is "fourth-generation cell-phone", the frequency to be used is 800 MHz, the frequency band to be used is X Hz or Y Hz, and the $SAR_1$ is a32 and the $SAR_2$ is b32 when the terminal transmits modulation signals by using the method of the selection number #7.

A selection number #8 represents that the wireless communication method is the "third wireless communication method", the name of the communication method is "fourth-generation cell-phone", the frequency to be used is 2 GHz, the frequency band to be used is X Hz, and the $SAR_1$ is a33 and the $SAR_2$ is b33 when the terminal transmits modulation signals by using the method of the selection number #8.

A selection number #9 represents that the wireless communication method is the "third wireless communication method", the name of the communication method is "fourth-generation cell-phone", the frequency to be used is 2 GHz, the frequency band to be used is X Hz or Y Hz, and the $SAR_1$ is a34 and the $SAR_2$ is b34 when the terminal transmits modulation signals by using the method of the selection number #9.

A selection number #10 represents that the wireless communication method is the "fourth wireless communication method", the name of the communication method is "cell-phone", the frequency to be used is 10 GHz, and the $SAR_1$ is a41 and the $SAR_2$ is b41 when the terminal transmits modulation signals by using the method of the selection number #10.

A selection number #11 represents that the wireless communication method is the "fourth wireless communication method", the name of the communication method is "cellphone", the frequency to be used is 15 GHz, and the $SAR_1$ is a42 and the $SAR_2$ is b42 when the terminal transmits modulation signals by using the method of the selection number #11.

A selection number #12 represents that the wireless communication method is the "fifth wireless communication method", the name of the communication method is "high-speed wireless LAN", the frequency to be used is 20 GHz, and the $SAR_1$ is a51 and the $SAR_2$ is b51 when the terminal transmits modulation signals by using the method of the method of the selection number #12.

A selection number #13 represents that the wireless communication method is the "fifth wireless communication method", the name of the communication method is "high-speed wireless LAN", the frequency to be used is 60 GHz, the MIMO system or the MISO system is "on", the frequency band to be used is P Hz, and the $SAR_1$ is a52 and the $SAR_2$ is b52 when the terminal transmits modulation signals by using the method of the selection number #13.

A selection number #14 represents that the wireless communication method is the "fifth wireless communication method", the name of the communication method is "high-speed wireless LAN", the frequency to be used is 60 GHz, the MIMO system or the MISO system is "on", the frequency band to be used is P Hz or Q Hz, and the $SAR_1$ is a53 and the $SAR_2$ is b53 when the terminal transmits modulation signals by using the method of the selection number #14.

A selection number #15 represents that the wireless communication method is the "fifth wireless communication method", the name of the communication method is "high-speed wireless LAN", the frequency to be used is 60 GHz, the MIMO system or the MISO system is "off", the frequency band to be used is P Hz, and the $SAR_1$ is a54 and the $SAR_2$ is b54 when the terminal transmits modulation signals by using the method of the selection number #15.

A selection number #16 represents that the wireless communication method is the "fifth wireless communication method", the name of the communication method is "high-speed wireless LAN", the frequency to be used is 60 GHz, the MIMO system or the MISO system is "off", the frequency band to be used is P Hz or Q Hz, and the $SAR_1$ is a55 and the $SAR_2$ is b55 when the terminal transmits modulation signals by using the method of the selection number #16.

Based on the table of FIG. 20, description is given of an example of performing the group setting shown in FIG. 13.

For example, it is assumed that the terminal performs setting of the "group #Y". In this event, description is given of the method for setting the "group #Y" based on FIGS. 13 and 20. Note that, in the following description, the "group #X" in FIG. 13 is replaced by the "group #Y".

After receiving the operation to start the selection of the communication method in S101, the terminal receives selection of the selection number "#6" in FIG. 20, for example, in S102. Next, in S203, an SAR is calculated when the selection number "#6" is selected. For the selection number "#6", the $SAR_1$ is a31 and the $SAR_2$ is b31. In S204, these SAR values are compared with the specified values for them. Here, when both of the $SAR_1$ and $SAR_2$ are equal to or less than the specified values (Yes in S205), the selection number "#6" is added to the "group #Y" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#11" in FIG. 20 is received (Yes in S107). In this case, the processing returns to S203 to calculate the total SAR values when the selection number "#11" is added to the group #Y. Since a42 is the $SAR_1$ value of the selection number "#11" (see FIG. 20), the total $SAR_1$ value is a31+a42. Meanwhile, since b42 is the $SAR_2$ value of the selection number "#11" (see FIG. 20), the total $SAR_2$ value is b31+b42. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#11" is not added to the "group #Y".

Thereafter, it is determined in S107 whether or not the next selection of a "communication method for simultaneous transmission" is received. When the selection is performed by the user, the processing goes back again to S203.

Here, it is assumed that the selection of the selection number "#14" in FIG. 20 is received (Yes in S107). Then, in S203, the total $SAR_1$ value and the total $SAR_2$ value when the selection number "#14" is added to the group #Y are calculated. Since a53 is the $SAR_1$ value of the selection number "#14" (see FIG. 20), the total $SAR_1$ value is a31+a53. Meanwhile, since b53 is the $SAR_2$ value of the selection number "#14" (see FIG. 20), the total $SAR_2$ value is b31+b53. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#14" is added to the "group #Y" in S106.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #Y". Thereafter, the terminal calls up the group #Y and uses the plurality of communication methods included in the group #Y to transmit data. Thus, the terminal can achieve the effects that a plurality of modulation signals can be simultaneously transmitted and the data transmission rate can be improved while realizing the condition that the SAR is equal to or less than the specified value.

Next, description is given of a twelfth example of the correspondence relationship between the wireless communication methods and SARs. FIG. 21 is a table showing the twelfth example of the correspondence relationship between the wireless communication methods and SARs. Here, description is given of an example of the case where the group setting in FIG. 13 is performed based on the table of FIG. 21. In FIG. 21, $SAR_1$ and $SAR_2$ are those when the frequency used by the communication methods is 6 GHz or less, for example. For example, the SAR when the terminal is attached to a hand is $SAR_1$ and the SAR when the terminal is brought close to the head is $SAR_2$.

Meanwhile, $SAR_3$ and $SAR_4$ are those when the frequency used by the communication methods is 6 GHz or more, for example. For example, the SAR when the terminal is attached to a hand is $SAR_3$ and the SAR when the terminal is brought close to the head is $SAR_4$.

More specifically, in the example of FIG. 21, when the frequency used by the communication methods is 6 GHz or less, there are $SAR_1$ and $SAR_2$ as values. On the other hand, when the frequency used by the communication methods is 6 GHz or more, there are $SAR_3$ and $SAR_4$ as values. Also, there are specified values for the $SAR_1$ to $SAR_4$ in FIG. 21, respectively. Note that although FIG. 21 shows the example where there are four kinds of SARs, the number of the kinds of SARs is not limited to four kinds.

More specifically, FIG. 21 shows an example where the SAR control method varies depending on the frequency used by the communication methods. In the example of FIG. 21, control of the $SAR_1$ and $SAR_2$ is performed when the frequency used by the communication methods is 6 GHz or less, while control of the $SAR_3$ and $SAR_4$ is performed when the frequency used by the communication methods is 6 GHz or more. Note, however, that the classification as shown in FIG. 21 is merely an example, and the classification method using the frequency to be used by the communication methods is not limited to the method of FIG. 21.

Note that a difference between FIGS. 17 and 21 is that the selection number and the SAR are separated depending on the "on" or "off" of an MIMO system and an MISO system and "frequency band to be used".

Here, the "on" of the MIMO system or the MISO system means transmission using the MIMO system or the MISO system (that is, transmission of modulation signals by using a plurality of antennas). On the other hand, the "off" of the MIMO system or the MISO system means no transmission using the MIMO system or no transmission using the MISO system (that is, transmission of modulation signals by using a single antenna).

In the example of FIG. 21, a number #1 represents that the wireless communication method is the "first wireless communication method", the name of the communication method is "Wireless LAN", the frequency to be used is 2.4 GHz, the MIMO system or the MISO system is "on", the frequency band to be used is 20 MHz, and the $SAR_1$ is a11 the $SAR_2$ is b11 when the terminal transmits modulation signals by using the method of the selection number #1. The selection number #1 also represents that there are no $SAR_3$ and $SAR_4$ as values since the frequency to be used is 2.4 GHz.

A selection number #2 represents that the wireless communication method is the "first wireless communication method", the name of the communication method is "wireless LAN", the frequency to be used is 2.4 GHz, the MIMO system or the MISO system is "on", the frequency band to be used is 20 MHz or 40 MHz, and the $SAR_1$ is a12 and the $SAR_2$ is b12 when the terminal transmits modulation signals by using the method of the selection number #2. The selection number #2 also represents that there are no $SAR_3$ and $SAR_4$ as values since the frequency to be used is 2.4 GHz.

A selection number #3 represents that the wireless communication method is the "first wireless communication method", the name of the communication method is "Wireless LAN", the frequency to be used is 2.4 GHz, the MIMO system or the MISO system is "off", the frequency band to be used is 20 MHz, and the $SAR_1$ is a13 and the $SAR_2$ is b13 when the terminal transmits modulation signals by using the method of the selection number #3. The selection number #3 also represents that there are no $SAR_3$ and $SAR_4$ as values since the frequency to be used is 2.4 GHz.

A selection number #4 represents that the wireless communication method is the "first wireless communication method", the name of the communication method is "wireless LAN", the frequency to be used is 2.4 GHz, the MIMO system or the MISO system is "off", the frequency band to be used is 20 MHz or 40 MHz, and the $SAR_1$ is a14 and the $SAR_2$ is b14 when the terminal transmits modulation signals by using the method of the selection number #4. The selection number #4 also represents that there are no $SAR_3$ and $SAR_4$ as values since the frequency to be used is 2.4 GHz.

A selection number #5 represents that the wireless communication method is the "second wireless communication method", the name of the communication method is "Bluetooth (registered trademark)", the frequency to be used is 2.4 GHz, and the $SAR_1$ is a21 and the $SAR_2$ is b21 when the terminal transmits modulation signals by using the method of the selection number #5. The selection number #5 also represents that there are no $SAR_3$ and $SAR_4$ as values since the frequency to be used is 2.4 GHz.

A selection number #6 represents that the wireless communication method is the "third wireless communication method", the name of the communication method is "fourth-generation cell-phone", the frequency to be used is 800 MHz, the frequency band to be used is X Hz, and the $SAR_1$ is a31 and the $SAR_2$ is b31 when the terminal transmits modulation signals by using the method of the selection number #6. The selection number #6 also represents that there are no $SAR_3$ and $SAR_4$ as values since the frequency to be used is 800 MHz.

A selection number #7 represents that the wireless communication method is the "third wireless communication method", the name of the communication method is "fourth-generation cell-phone", the frequency to be used is 800 MHz, the frequency band to be used is X Hz or Y Hz, and the $SAR_1$ is a32 and the $SAR_2$ is b32 when the terminal transmits modulation signals by using the method of the selection number #7. The selection number #7 also represents that there are no $SAR_3$ and $SAR_4$ as values since the frequency to be used is 800 MHz.

A selection number #8 represents that the wireless communication method is the "third wireless communication method", the name of the communication method is "fourth-generation cell-phone", the frequency to be used is 2 GHz, the frequency band to be used is X Hz, and the $SAR_1$ is a33 and the $SAR_2$ is b33 when the terminal transmits modulation signals by using the method of the selection number #8. The selection number #8 also represents that there are no $SAR_3$ and $SAR_4$ as values since the frequency to be used is 2 GHz.

A selection number #9 represents that the wireless communication method is the "third wireless communication method", the name of the communication method is "fourth-generation cell-phone", the frequency to be used is 2 GHz, the frequency band to be used is X Hz or Y Hz, and the $SAR_1$ is a34 and the $SAR_2$ is b34 when the terminal transmits modulation signals by using the method of the selection number #9. The selection number #9 also represents that there are no $SAR_3$ and $SAR_4$ as values since the frequency to be used is 2 GHz.

A selection number #10 represents that the wireless communication method is the "fourth wireless communication method", the name of the communication method is "cell-phone", the frequency to be used is 10 GHz, and the $SAR_3$ is c41 and the $SAR_4$ is d41 when the terminal transmits modulation signals by using the method of the selection number #10. The selection number #10 also represents that there are no $SAR_1$ and $SAR_2$ as values since the frequency to be used is 10 GHz.

A selection number #11 represents that the wireless communication method is the "fourth wireless communication method", the name of the communication method is "cellphone", the frequency to be used is 15 GHz, and the $SAR_3$ is c42 and the $SAR_4$ is d42 when the terminal transmits modulation signals by using the method of the selection number #11. The selection number #11 also represents that there are no $SAR_1$ and $SAR_2$ as values since the frequency to be used is 15 GHz.

A selection number #12 represents that the wireless communication method is the "fifth wireless communication method", the name of the communication method is "high-speed wireless LAN", the frequency to be used is 20 GHz, and the $SAR_3$ is c51 and the $SAR_4$ is d51 when the terminal transmits modulation signals by using the method of the method of the selection number #12. The selection number #12 also represents that there are no $SAR_1$ and $SAR_2$ as values since the frequency to be used is 20 GHz.

A selection number #13 represents that the wireless communication method is the "fifth wireless communication method", the name of the communication method is "high-speed wireless LAN", the frequency to be used is 60 GHz, the MIMO system or the MISO system is "on", the frequency band to be used is P Hz, and the $SAR_3$ is c52 and the $SAR_4$ is d52 when the terminal transmits modulation signals by using the method of the selection number #13. The selection number #13 also represents that there are no $SAR_1$ and $SAR_2$ as values since the frequency to be used is 60 GHz.

A selection number #14 represents that the wireless communication method is the "fifth wireless communication method", the name of the communication method is "high-speed wireless LAN", the frequency to be used is 60 GHz, the MIMO system or the MISO system is "on", the frequency band to be used is P Hz or Q Hz, and the $SAR_3$ is c53 and the $SAR_4$ is d53 when the terminal transmits modulation signals by using the method of the selection number #14. The selection number #14 also represents that there are no $SAR_1$ and $SAR_2$ as values since the frequency to be used is 60 GHz.

A selection number #15 represents that the wireless communication method is the "fifth wireless communication method", the name of the communication method is "high-speed wireless LAN", the frequency to be used is 60 GHz, the MIMO system or the MISO system is "off", the frequency band to be used is P Hz, and the $SAR_3$ is c54 and the $SAR_4$ is d54 when the terminal transmits modulation signals by using the method of the selection number #15. The selection number #15 also represents that there are no $SAR_1$ and $SAR_2$ as values since the frequency to be used is 60 GHz.

A selection number #16 represents that the wireless communication method is the "fifth wireless communication method", the name of the communication method is "high-speed wireless LAN", the frequency to be used is 60 GHz, the MIMO system or the MISO system is "off", the frequency band to be used is P Hz or Q Hz, and the $SAR_3$ is c55 and the $SAR_4$ is d55 when the terminal transmits modulation signals by using the method of the selection number #16. The selection number #16 also represents that there are no $SAR_1$ and $SAR_2$ as values since the frequency to be used is 60 GHz.

FIG. 13 shows an example of the flowchart of control that is one of the operations performed by the transmission controller 305 in FIG. 3. Note that since the operations shown in FIG. 13 are described in Embodiment 2, description thereof is omitted.

Based on the table of FIG. 21, description is given of an example of performing the group setting shown in FIG. 13.

For example, it is assumed that the terminal performs the setting of the "group #X". In this event, description is given of the method for setting the "group #X" based on FIGS. 13 and 21.

After receiving the operation to start the selection of the communication method in S101, the terminal receives selection of the selection number "#6" in FIG. 21, for example, in S102. Next, in S203, an SAR is calculated when the selection number "#6" is selected. The $SAR_1$ is a31 and the $SAR_2$ is b31. In S204, these SAR values are compared with the specified values for them. It is assumed that the $SAR_1$ is equal to or less than the specified value, and the $SAR_2$ is equal to or less than the specified value. Since there is no $SAR_3$ value or no $SAR_4$ value, the specified value for the $SAR_3$ is not to be evaluated, and the specified value for the $SAR_4$ is also not to be evaluated. Therefore, when both of the $SAR_1$ and $SAR_2$ are equal to or less than the specified value (Yes in S205), the selection number "#6" is added to the "group #X" in S106. More specifically, it is checked if "j is 1 to M (M is an integer of 2 or more) and, with every j satisfying that condition, $SAR_j$ is equal to or less than a specified value determined for $SAR_j$".

Next, it is determined in S107 whether or not the next selection of a "communication method for simultaneous transmission" is received. For example, it is assumed that the selection of the selection number "#9" in FIG. 21 is received (Yes in S107). In this case, the processing returns to S203 to calculate the SARs when the selection number "#9" is added to the group #X. Since a34 is the $SAR_1$ value of the selection number "#9" (see FIG. 21), the total $SAR_1$ value is a31+a34. Meanwhile, since b34 is the $SAR_2$ value of the selection number "#9" (see FIG. 21), the total $SAR_2$ value is b31+b34. In S204, these total SAR values are compared with the specified values for them. Here, if the condition that "the total $SAR_1$ value is equal to or less than the specified value for the $SAR_1$ and the total $SAR_2$ value is equal to or less than the specified value for the $SAR_2$" is not satisfied (No in S205), the selection number "#9" is not added to the "group #X". Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#1" in FIG. 21 is received (Yes in S107). Then, in S203, the SARs when the selection number "#1" is added to the group #X are calculated. Since a11 is the $SAR_1$ value of the selection number "#1" (see FIG. 21), the total $SAR_1$ value is a31+a11. Meanwhile, since b11 is the $SAR_2$ value of the selection number "#1" (see FIG. 21), the total $SAR_2$ value is b31+b11. In S204, these total SAR values are compared with the specified values. Here, if the condition that "the total $SAR_1$ value is equal to or less than the specified value for the $SAR_1$ and the total $SAR_2$ value is equal to or less than the specified value for the $SAR_2$" is satisfied (Yes in S205), the selection number "#1" is added to the "group #X" in S106. Note that since there is no $SAR_3$ value or no $SAR_4$ value, the specified value for the $SAR_3$ is not to be evaluated, and the specified value for the $SAR_4$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#10" in FIG. 21 is received (Yes in S107). Then, in S203, the SARs when the selection number "#10" is added to the group #X are calculated. Since c41 is the $SAR_3$ value of the selection number "#10" (see FIG. 21), the total $SAR_3$ value is c41. Meanwhile, since d41 is the $SAR_4$ value of the selection number "#10" (see FIG. 21), the total $SAR_4$ value is d41. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is satisfied (Yes in S205), the selection number "#10" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#11" in FIG. 21 is received (Yes in S107). Then, in S203, the SARs when the selection number "#11" is added to the group #X are calculated. Since c42 is the $SAR_3$ value of the selection number "#11" (see FIG. 21), the total $SAR_3$ value is c41+c42. Meanwhile, since d42 is the $SAR_4$ value of the selection number "#11" (see FIG. 21), the total $SAR_4$ value is d41+d42. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is not satisfied (No in S205), the selection number "#11" is not added to the "group #X". Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the selection is performed by the user, the processing goes back again to S203.

Here, it is assumed that the selection of the selection number "#13" in FIG. 21 is received (Yes in S107). Then, in S203, the SARs when the selection number "#13" is added to the group #X are calculated. Since c52 is the $SAR_3$ value of the selection number "#13" (see FIG. 21), the total $SAR_3$ value is c41+c52. Meanwhile, since d52 is the $SAR_4$ value of the selection number "#13" (see FIG. 21), the total $SAR_4$ value is d41+d52. In S204, these total SAR values are compared with the specified values. Here, if the condition that "the total $SAR_3$ value is equal to or less than the specified value for the $SAR_3$ and the total $SAR_4$ value is equal to or less than the specified value for the $SAR_4$" is satisfied (Yes in S205), the selection number "#13" is added to the "group #X" in S106. Note that since there is no $SAR_1$ value or no $SAR_2$ value, the specified value for the $SAR_1$ is not to be evaluated, and the specified value for the $SAR_2$ is also not to be evaluated.

Thereafter, it is determined in S107 whether or not the next selection of a "communication method for simultaneous transmission" is received. When the next selection of the "communication method for simultaneous transmission" is not received from the user (No in S107), for example, when an instruction "not to select" is received from the user, "the selection of the communication method for simultaneous transmission is completed" (S108).

Then, the terminal stores information (group information) of a combination of a plurality of communication methods for use in simultaneous transmission, as the "group #X". Thereafter, the terminal calls up the group #X and uses the plurality of communication methods included in the group #X to transmit data. Thus, the terminal can achieve the effects that a plurality of modulation signals can be simultaneously transmitted and the data transmission rate can be improved while realizing the condition that the SAR is equal to or less than the specified value.

As described above, in this embodiment, the user selects a plurality of communication methods for use in simultaneous transmission and forms a group including the plurality of communication methods such that the total SAR value is equal to or less than the specified value. Thus, by simultaneously transmitting the modulation signals based on the group information, the effect that the data transmission rate can be improved can be achieved while realizing the condition that the total SAR value is equal to or less than the specified value.

Note that, in this embodiment, the description is given of the wireless LAN, Bluetooth (registered trademark), the third-generation cell-phone, and the fourth-generation cell-phone as examples of the communication method. However, the present disclosure is not limited thereto. This embodiment can be similarly implemented even when another wireless communication method is selected as one of the communication methods for simultaneous transmission. Moreover, although the method for classifying the selection numbers is described with reference to FIGS. 16, 17, 18, 19, 20, and 21, the present disclosure is not limited thereto. The group setting described in this embodiment can be similarly performed by using another classification method to set the selection numbers.

Moreover, the screen of the terminal may also allow confirmation as shown in FIG. 10. FIG. 10 is a diagram showing a relationship between the communication method and a (predicted) transmission rate. (Note that, as described above, the transmission rate may be a data transmission rate upon receipt by the terminal or may be a data transmission rate upon transmission by the terminal. Alternatively, the data transmission rate upon transmission by the terminal and the data transmission rate upon receipt by the terminal may be both displayed. Naturally, only one of the data transmission rates may be displayed thereon.) Note that since explanation of FIG. 10 is described in Embodiment 1, description thereof is omitted.

Such display performed by the terminal provides the user with an advantage that he/she can select a suitable communication method by taking into consideration a transmission rate of request data and the remaining battery level, for example. Thus, the effect can be achieved that the setting method described in this embodiment can be effectively used.

Moreover, as for the grouping performed by the terminal described in this embodiment, the user may perform the grouping by operating the terminal or the user may perform the setting of the terminal for the grouping described in this embodiment through another device. Since this point is described with reference to FIG. 11 in Embodiment 1, description thereof is omitted.

Embodiment 4

In this embodiment, description is given of a method for selecting a wireless communication method by a communication station utilizing the grouping at the terminal described above.

A communication state as shown in FIG. 1 is considered as a communication state of a terminal, communication stations, a proxy server, and a server. In this event, it is assumed that the terminal has performed the setting of grouping of the wireless communication methods for simultaneous transmission, as described in Embodiments 1 to 3.

In this embodiment, it is assumed that the terminal sets a "group that is a combination of a plurality of wireless communication methods for use in simultaneous transmission", and uses any of the communication methods to transmit the information to the server 102 and/or the proxy server 104 in FIG. 1.

For example, it is assumed that the transmission controller 305 in the terminal 108 in FIG. 3 sets the "group that is a combination of a plurality of wireless communication methods for use in simultaneous transmission" based on Embodiments 1 to 3. An i-th transmitter 307_i (i is an integer of 1 to N) receives a transmission control signal 306 including group information about the "group that is a combination of a plurality of wireless communication methods for use in simultaneous transmission". Then, any one or more of the i-th transmitters 307_i transmit the information about the "group that is a combination of a plurality of wireless communication methods for use in simultaneous transmission".

FIG. 22 is a diagram showing an example of a frame configuration of a transmission signal. An X-th transmitter 307_X transmits a transmission signal having a frame configuration as shown in FIG. 22 when the terminal transmits the group information about the "group that is a combination of a plurality of wireless communication methods for use in simultaneous transmission".

In FIG. 22, the horizontal axis represents time, while the vertical axis represents frequency. It is assumed that a preamble 2201 is a symbol for a reception device (communication station) to synchronize the time, to synchronize the frequency, to detect a signal, and to estimate a change in transmission path.

It is assumed that a control information symbol 2202 includes the information about the "group that is a combination of a plurality of wireless communication methods for use in simultaneous transmission" described above, in addition to information about an error correction method (information of error correction coding and information about a code length, a coding rate, and the like) used to generate a data symbol 2203, information about a modulation system, and information about a transmission method.

It is assumed that the data symbol 2203 is a symbol for transmitting data.

Note that the frame configuration is not limited to that shown in FIG. 22, but may also include symbols other than those shown in FIG. 22, such as a pilot symbol and a reference symbol, for example.

The proxy server 104 in FIG. 1 acquires the information about the "group that is a combination of a plurality of wireless communication methods for use in simultaneous transmission", which is transmitted by the terminal 108 through the first communication station 106-1, the second communication station 106-2, . . . , and the N-th communication station 106-N. Note that, as described in Embodiments 1 to 3, the setting of the "a group including a plurality of wireless communication methods for simultaneous transmission" can also be performed by another device (for example, a computer or the like). In this case, such another device may transmit the information about the "group that is a combination of a plurality of wireless communication methods for use in simultaneous transmission" by wire and/or wirelessly to the proxy server 104.

Figure 23:
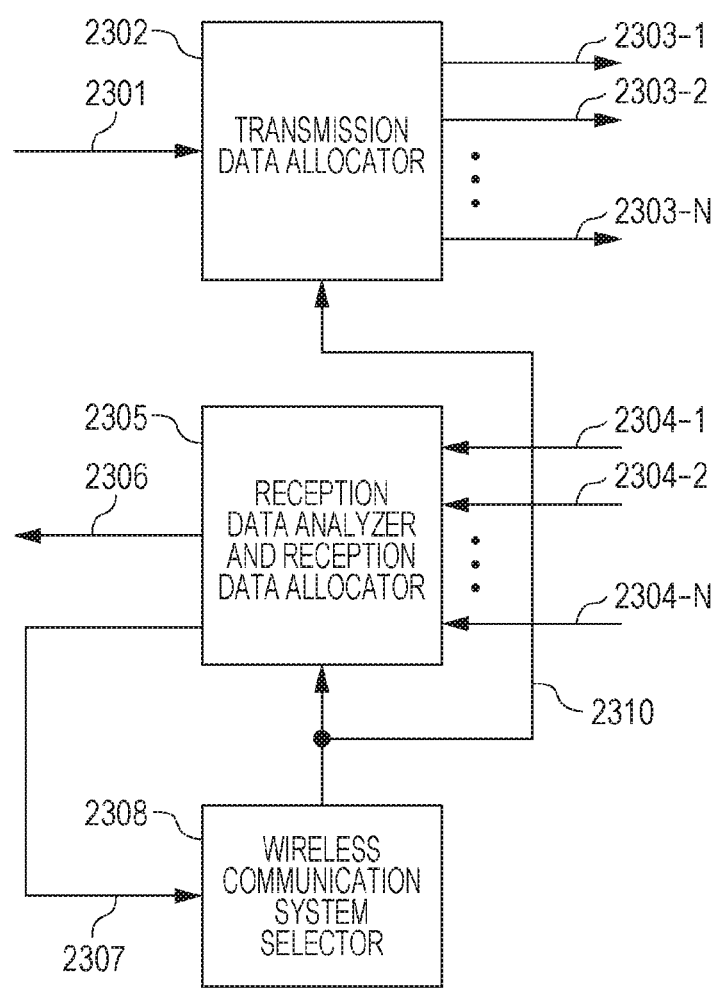
FIG. 23 is a diagram showing an example of a configuration of a proxy server.

The configuration of the proxy server in this case is described. FIG. 23 is a diagram showing an example of the configuration of the proxy server 104. A reception data analyzer and reception data allocator 2305 in FIG. 23 receives reception data 2304-1 from the first communication station 106-1, reception data 2304-2 from the second communication station 106-2, . . . , and reception data 2304-N from the N-th communication station 106-N, analyzes the reception data, extracts the information about the "group that is a combination of a plurality of wireless communication methods for use in simultaneous transmission", and outputs a signal 2307 including group information.

Also, the reception data analyzer and reception data allocator 2305 allocates the reception data 2304-1 from the first communication station 106-1, the reception data 2304-2 from the second communication station 106-2, . . . , and the reception data 2304-N from the N-th communication station 106-N, and outputs reception data 2306, for example.

A wireless communication method selector 2308 receives the signal 2307 including the group information about the "group that is a combination of a plurality of wireless communication methods for use in simultaneous transmission", and selects one or more wireless communication methods for use in data transmission, based on the group information.

As described in Embodiment 1, it is assumed, for example, that the selection number #1 and the selection number #6 in the table of FIG. 4 are registered as the group #X, and the wireless communication method selector 2308 acquires this information. Then, the wireless communication method selector 2308 selects the selection number #1 and the selection number #6 in the table of FIG. 4 as the wireless communication methods for transmitting data, and outputs this information as a selection signal 2310.

A transmission data allocator 2302 receives the data 2301 and the selection signal 2310, and allocates the data 2301 for the communication station corresponding to the wireless communication methods of "the selection number #1 and the selection number #6 in the table of FIG. 4" to transmit the data, since the selection signal 2310 indicates "the selection number #1 and the selection number #6 in the table of FIG. 4". When the communication stations corresponding to the wireless communication methods of "the selection number #1 and the selection number #6 in the table of FIG. 4" are, for example, the first communication station 106-1 and the N-th communication station 106-N in FIG. 1, the transmission data allocator 2302 in FIG. 23 allocates the data 2301 to first data 2303-1 and N-th data 2303-N. Then, the first communication station 106-1 transmits a modulation signal including the first data 2303-1, while the N-th communication station 106-N transmits a modulation signal including the N-th data 2303-N.

Note that when the group #X that is the "group that is a combination of a plurality of wireless communication methods for use in simultaneous transmission" includes, for example, two or more selection numbers corresponding to the table of FIG. 4 or the like, the communication stations (in FIG. 1) do not have to transmit data by using the wireless communication methods corresponding to all the selection numbers included in the group #X. More specifically, one or more selection numbers may be selected from the selection numbers included in the group #X that is the "group that is a combination of a plurality of wireless communication methods for use in simultaneous transmission", and the communication stations (in FIG. 1) may transmit modulation signals including data.

Moreover, as described in Embodiments 1 to 3, there is a case where a plurality of "groups that are combinations of a plurality of wireless communication methods for use in simultaneous transmission" is set. In this case, for example, the terminal 108 may hand over group information indicating a plurality of groups to the proxy server 104, the proxy server 104 may select one or more selection numbers from the selection numbers corresponding to the table of FIG. 4 or the like, based on the information, and the communication stations (in FIG. 1) may transmit modulation signal including data.

It is assumed, for example, that the terminal 108 sets the groups #X and #Y as the "groups that are combinations of a plurality of wireless communication methods for use in simultaneous transmission". Then, the terminal 108 transmits information about the group #X and information about the group #Y to the proxy server 104. In response, the proxy server 104 selects either the group #X or the group #Y. Then, the selection number for transmitting data is selected from the selection numbers (corresponding to the table of FIG. 4 or the like) included in the selected group, and the communication station corresponding to the selection number for transmitting data transmits modulation signals including the data.

As described above, this embodiment can achieve the effect that the data transmission rate can be improved while realizing the condition that the SAR is equal to or less than the specified value, by transmitting the information of the "group that is a combination of a plurality of wireless communication methods for use in simultaneous transmission" set by the terminal to the proxy server and selecting the wireless communication method based on the information.

Although the above description is given of the configuration in which the operations are performed by the proxy server, the server rather than the proxy server may perform the operations described above. Therefore, the proxy server 104 in FIG. 1 may be replaced by the server. In this event, the server has the configuration shown in FIG. 23.

Note that the above description is given of the case where the proxy server or the server allocates the transmission data or the reception data to the plurality of communication stations, based on the group information. Alternatively, an electronic device such as a computer connected to the proxy server or the server may allocate the data to a plurality of communication stations based on the group information. Also, the proxy server may be the server, and the proxy server and the server may be called differently (the names thereof are not limited to the server and the proxy server).

Embodiment 5

In this embodiment, detailed description is given of a method for setting a wireless communication method different from that of Embodiment 4.

A communication state as shown in FIG. 1 is considered as a communication state of a terminal, communication stations, a proxy server, and a server.

It is assumed that the terminal transmits, for example, information about the tables of FIGS. 4, 7, 12, 14, 15, 16, 17, 18, 19, 20, and 21, that is, information about the correspondence relationship between the wireless communication methods and the SARs at the terminal to the server 102 and/or the proxy server 104 in FIG. 1.

For example, an i-th transmitter 307_i (i is an integer of 1 to N) receives the information about the correspondence relationship between the wireless communication methods and the SARs at the terminal, which is held by the transmission controller 305 in the terminal 108 shown in FIG. 3. Then, any one or more of the i-th transmitters 307_i transmit the "information about the correspondence relationship between the wireless communication methods and the SARs".

A transmission signal transmitted by an X-th transmitter 307_X when the terminal transmits the "information about the correspondence relationship between the wireless communication methods and the SARs" has the same frame configuration as that shown in FIG. 22.

In FIG. 22, the horizontal axis represents time, while the vertical axis represents frequency. It is assumed that a preamble 2201 is a symbol for a reception device (communication station) to synchronize the time, to synchronize the frequency, to detect a signal, and to estimate a change in transmission path.

It is assumed that a control information symbol 2202 includes the "information about the correspondence relationship between the wireless communication methods and the SARs" described above, in addition to information about an error correction method (information of error correction coding and information about a code length, a coding rate, and the like) used to generate a data symbol 2203, information about a modulation system, and information about a transmission method.

It is assumed that the data symbol 2203 is a symbol for transmitting data.

Note that the frame configuration is not limited to that shown in FIG. 22, but may also include symbols other than those shown in FIG. 22, such as a pilot symbol and a reference symbol, for example.

The proxy server 104 in FIG. 1 acquires the "information about the correspondence relationship between the wireless communication methods and the SARs", which is transmitted by the terminal 108 through the first communication station 106-1, the second communication station 106-2, ..., and the N-th communication station 106-N. Note that another device may transmit the "information about the correspondence relationship between the wireless communication methods and the SARs" by wire and/or wirelessly to the proxy server 104.

The configuration of the proxy server in this case has the same configuration of the proxy server 104 shown as an example in FIG. 23. A reception data analyzer and reception data allocator 2305 in FIG. 23 receives reception data 2304-1 from the first communication station 106-1, reception data 2304-2 from the second communication station 106-2, ..., and reception data 2304-N from the N-th communication station 106-N, analyzes the reception data, extracts the "information about the correspondence relationship between the wireless communication methods and the SARs", and outputs a signal 2307 including the "information about the correspondence relationship between the wireless communication methods and the SARs".

Also, the reception data analyzer and reception data allocator 2305 allocates the reception data 2304-1 from the first communication station 106-1, the reception data 2304-2 from the second communication station 106-2, ..., and the reception data 2304-N from the N-th communication station 106-N, and outputs reception data 2306, for example.

A wireless communication method selector 2308 receives the signal 2307 including the "information about the correspondence relationship between the wireless communication methods and the SARs", and selects one or more wireless communication methods for use in data transmission, based on the "information about the correspondence relationship between the wireless communication methods and the SARs".

In this event, the wireless communication system selector 2308 selects one or more wireless communication methods for transmitting data, in consideration of the fact that the SAR is equal to or less than the specified value even when the terminal performs simultaneous transmission. In this event, one or more wireless communication methods for use in data transmission are selected based on the "information about the correspondence relationship between the wireless communication methods and the SARs" acquired from the terminal.

Using the one or more (or a plurality of) wireless communication methods for transmitting data selected by the wireless communication system selector 2308, any of the first communication station 106-1, the second communication station 106-2, . . . , and the N-th communication station 106-N in FIG. 1 transmits modulation signals including data to the terminal 108. However, there is a possibility that the terminal 108 transmits modulation signals by using one or more (or a plurality of) wireless communication methods for transmitting data selected by the wireless communication system selector 2308. In this event, the terminal may perform simultaneous transmission using "one or more (or a plurality of) wireless communication methods for transmitting data selected by the wireless communication system selector 2308". The same goes for Embodiment 4.

Therefore, when selecting one or more wireless communication methods for use in data transmission, the wireless communication system selector 2308 selects one or more wireless communication methods in such a combination that the SAR is equal to or less than the specified value during simultaneous transmission by the terminal 108. As for the selection, the wireless communication method is selected so that the SAR is equal to or less than the specified value, based on the "information about the correspondence relationship between the wireless communication methods and the SARs" transmitted by the terminal. Then, among the first communication station 106-1, the second communication station 106-2, . . . and the N-th communication station 106-N in FIG. 1, the communication station corresponding to the selected wireless communication method transmits data.

As described above, in this embodiment, the proxy server 104 selects the wireless communication method so that the SAR is equal to or less than the specified value, based on the "information about the correspondence relationship between the wireless communication methods and the SARs" transmitted by the terminal 108, and the communication station transmits data. Thus, the effect that the data transmission rate can be improved can be achieved while realizing the condition that the SAR is equal to or less than the specified value at the terminal 108.

Although the above description is given of the configuration in which the operations are performed by the proxy server, the server rather than the proxy server may perform the operations described above. Therefore, the proxy server 104 in FIG. 1 may be replaced by the server. In this event, the server has the configuration shown in FIG. 23.

Note that the above description is given of the case where the proxy server or the server allocates the transmission data or the reception data to the plurality of communication stations, based on the group information. Alternatively, an electronic device such as a computer connected to the proxy server or the server may allocate the data to a plurality of communication stations based on the group information. Also, the proxy server may be the server, and the proxy server and the server may be called differently (the names thereof are not limited to the server and the proxy server).

Embodiment 6

In this embodiment, description is given of a case where a "group that is a combination of a plurality of wireless communication methods for use in simultaneous transmission" is switched to another group when the terminal transmits modulation signals.

It is assumed that, for example, the terminal 108 performs the setting of the groups #X and #Y as the "groups that are combinations of a plurality of wireless communication methods for use in simultaneous transmission". Switching between the groups is described taking this case as an example. Note that the number of groups to be set may be three or more.

FIG. 24 is a diagram showing an example of the timing of switching between groups. The horizontal axis in FIG. 24 represents a time axis. FIG. 24 shows that the groups #X and #Y as the "groups that are combinations of a plurality of wireless communication methods for use in simultaneous transmission" are switched in the time axis direction.

To be more specific, in a time slot 2401, the terminal transmits data by using a plurality of communication methods included in the group #X, and receives data by using a plurality of communication methods included in the group #Y. Note that although the description is given of the example where, in FIG. 24, the terminal performs the reception for the group #Y in the time slot 2401, the reception for the group #Y does not have to be performed. Moreover, the time slot of transmission for the group #X may be different from (the same as) the time slot of reception for the group #Y. Between the time slot 2401 and a time slot 2402, that is, during switching between the transmission timing and the reception timing at the terminal, the "groups that are combinations of a plurality of wireless communication methods for use in simultaneous transmission" are switched from the group #X to the group #Y.

Similarly to the time slot 2401, in a time slot 2402, the terminal transmits data by using a plurality of communication methods included in the group #Y, and receives data by using a plurality of communication methods included in the group #X. Note that although the description is given of the example where, in FIG. 24, the terminal performs the reception for the group #X in the time slot 2402, the reception for the group #X does not have to be performed. Moreover, the time slot of transmission for the group #Y may be different from (the same as) the time slot of reception for the group #X. Between the time slot 2402 and a time slot 2403, that is, during switching between the transmission timing and the reception timing at the terminal, the "groups that are combinations of a plurality of wireless communication methods for use in simultaneous transmission" are switched from the group #Y to the group #X. Moreover, between the time slot 2403 and a time slot 2404, that is, during switching between the transmission timing and the reception timing at the terminal, the "groups that are combinations of a plurality of wireless communication methods for use in simultaneous transmission" are switched from the group #X to the group #Y.

The switching between the "groups that are combinations of a plurality of wireless communication methods for use in simultaneous transmission" described above may be performed by the terminal when the terminal select the group or may be performed by the proxy server when the proxy server selects the group.

Note that the switching between the groups in the present disclosure is not limited to the switching between the transmission timing and the reception timing at the terminal. A plurality of groups may be switched from one to another in a time-division manner. If the SAR value is suppressed to the specified value or less in each group, it means that the terminal suppresses the SAR value to the specified value or less.

Naturally, the embodiments and other contents described in the present disclosure may be implemented in combination.

Moreover, the embodiments and the other contents are merely examples and thus can be implemented with the same configuration also when different "modulation system, error (disappearance) correction coding system (an error correction code, a code length, a coding rate, and the like to be used), control information and the like" are applied even if the "modulation system, error (disappearance) correction coding system (an error correction code, a code length, a coding rate, and the like to be used), control information and the like" are illustrated, for example.

As for the modulation system, the embodiments and the other contents described in the present disclosure can be implemented also with the use of a modulation system other than the modulation system described in the present disclosure. For example, amplitude phase shift keying (APSK) (for example, 16APSK, 64APSK, 128APSK, 256 APSK, 1024APSK, 4096APSK, and the like), pulse amplitude modulation (PAM) (for example, 4PAM, 8PAM, 16PAM, 64PAM, 128PAM, 256PAM, 1024PAM, 4096PAM, and the like), phase shift keying (PSK) (for example, BPSK, QPSK, 8PSK, 16 PSK, 64PSK, 128PSK, 256PSK, 1024PSK, 4096PSK, and the like), quadrature amplitude modulation (QAM) (for example, 4QAM, 8QAM, 16QAM, 64QAM, 128QAM, 256QAM, 1024QAM, 4096QAM, and the like), and the like may be applied. In each modulation system, uniform mapping or non-uniform mapping may be implemented.

Meanwhile, the modulation signal may be either a signal of a single carrier system or a signal of a multicarier system such as orthogonal frequency division multiplexing (OFDM). As the transmission method, a transmission method (a single-input single-output (SISO) transmission method or a single-input multiple-output (SIMO) transmission method) may be used, wherein a transmission device uses one antenna and a reception device receives signals through one or more antennas. Alternatively, a system (a multiple-input multiple-output (MIMO) transmission system or a multiple-input single-output (MISO) transmission system) may be used, wherein a transmission device transmits a plurality of streams and a reception device receives modulation signals through one or more antennas. Alternatively, a space-time block code or a space-time trellis code may be used (in this event, when a multicarrier system is used such as OFDM, symbols may be arranged in the time axis direction or in the frequency axis direction or in the frequency-time axis direction)

The present disclosure is not limited to the contents described in the above embodiments, but can be implemented in any mode for achieving the object of the present disclosure and an object related thereto or associated therewith and may be as follows, for example.

(1) In the above embodiments, the description is given mainly of the case where the present disclosure is realized by the coder and the transmission device. However, the present disclosure is not limited thereto but is also applicable to the case where the present disclosure is realized by wire broadcasting, wire communication, power line communication, optical communication or a wireless communication device.

(2) The steps of the operations of the transmission-side communication device described in the above embodiments may be described in a program, the program may be previously stored in a read only memory (ROM), and a central processing unit (CPU) may read and execute the program stored in the ROM. Alternatively, the program describing the steps of the operations of the transmission-side communication device may be stored in a computer-readable storage medium, the program stored in the storage medium may be stored in a random access memory (RAM) in a computer, and a CPU in the computer may read and execute the program stored in the RAM.

(3) The configurations in the above embodiments and the like may be typically realized as a large scale integration (LSI) that is an integrated circuit. Such configurations may be individually integrated into one chip. Alternatively, all of or some of the configurations in the embodiments may be integrated into one chip.

The LSI here may be referred to as an integrated circuit (IC), a system LSI, a super LSI, or an ultra LSI depending on a difference in the degree of integration. Moreover, the technique of implementing an integrated circuit is not limited to the LSI and may be realized by using a dedicated circuit or a general-purpose processor. In addition, a field programmable gate array (FPGA) that can be programmed after the manufacture of the LSI or a reconfigurable processor in which the connections and the settings of circuit cells disposed inside the LSI can be reconfigured may be used.

Further, when a technology for implementing an integrated circuit that substitutes the LSI appears in accordance with the advancement of the semiconductor technology or other derivative technologies, it is apparent that the functional block may be integrated by using such technologies. The adaptation of biotechnologies or the like is conceivable.

(4) Needless to say, the present disclosure is useful for not only the wireless communication (wireless broadcasting) but also wire communication and wire broadcasting such as power line communication (PLC), visible light communication, and optical communication.

(5) In the above embodiments, the description is given using the terms, the physical layer, the application layer, and the packet level. However, these are merely definitions and the names thereof are not limited thereto.

(6) The error correcting code of the physical layer may be generally called a forward error correction (FEC) scheme.

(7) The error (disappearance) correcting code of the packet level may be called an application layer (AL)-(Forward Error Correction) scheme.

In the present disclosure, it is contemplated that it is a communication/broadcast equipment, such as a broadcast station, a base station, an access point, a terminal, and a mobile phone, that includes the transmission device. It is also contemplated that it is a communication device, such as a television, a radio, a terminal, a personal computer, a mobile phone, an access point, and a base station, that includes the reception device. Moreover, it is also contemplated that the transmission device and the reception device in the present disclosure are each a device with a communication function and the device is connectable through some kind of interface to a device for executing applications, such as a television, a radio, a personal computer, and a mobile phone.

Moreover, in the above embodiments, symbols other than data symbols, for example, pilot symbols (preamble, unique word, postamble, reference symbol, and the like), control information symbols, and the like may be arranged in any position in a frame. The pilot symbols and the control information symbols here may have any names since functions thereof are important.

The pilot symbol may be, for example, a known symbol modulated using PSK modulation in a transceiver (or a receiver may be able to know, by synchronization, a symbol transmitted by a transmitter), and the receiver uses the symbol to perform frequency synchronization, time synchronization, channel estimation (channel state information (CSI) estimation), signal detection, and the like.

Moreover, the control information symbol is a symbol for transmitting information required to be transmitted to a communication partner (for example, a coding rate of a modulation system, an error (disappearance) correction coding system or an error (disappearance) correction coding used for communication, setting information in an upper layer, and the like) for realizing communication other than data (such as applications).

It is required to notify the transmission device and the reception device of a transmission method (MIMO, SISO, space-time block code, or interleaving method), a modulation system, an error correction coding method, and a packet level error (disappearance) correction method. However, description thereof is omitted in the embodiments. Note that symbols for transmitting such information are included in a frame to be transmitted by the transmission device, and the reception device acquires the frame to change operations.

Note that the present disclosure is not limited to the embodiments described above, but may be implemented by making various changes thereto. For example, in the embodiments, the description is given of the use as a communication device. However, the present disclosure is not limited thereto, and the communication method may be implemented as software.

INDUSTRIAL APPLICABILITY

A terminal apparatus according to the present disclosure is suitable for a terminal capable of transmitting a plurality of modulation signals by using a plurality of wireless communication methods.

What is claimed is:

1. A terminal apparatus comprising: control circuitry which, in operation, generates first group information indicating a combination of two or more simultaneously operable communication methods whose total value of specific absorption rates (SARs) is equal to or less than a threshold value, wherein, if a total value of a first SAR value of the two or more simultaneously operable communication methods indicated in the first group information and the first SAR value of a different communication method that is not included in the first group information is equal to or less than a first threshold value, and if a total value of a second SAR value of the two or more simultaneously operable communication methods indicated in the first group information and the second SAR value of the different communication method is equal to or less than a second threshold value, the control circuitry adds the different communication method to the first group information; and a transmitter which, in operation, transmits transmission data to a plurality of communication stations that respectively support the two or more simultaneously operable communication methods indicated by the first group information, by using corresponding communication methods.

2. The terminal apparatus according to claim 1, further comprising:
a receiver which, in operation, receives reception data, wherein
the transmitter transmits the first group information through at least one communication station,
the receiver receives the reception data through the plurality of communication stations that respectively support the two or more simultaneously operable communication methods, and
the reception data is allocated to the plurality of communication stations that respectively support the two or more simultaneously operable communication methods indicated by the group information.

3. The terminal apparatus according to claim 2, wherein
the control circuitry generates a plurality of group information, and
each of the plurality of group information indicates a combination of two or more simultaneously operable communication methods whose total value of SARs is equal to or less than the threshold value.

4. The terminal apparatus according to claim 3, wherein
the control circuitry selects one of the plurality of group information, and
the transmitter transmits the selected one of the plurality of group information.

5. The terminal apparatus according to claim 4, wherein
the selected one of the plurality of group information is switched to another one of the plurality of group information in a time axis direction.

6. The terminal apparatus according to claim 4, wherein
the selected one of the plurality of group information is switched to another one of the plurality of group information during a transition period between a transmission timing and a reception timing for the terminal apparatus.

7. The terminal apparatus according to claim 4, further comprising:
a display which, in operation, receives input from a user, wherein
the control circuitry selects the one of the plurality of group information based on the input to the display from the user.

8. The terminal apparatus according to claim 7, wherein
the display, in operation, displays a transmission rate for each of the two or more simultaneously operable communication methods supported by the terminal apparatus and an overall transmission rate corresponding to each of the plurality of group information.

9. The terminal apparatus according to claim 3, wherein
the transmitter transmits the plurality of group information,
one of the generated plurality of group information is selected by a device other than the terminal apparatus, and
the reception data is allocated to the plurality of communication stations that respectively support the two or more simultaneously operable communication methods indicated by the selected one of the generated plurality of group information.

10. The terminal apparatus according to claim 1, wherein the control circuitry, in operation, holds respective SAR values for the two or more simultaneously operable communication methods supported by the terminal apparatus, and holds the threshold value for the SAR values, and if a total value of the SAR value of at least one communication method indicated in the first group information and the SAR value of a different communication method that is not included in the one group is not more than the threshold value, the control circuitry adds the different communication method to the first group information.

11. The terminal apparatus according to claim 1, wherein the control circuitry, in operation, holds the first SAR value and the second SAR value for each of the two or more communication methods supported by the terminal apparatus, and holds the first threshold value for the first SAR value and the second threshold value for the second SAR value.

12. A communication method comprising: generating first group information indicating a combination of two or more simultaneously operable communication methods whose total value of specific absorption rates (SARs) is equal to or less than a threshold value, wherein, if a total value of a first SAR value of the two or more simultaneously operable communication methods indicated in the first group information and the first SAR value of a different communication method that is not included in the first group information is equal to or less than a first threshold value, and if a total value of a second SAR value of the two or more simultaneously operable communication methods indicated in the first group information and the second SAR value of the different communication method is equal to or less than a second threshold value, the generating of the first group information includes adding the different communication method to the first group information; and transmitting transmission data to a plurality of communication stations that respectively support the two or more simultaneously operable communication methods indicated by the first group information, by using corresponding communication methods.

13. The communication method according to claim 12, further comprising:

transmitting the first group information through at least one communication station; and receiving reception data through the plurality of communication stations that respectively support the two or more simultaneously operable communication methods, wherein the reception data is allocated to the plurality of communication stations that respectively support the two or more simultaneously operable communication methods indicated by the group information.

14. The communication method according to claim 13, further comprising:

generating a plurality of group information, wherein each of the plurality of group information indicates a combination of two or more simultaneously operable communication methods whose total value of SARs is equal to or less than the threshold value.

15. The communication method according to claim 14, further comprising:

selecting one of the plurality of group information; and transmitting the selected one of the plurality of group information.

16. The communication method according to claim 15, wherein the selected one of the plurality of group information is switched to another one of the plurality of group information in a time axis direction.

17. The communication method according to claim 15, wherein the selected one of the plurality of group information is switched to another one of the plurality of group information during a transition period between a transmission timing and a reception timing.

18. The communication method according to claim 15, wherein the selected one of the plurality of group information is selected based on input from a user.

19. The communication method according to claim 18, further comprising:

displaying a transmission rate for each of the two or more simultaneously operable communication methods supported by the terminal apparatus and an overall transmission rate corresponding to each of the plurality of group information.

20. The communication method according to claim 14, further comprising:

transmitting the plurality of group information, wherein the reception data is allocated to the plurality of communication stations that respectively support the two or more simultaneously operable communication methods indicated by the selected one of the plurality of group information.

* * * * *